(12) United States Patent
Ichikawa et al.

(10) Patent No.: US 11,477,871 B2
(45) Date of Patent: Oct. 18, 2022

(54) LIGHTING CIRCUIT OF AUTOMOTIVE LAMP

(71) Applicant: KOITO MANUFACTURING CO., LTD., Tokyo (JP)

(72) Inventors: Tomoyuki Ichikawa, Shizuoka (JP); Ryosuke Matsuhana, Shizuoka (JP); Satoshi Kikuchi, Shizuoka (JP); Naoki Kawabata, Shizuoka (JP); Norito Takahashi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/874,124

(22) Filed: May 14, 2020

(65) Prior Publication Data
US 2020/0275542 A1    Aug. 27, 2020

Related U.S. Application Data

(63) Continuation of application No. PCT/JP2018/041696, filed on Nov. 9, 2018.

(30) Foreign Application Priority Data

Nov. 14, 2017 (JP) .............................. JP2017-219171
Nov. 14, 2017 (JP) .............................. JP2017-219172
(Continued)

(51) Int. Cl.
*H05B 47/10* (2020.01)
*H05B 45/46* (2020.01)
(Continued)

(52) U.S. Cl.
CPC ............... *H05B 47/10* (2020.01); *B60Q 1/04* (2013.01); *H05B 45/325* (2020.01); *H05B 45/46* (2020.01); *H05B 47/17* (2020.01)

(58) Field of Classification Search
CPC .... H05B 45/3725; H05B 45/46; H05B 45/38; H05B 45/10; H05B 45/48; H05B 47/10; H05B 45/50; H05B 45/385; H05B 45/375
See application file for complete search history.

(56) References Cited

U.S. PATENT DOCUMENTS

2007/0013321 A1\* 1/2007 Ito ..................... H05B 45/3725
                                                          315/247
2008/0297067 A1\* 12/2008 Wang ..................... H05B 45/10
                                                          315/294

(Continued)

FOREIGN PATENT DOCUMENTS

| CN | 204945863 U | 1/2016 |
| JP | 2008304694 A | 12/2008 |

(Continued)

OTHER PUBLICATIONS

International Search Report (PCT/ISA/210) and Written Opinion (PCT/ISA/237) dated Jan. 29, 2019 issued in International Application No. PCT/JP2018/041696, with English translations (46 pages).
(Continued)

*Primary Examiner* — Wei (Victor) Y Chan
(74) *Attorney, Agent, or Firm* — Buchanan Ingersoll & Rooney PC

(57) ABSTRACT

A lighting circuit turns on a plurality of semiconductor light sources. Multiple current sources are each coupled to a corresponding semiconductor light source. A switching converter supplies a driving voltage $V_{OUT}$ across each of multiple series connection circuits each formed of the semiconductor light source and the current source. A converter controller employing a ripple control method turns on a switching transistor of the switching converter in response to a voltage across any one of the multiple current sources decreasing to a bottom limit voltage.

13 Claims, 39 Drawing Sheets

(30) Foreign Application Priority Data

May 25, 2018 (JP) .............................. JP2018-100800
May 25, 2018 (JP) .............................. JP2018-100801

(51) Int. Cl.
*H05B 45/325* (2020.01)
*B60Q 1/04* (2006.01)
*H05B 47/17* (2020.01)

(56) References Cited

U.S. PATENT DOCUMENTS

| | | | |
|---|---|---|---|
| 2009/0009088 A1 | 1/2009 | Ito et al. | |
| 2009/0187925 A1 | 7/2009 | Hu et al. | |
| 2009/0302776 A1 | 12/2009 | Szczeszynski | |
| 2010/0327835 A1 | 12/2010 | Archibald | |
| 2012/0133299 A1* | 5/2012 | Capodivacca | H05B 45/39 315/297 |
| 2012/0212141 A1* | 8/2012 | Ryu | H05B 45/347 315/186 |
| 2017/0302170 A1 | 10/2017 | Reed et al. | |
| 2017/0325307 A1* | 11/2017 | Lee | H05B 45/10 |

FOREIGN PATENT DOCUMENTS

| | | |
|---|---|---|
| JP | 2009012669 A | 1/2009 |
| JP | 2010177531 A | 8/2010 |
| JP | 2011253773 A | 12/2011 |
| JP | 2012160287 A | 8/2012 |
| JP | 2012160436 A | 8/2012 |
| JP | 2012205360 A | 10/2012 |
| JP | 2014103002 A | 6/2014 |
| JP | 2015060822 A | 3/2015 |
| JP | 2016029665 A | 3/2016 |
| JP | 2016213017 A | 12/2016 |
| JP | 2017010810 A | 1/2017 |
| JP | 2017107777 A | 6/2017 |

OTHER PUBLICATIONS

International Preliminary Report on Patentability (PCT/IPEA/409) dated Mar. 11, 2020 issued in International Application No. PCT/JP2018/041696, with English translation (33 pages).

Office Action dated Jun. 18, 2021, by the Chinese Patent Office in corresponding Chinese Patent Application No. 201811345510.7 and English translation of the Office Action. (23 pages).

Office Action (Communication pursuant to Rules 164(1) EPC/The partial supplementary European search report) dated Jun. 11, 2021, in corresponding European Patent Application No. 18879988.6. (22 pages).

Briggs et al., "Designing Fast Response Synchronous Buck Regulators Using the TPS5210 Mixed-Signal Products", Mar. 1, 1999, pp. 1-50, XP055804944, Retrieved from the Internet: URL:https://www.ti.com/lit/an/slva044.

Extended European Search Report dated Nov. 10, 2021, issued in corresponding European Application No. 21186111.7. (11 pages).

Notification of Reasons for Refusal issued in Japanese Patent Application No. 2019-554198, dated Aug. 30, 2022, with English Translation (15 pages).

Search Report issued in European Patent Application No. 22172368.7-1201, dated Aug. 26, 2022 (11 pages).

Office Action issued in U.S. Appl. No. 16/488,850 dated Sep. 1, 2022. 24 Pages.

* cited by examiner

FIG. 23
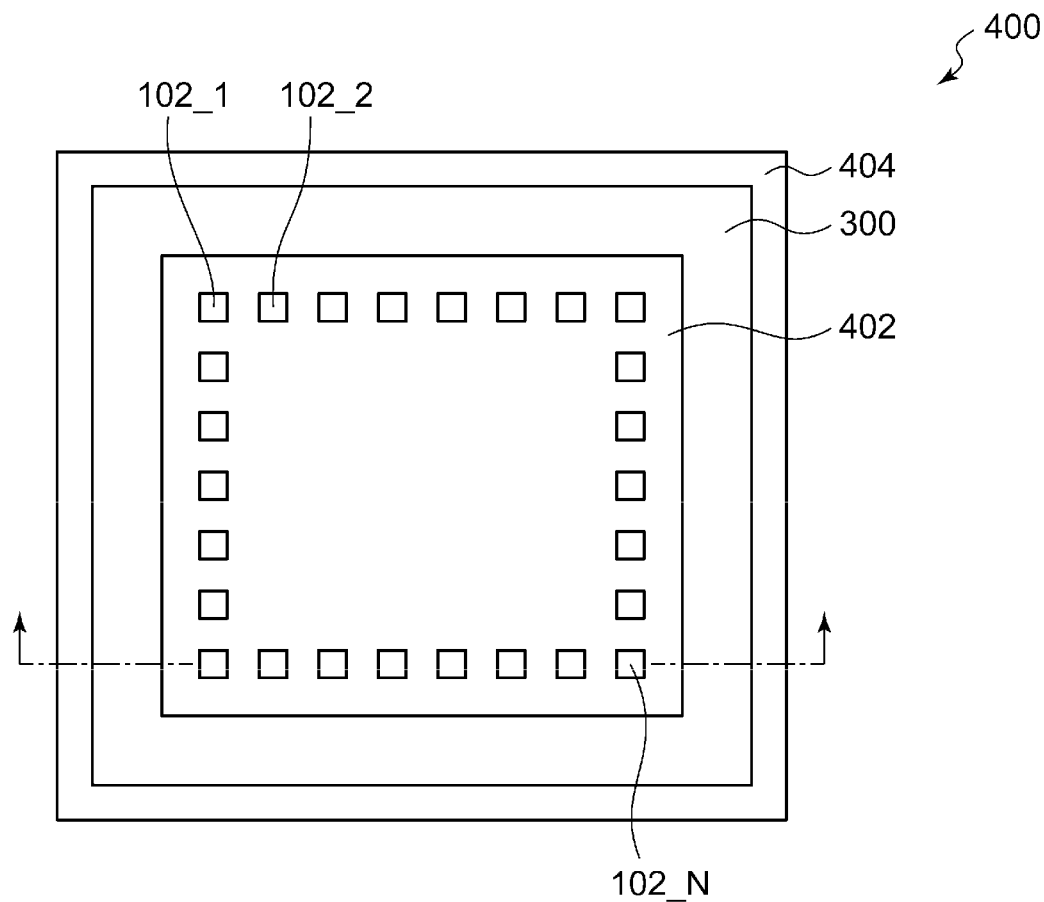
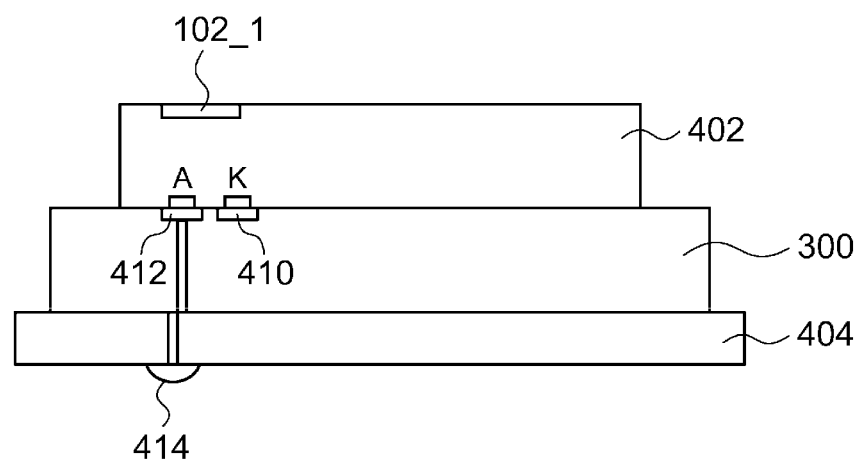

FIG. 39
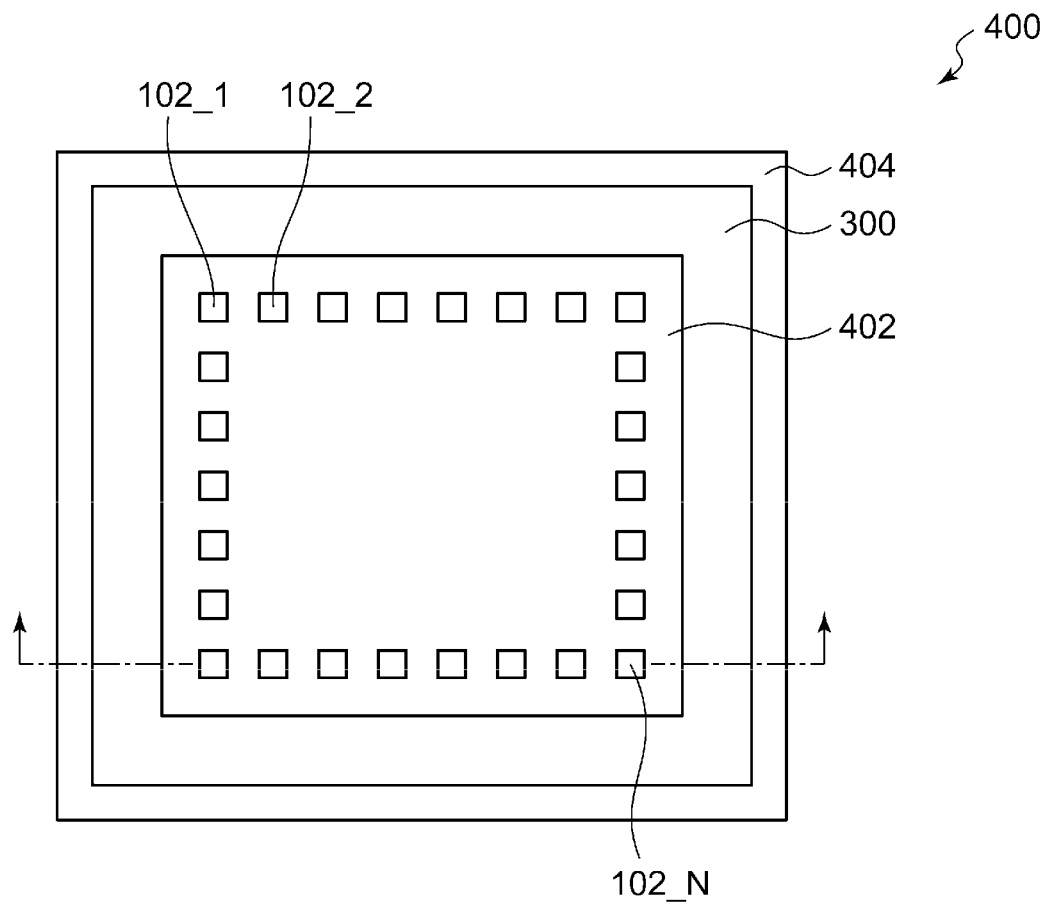
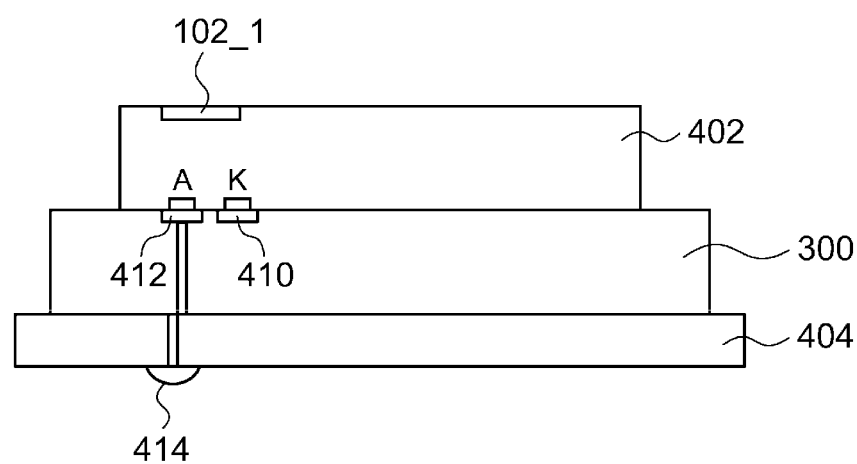

LIGHTING CIRCUIT OF AUTOMOTIVE LAMP

BACKGROUND OF THE INVENTION

1. Field of the Invention

The present invention relates to a lighting circuit.

2. Description of the Related Art

Typical automotive lamps are capable of switching between a low-beam mode and a high-beam mode. The low-beam mode is used to illuminate a close range in the vicinity of the user's vehicle with a predetermined light intensity. In the low-beam mode, light distribution is determined so as to prevent glare being imparted to an oncoming vehicle or a leading vehicle. The low-beam mode is mainly used when the vehicle is traveling in an urban area. In contrast, the high-beam mode is used to illuminate a distant range over a wide area ahead of the vehicle with a relatively high light intensity. The high-beam mode is mainly used when the vehicle is traveling at high speed along a road where there are a small number of oncoming vehicles and leading vehicles. Accordingly, the high-beam mode provides the driver with high visibility, which is an advantage, as compared with the low-beam mode. However, the high-beam mode has a problem of imparting glare to a pedestrian or a driver of a vehicle ahead of the vehicle.

In recent years, the ADB (Adaptive Driving Beam) technique has been proposed in which a high-beam distribution pattern is dynamically and adaptively controlled based on the state of the surroundings of a vehicle. With the ADB technique, the presence or absence of a leading vehicle, an oncoming vehicle, or a pedestrian ahead of the vehicle is detected, and the illumination is reduced or turned off for a region that corresponds to such a vehicle or pedestrian thus detected, thereby reducing glare imparted to such a vehicle or pedestrian.

FIG. 1 is a block diagram showing a lamp system 1001 having an ADB function. The lamp system 1001 includes a battery 1002, a switch 1004, a switching converter 1006, multiple light-emitting units 1008_1 through 1008_N, multiple current sources 1010_1 through 1010_N, a converter controller 1012, and a light distribution controller 1014.

The multiple light-emitting units 1008_1 through 1008_N are each configured as a semiconductor light source such as an LED (light-emitting diode), LD (laser diode), or the like, which are associated with multiple different regions on a virtual vertical screen ahead of the vehicle. The multiple current sources 1010_1 through 1010_N are arranged in series with the multiple corresponding light-emitting units 1008_1 through 1008_N. A driving current $I_{LEDi}$ generated by the current source 1010_i flows through the i-th ($1 \le i \le N$) light-emitting unit 1008_i.

The multiple current sources 1010_1 through 1010_N are each configured to be capable of turning on and off (or adjusting the amount of current) independently. The light distribution controller 1014 controls the on/off state (or the amount of current) for each of the multiple current sources 1010_1 through 1010_N so as to provide a desired light distribution pattern.

The switching converter 1006 configured to provide a constant voltage output generates a driving voltage $V_{OUT}$ that is sufficient for the multiple light-emitting units 1008_1 through 1008_N to provide light emission with a desired luminance. Description will be made directing attention to the i-th channel. When a given driving current $I_{LEDi}$ flows through the light-emitting unit 1008_i, a voltage drop (forward voltage) $V_{Fi}$ occurs in the light-emitting unit 1008_i. In order to allow the current source 1010_i to generate the driving current $I_{LEDi}$, the voltage across the current source 1010_i is required to be larger than a particular voltage (which will be referred to as "$V_{SATi}$" hereafter). Accordingly, the following inequality expression must hold true.

$$V_{OUT} > V_{Fi} + V_{SATi} \quad (1)$$

This relation must hold true for all the channels.

In order to satisfy the inequality expression (1) in all situations, the output voltage $V_{OUT}$ may preferably be employed as the control target for the feedback control. Specifically, as represented by Expression (2), a target value $V_{OUT(REF)}$ of the output voltage $V_{OUT}$ is set to a higher value using a margin. Furthermore, the output voltage $V_{OUT}$ may preferably be feedback controlled such that the output voltage $V_{OUT}$ of the switching converter 1006 matches the target value $V_{OUT(REF)}$.

$$V_{OUT(REF)} = V_{F(MARGIN)} + V_{SAT(MARGIN)}$$

Here, $V_{F(TYP)}$ represents the maximum value (or typical value) of $V_F$ with a margin added. $V_{SAT(MARGIN)}$ represents a saturation voltage $V_{SAT}$ to which a margin is added.

In this control operation, the difference between the saturation voltage $V_{SAT(MARGIN)}$ and the actual saturation voltage $V_{SAT}$ is applied to the current source 1010, which leads to the occurrence of unnecessary power loss. In addition, when the actual forward voltage $V_F$ is lower than $V_{F(MARGIN)}$, voltage drop that occurs across the current source 1010 includes the voltage difference between them, leading to the occurrence of unnecessary power loss.

With an automotive lamp, there is a need to flow a very large current through a light-emitting unit. Furthermore, it is more difficult to provide such an automotive lamp with countermeasures for releasing heat than it is for other devices. Accordingly, with the automotive lamp, there is a demand to reduce the heat amount due to the current source as much as possible.

SUMMARY OF THE INVENTION

The present invention has been made in order to solve such a problem. Accordingly, it is an exemplary purpose of an embodiment of the present invention to provide a lighting circuit that is capable of providing reduced power consumption.

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later.

1. An embodiment of the present invention relates to a lighting circuit structured to turn on multiple semiconductor light sources. The lighting circuit includes: multiple current sources each of which is to be coupled to a corresponding semiconductor light source; a switching converter structured to supply a driving voltage across each of multiple series connection circuits each formed of the semiconductor light source and the current source; and a converter controller employing a ripple control method. The converter controller turns on the switching transistor of the switching converter in response to a voltage across any one of the multiple current sources decreasing to a bottom limit voltage.

2. An embodiment of the present invention also relates to the lighting circuit structured to turn on multiple semiconductor light sources. The lighting circuit includes: multiple current sources each of which is to be coupled to a corresponding semiconductor light source in series, and each of which includes a series transistor and a sensing resistor arranged in series with the corresponding semiconductor light source, and an error amplifier structured to adjust the voltage at the control electrode of the series transistor based on a voltage drop that occurs across the sensing resistor; a switching converter structured to supply a driving voltage across each of multiple series connection circuits each formed of the semiconductor light source and the current source; and a converter controller using a ripple control method. The converter controller turns on a switching transistor of the switching converter in response to the output voltage of the error amplifier of any one of the multiple current sources satisfying a predetermined turn-on condition.

Another embodiment of the present invention relates to a current driver circuit structured to drive multiple semiconductor light sources. The current driver circuit includes: multiple current sources each structured to allow the on/off state thereof to be controlled independently according to a PWM signal, and to be each coupled to a corresponding semiconductor light source in series; an interface circuit structured to receive, from an external processor at a first time interval, multiple control data that indicate an on/off duty cycle for the multiple current sources; and a dimming pulse generator structured to generate multiple PWM signals for the multiple current sources, and to gradually change, at a second time interval that is smaller than the first time interval, a duty cycle of each of the multiple PWM signals from a value indicated by the corresponding control data before updating to a value indicated by the corresponding control data after updating.

It should be noted that any combination of the components described above, any component of the present invention, or any manifestation thereof, may be mutually substituted between a method, apparatus, system, and so forth, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 23 shows a plan view and a cross-sectional view of a light source with an integrated driver;

FIG. 39 shows a plan view and a cross-sectional view of a light source with an integrated driver;

DETAILED DESCRIPTION OF THE INVENTION

Figure 1:
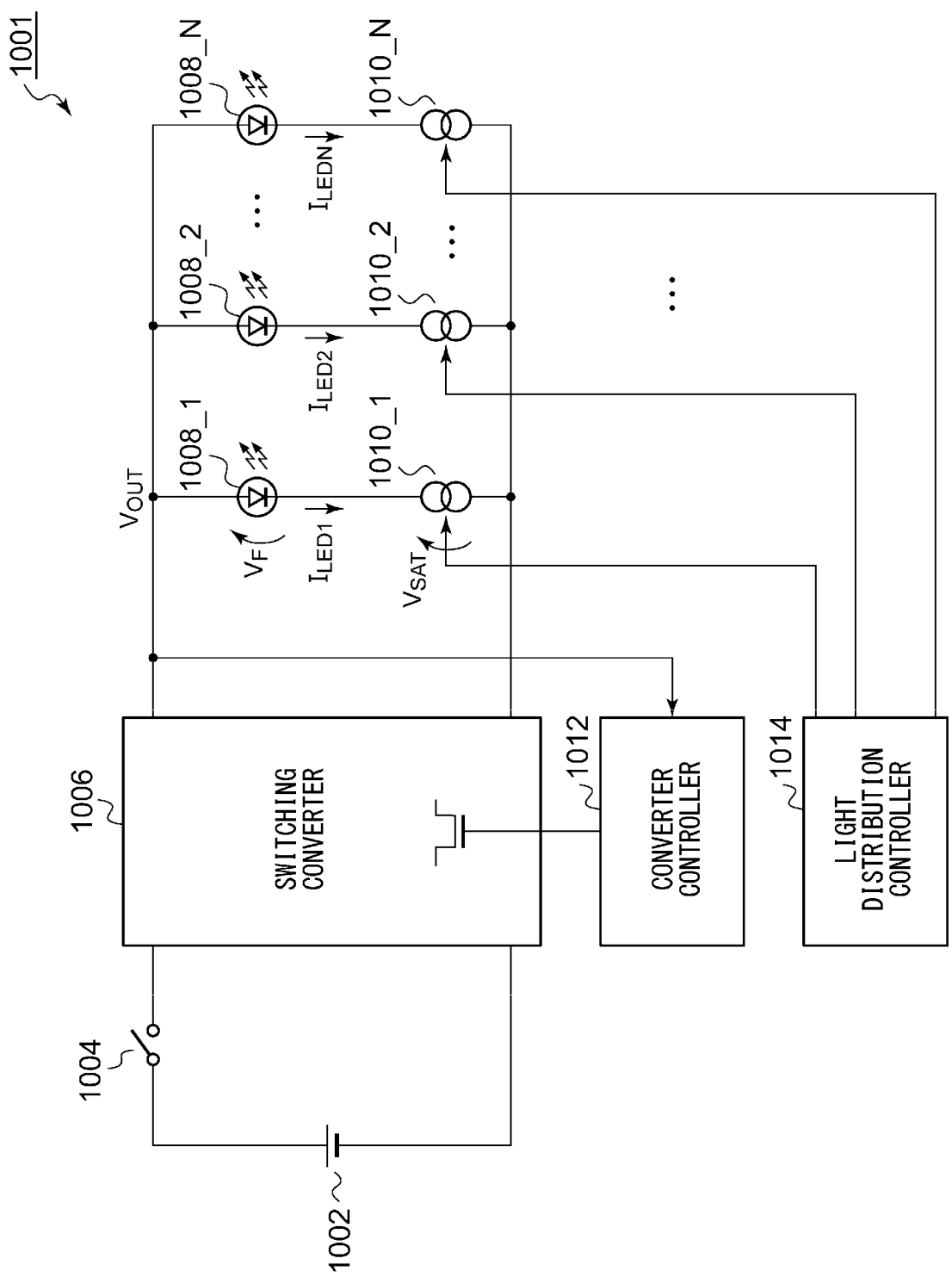
FIG. 1 is a block diagram showing a lamp system including an ADB function.

Description will be made below regarding the present invention based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

In the present specification, the reference symbols denoting electric signals such as a voltage signal, current signal, or the like, and the reference symbols denoting circuit elements such as a resistor, capacitor, or the like, also represent the corresponding voltage value, current value, resistance value, or capacitance value as necessary.

OVERVIEW OF THE EMBODIMENTS 1 THROUGH 5

An embodiment of the present invention disclosed in the present specification relates to a lighting circuit structured to be capable of turning on multiple semiconductor light sources. The lighting circuit includes: multiple current sources each of which is to be coupled to a corresponding semiconductor light source; a switching converter structured to supply a driving voltage across each of multiple series connection circuits each formed of the semiconductor light source and the current source; and a converter controller employing a ripple control method. The converter controller turns on the switching transistor of the switching converter in response to a voltage across any one of the multiple current sources decreasing to a bottom limit voltage.

The bottom limit voltage is maintained at the minimum level that ensures that each current source is able to generate a predetermined driving current. This arrangement allows power loss to be reduced for each current source.

Also, the converter controller may turn off the switching transistor after the on time elapses after the switching transistor is turned on.

Also, the on time may be feedback controlled such that the switching frequency of the switching transistor approaches a target frequency.

Also, the converter controller may turn off the switching transistor in response to the driving voltage reaching an upper limit voltage.

Also, the upper limit voltage may be feedback controlled such that the switching frequency of the switching transistor approaches a target frequency.

Also, the multiple current sources may each be structured to allow the on/off state thereof to be controlled independently. Also, the bottom limit voltage may be raised according to a reduction in the number of on-state current sources from among the multiple current sources. This arrangement is capable of preventing the switching frequency from becoming excessively low in a light load state. In a case in which the bottom limit voltage is raised, this involves an increase in heat generation in each current source. However, there is only a small number of on-state current sources. Accordingly, the increase in the sum total of the heat generation does not become a problem.

Also, the multiple current sources may each be structured to allow the on/off state thereof to be controlled independently. Also, the target frequency may be changed according to the number of on-state current sources from among the multiple current sources.

Also, the multiple current sources may each be structured to allow the on/off state thereof to be controlled independently. Also, the lighting circuit may further include a dummy load coupled to an output of the switching converter, and structured to be set to an enable state according to the number of on-state current sources from among the multiple current sources. By operating the dummy load in the light load state, this arrangement is capable of suppressing a reduction in the switching frequency.

Also, after a predetermined period of time elapses after the switching transistor is turned off, the dummy load may reduce the driving voltage. This arrangement allows the switching frequency to be determined according to the predetermined period of time.

Also, when the driving voltage exceeds a predetermined threshold value, the switching transistor may be forcibly turned off.

Also, the multiple semiconductor light sources and the multiple current sources may be arranged in the form of a module.

With an embodiment, the lighting circuit may be provided to an automotive lamp.

EMBODIMENTS 1 THROUGH 5

Embodiment 1

Figure 2:
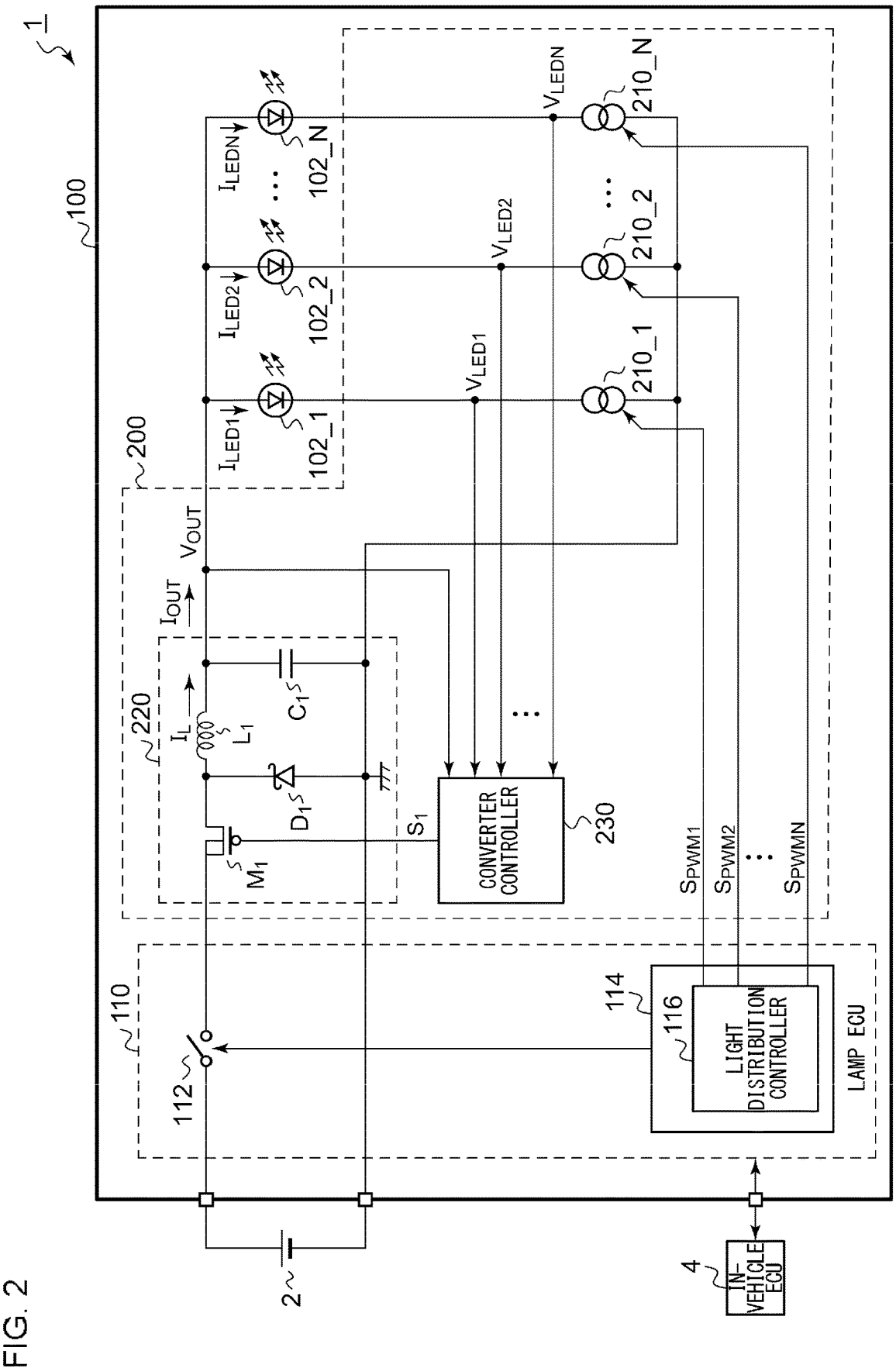
FIG. 2 is a block diagram showing a lamp system including an automotive lamp according to an embodiment 1.

FIG. 2 is a block diagram showing a lamp system 1 including an automotive lamp 100 according to an embodiment 1. The lamp system 1 includes a battery 2, an in-vehicle ECU (Electronic Control Unit) 4, and an automotive lamp 100. The automotive lamp 100 is configured as a variable light distribution headlamp having an ADB function. The automotive lamp 100 generates a light distribution according to a control signal received from the in-vehicle ECU 4.

The automotive lamp 100 includes multiple (N≥2) semiconductor light sources 102_1 through 102_N, a lamp ECU 110, and a lighting circuit 200. Each semiconductor light source 102 may preferably be configured using an LED. Also, various kinds of light-emitting elements such as an LD, organic EL, or the like, may be employed. Each semiconductor light source 102 may include multiple light-emitting elements coupled in series and/or coupled in parallel. It should be noted that the number of channels, i.e., N, is not restricted in particular. Also, N may be 1.

The lamp ECU 110 includes a switch 112 and a microcontroller 114. The microcontroller (processor) 114 is coupled to the in-vehicle ECU 4 via a bus such as a CAN (Controller Area Network) or LIN (Local Interconnect Network) or the like. This allows the microcontroller 114 to receive various kinds of information such as a turn-on/turn-off instruction, etc. The microcontroller 114 turns on the switch 112 according to a turn-on instruction received from the in-vehicle ECU 4. In this state, a power supply voltage (battery voltage $V_{BAT}$) is supplied from the battery 2 to the lighting circuit 200.

Furthermore, the microcontroller 114 receives a control signal for indicating the light distribution pattern from the in-vehicle ECU 4, and controls the lighting circuit 200. Also, the microcontroller 114 may receive information that indicates the situation ahead of the vehicle from the in-vehicle ECU 4, and may autonomously generate the light distribution pattern based on the information thus received.

The lighting circuit 200 supplies the driving currents $I_{LED1}$ through $I_{LEDN}$ to the multiple semiconductor light sources 102_1 through 102_N so as to provide a desired light distribution pattern.

The lighting circuit 200 includes multiple current sources 210_1 through 210_N, a switching converter 220, and a converter controller 230. Each current source 210_i (i=1, 2, ..., N) is coupled to the corresponding semiconductor light source 102_i in series. The current source 210_i functions as a constant current driver that stabilizes the driving current $I_{LEDi}$ that flows through the semiconductor light source 102_i to a predetermined current amount.

The multiple current sources 210_1 through 210_N are each configured to be capable of controlling their on/off states independently according to PWM signals $S_{PWM1}$ through $S_{PWMN}$ generated by the light distribution controller 116. When the PWM signal $S_{PWMi}$ is set to the on level (e.g., high level), the driving current $I_{LEDi}$ flows, thereby turning on the semiconductor light source 102_i. Conversely, when the PWM signal $S_{PWMi}$ is set to the off level (e.g., low level), the driving current $I_{LEDi}$ is set to zero, thereby turning off the semiconductor light source 102_i. By changing the duty cycle of the PWM signal $S_{PWMi}$, such an arrangement allows the effective luminance of the semiconductor light source 102_i to be changed (PWM dimming).

The switching converter 220 supplies a driving voltage $V_{OUT}$ across a series connection circuit of the semiconductor light source 102 and the current source 210. The switching converter 220 is configured as a step-down converter (Buck converter) including a switching transistor $M_1$, a rectification diode $D_1$, an inductor $L_1$, and an output capacitor $C_1$.

The converter controller 230 controls the switching converter 220 using a ripple control method. More specifically, the converter controller 230 turns on the switching transistor $M_1$ of the switching converter 220 when the voltage across any one of the multiple current sources 210, i.e., the voltage $V_{LED}$ at connection nodes that couple any one from among the current sources 210 and the corresponding semiconductor light source 102, decreases to a predetermined bottom limit voltage $V_{BOTTOM}$.

Furthermore, when a predetermined turn-off condition is satisfied, the converter controller 230 switches a control pulse $S_1$ to the off level (high level), thereby turning off the switching transistor $M_1$. The turn-off condition may be that the output voltage $V_{OUT}$ of the switching converter 220 has reached a predetermined upper limit voltage $V_{UPPER}$.

The above is the configuration of the automotive lamp 100. Next, description will be made regarding the operation thereof.

Figure 3:
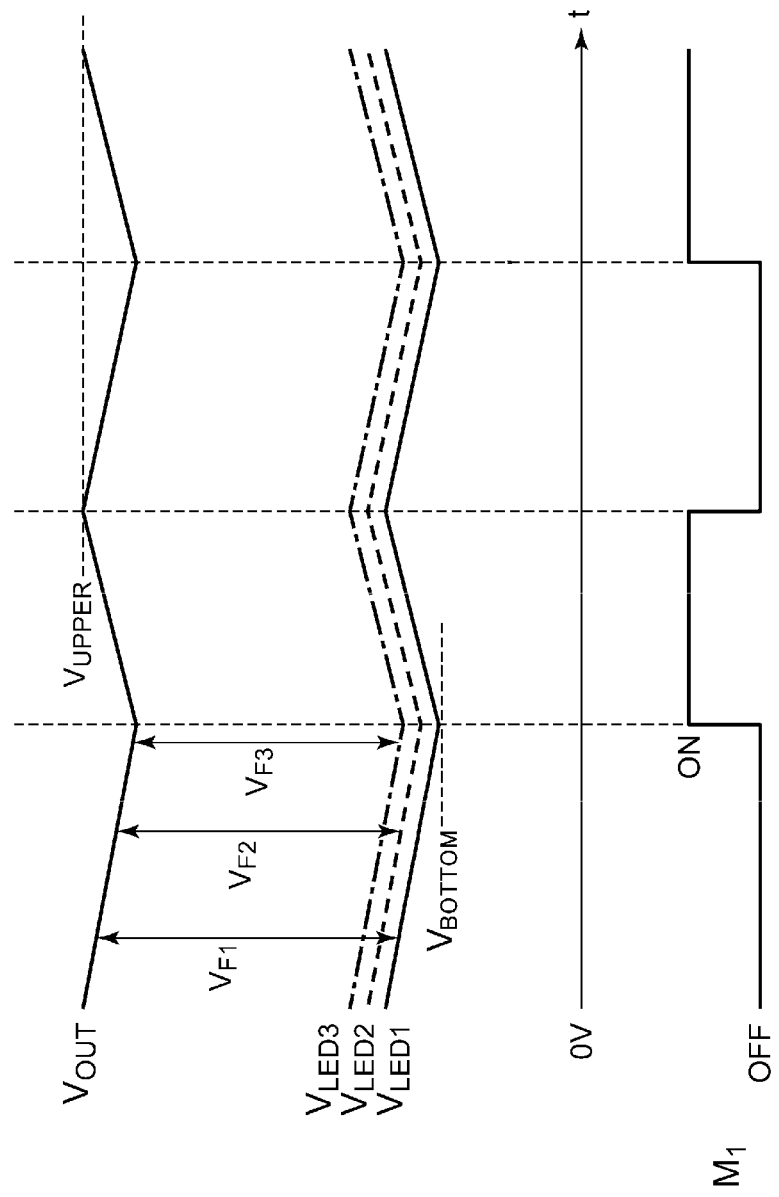
FIG. 3 is an operation waveform diagram showing the operation of the automotive lamp shown in FIG. 2.

FIG. 3 is an operation waveform diagram showing the operation of the automotive lamp 100 shown in FIG. 2. For ease of understanding, description will be made regarding an example in which N=3. Furthermore, description will be made assuming that there is only negligible element variation between the multiple current sources 210_1 through 210_N. Furthermore, description will be made assuming that the relation $V_{F1}>V_{F2}>V_{F3}$ holds true due to element variation between the semiconductor light sources 102. For ease of understanding, description will be made regarding the operation without involving PWM dimming.

In the off period (low-level period in the drawing) of the switching transistor $M_1$, the output capacitor $C_1$ of the switching converter 220 is discharged due to a load current $I_{OUT}$ which is the sum total of the driving currents $I_{LED1}$ through $I_{LED3}$, which lowers the output voltage $V_{OUT}$ with time. In actuality, the output capacitor $C_1$ is charged or discharged by the difference between the coil current $I_L$ that flows through the inductor $L_1$ and the load current. Accordingly, the increase/decrease of the output voltage $V_{OUT}$ does not necessarily match the on/off state of the switching transistor $M_1$ on the time axis.

The voltages that each occur across each current source 210, i.e., the voltages (cathode voltages) $V_{LED1}$ through $V_{LED3}$ at the connection nodes that each connect the corresponding current source 210 and the corresponding semiconductor light source 102, are represented by the following Expressions.

$$V_{LED1} = V_{OUT} - V_{F1}$$

$$V_{LED2} = V_{OUT} - V_{F2}$$

$$V_{LED3} = V_{OUT} - V_{F3}$$

Accordingly, the voltages $V_{LED1}$ through $V_{LED3}$ each change while maintaining a constant voltage difference with respect to the output voltage $V_{OUT}$. In this example, the forward voltage $V_{F1}$ at the first channel is the largest value. Accordingly, the cathode voltage $V_{LED1}$ at the first channel is the smallest value.

When the cathode voltage $V_{LED1}$ at the first channel decreases to the bottom limit voltage $V_{BOTTOM}$, the switching transistor $M_1$ is turned on.

When the switching transistor $M_1$ is turned on, this raises the coil current $I_L$ that flows through the inductor $L_1$, which switches the output voltage $V_{OUT}$ to an increasing phase. Subsequently, when the output voltage $V_{OUT}$ reaches the upper limit voltage $V_{UPPER}$, the switching transistor $M_1$ is turned off. The lighting circuit 200 repeats this operation.

The above is the operation of the lighting circuit 200. The lighting circuit 200 is capable of maintaining the voltage across each current source 210 at a level in the vicinity of the minimum level that ensures that each lighting circuit 200 is able to generate predetermined driving currents $I_{LED}$. This arrangement provides reduced power consumption.

As another approach (comparison technique), an arrangement is conceivable in which the cathode voltages $V_{LED1}$ through $V_{LEDN}$ are feedback controlled using an error amplifier such that the minimum voltage thereof approaches a predetermined target value $V_{REF}$.

Figure 4B:
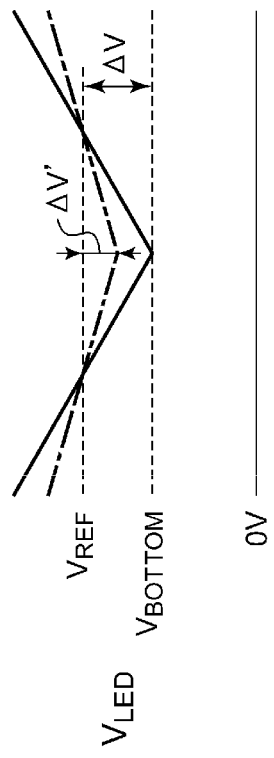
FIG. 4B is a waveform diagram showing the cathode voltage $V_{LED}$ according to a comparison technique.
Figure 4A:
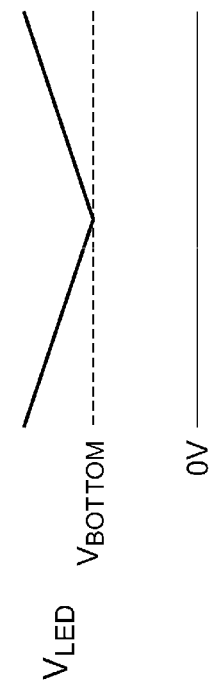
FIG. 4A is a waveform diagram showing a cathode voltage $V_{LED}$ in the lamp system shown in FIG. 2.

FIG. 4A is a waveform diagram showing the cathode voltage $V_{LED}$ provided by the embodiment. FIG. 4B is a waveform diagram showing the cathode voltage $V_{LED}$ provided by a comparison technique. The cathode voltages $V_{LED}$ shown in these drawings are each the lowest voltage $V_{MIN}$ from among the multiple cathode voltages.

With the comparison technique, the average of the minimum voltage $V_{MIN}$ from among the cathode voltages $V_{LED1}$ through $V_{LEDN}$ approaches the target voltage $V_{REF}$ by means of the response characteristics of a phase compensation filter provided to a feedback loop. That is to say, the bottom level $V_{MIN\_BOTTOM}$ of the minimum voltage $V_{MIN}$ is lower than the target voltage $V_{REF}$. In this case, the difference between the bottom level $V_{MIN\_BOTTOM}$ and the target voltage $V_{REF}$ changes in an unstable manner depending on the situation. In order to provide stable circuit operation, as indicated by the solid line in FIG. 4B, there is a need to set $V_{REF}$ to a high value assuming that there is a large difference $\Delta V$ between the bottom level $V_{MIN\_BOTTOM}$ and the target voltage $V_{REF}$. However, in a situation in which there is a small difference $\Delta V'$ between them as indicated by the line of alternately long and short dashes, the cathode voltage $V_{LED}$ is higher than the bottom limit voltage $V_{BOTTOM}$, leading to the occurrence of unnecessary power consumption in the current source. With the embodiment, as shown in FIG. 4A, this arrangement allows the bottom level of the cathode voltage $V_{LED}$ to approach the bottom limit voltage $V_{BOTTOM}$, thereby providing further reduced power consumption as compared with the comparison technique.

The present invention encompasses various kinds of apparatuses, circuits, and methods that can be regarded as a block configuration or a circuit configuration shown in FIG. 2, or otherwise that can be derived from the aforementioned description. That is to say, the present invention is not restricted to a specific configuration. More specific description will be made below regarding an example configuration for clarification and ease of understanding of the essence of the present invention and the circuit operation. That is to say, the following description will by no means be intended to restrict the technical scope of the present invention.

Example 1.1

Figure 5:
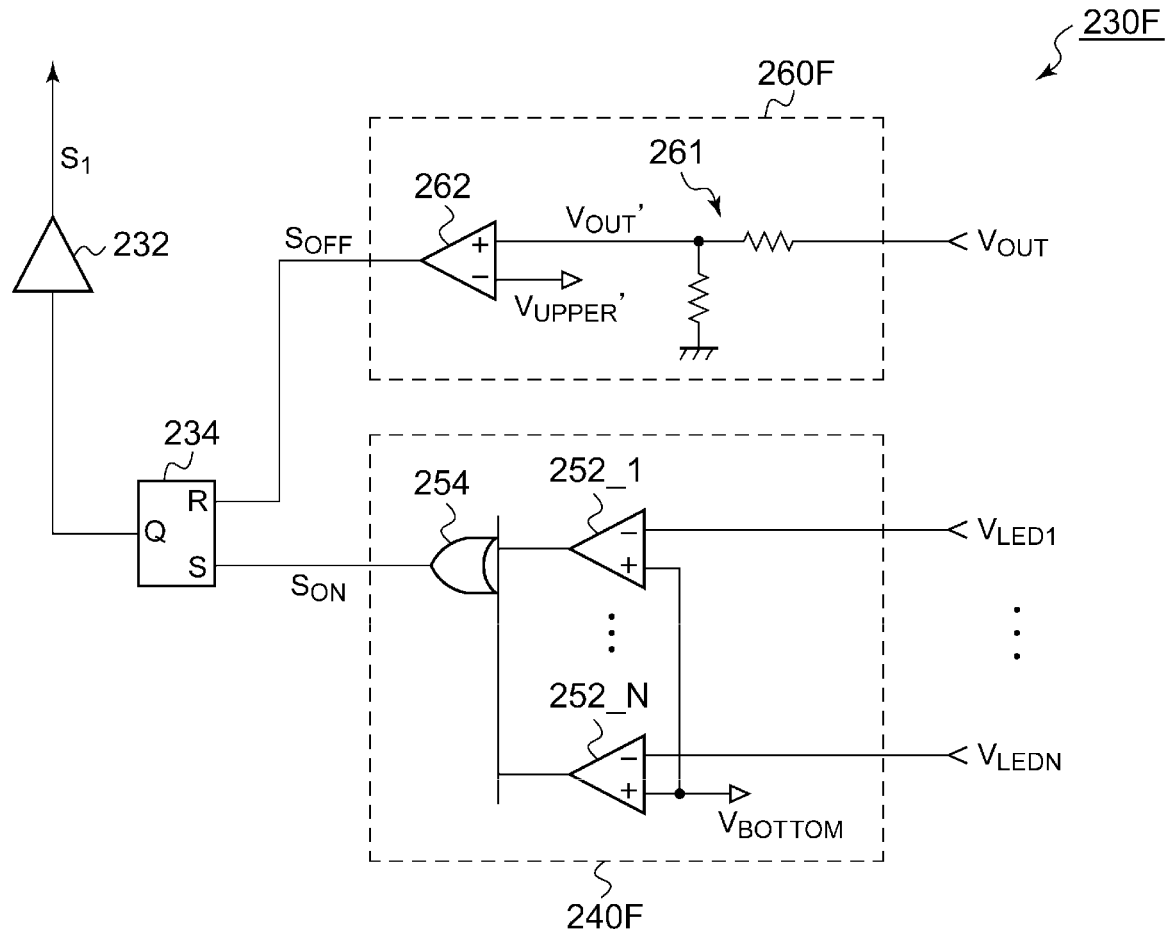
FIG. 5 is a circuit diagram showing a converter controller according to an example 1.1.

FIG. 5 is a circuit diagram showing a converter controller 230F according to an example 1.1. An on signal generating circuit 240F includes multiple comparators 252_1 through 252_N, and a logic gate 254. Each comparator 252_i compares the corresponding cathode voltage $V_{LEDi}$ with the bottom limit voltage $V_{BOTTOM}$. The comparator 252_i generates a comparison signal that is asserted (e.g., set to the high level) when $V_{LEDi}<V_{BOTTOM}$. The logic gate 254 performs a logical operation on the outputs (comparison signals) $S_{CMP1}$ through $S_{CMPN}$ of the multiple comparator 252_1 through 252_N. When at least one comparison signal is asserted, the logic gate 254 asserts the on signal $S_{ON}$. In this example, the logic gate 254 is configured as an OR gate.

An off signal generating circuit 260F generates an off signal $S_{OFF}$ which determines the timing at which the switching transistor $M_1$ is to be turned off. A voltage dividing circuit 261 divides the output voltage $V_{OUT}$ such that it is scaled to an appropriate voltage level. A comparator 262 compares the output voltage $V_{OUT}'$ thus divided with a threshold value $V_{UPPER}'$ obtained by scaling the upper limit voltage $V_{UPPER}$. When the relation $V_{OUT}'>V_{UPPER}'$ is detected, the comparator 262 asserts the off signal $S_{OFF}$ (e.g., set to the high level).

The logic circuit 234 is configured as an SR flip-flop, for example. The logic circuit 234 switches its output Q to the on level (e.g., high level) in response to the assertion of the on signal $S_{ON}$. Furthermore, the logic circuit 234 switches its output Q to the off level (e.g., low level) in response to the assertion of the off signal $S_{OFF}$. It should be noted that the logic circuit 234 is preferably configured as a reset-priority flip-flop in order to set the switching converter to a safer state (i.e., off state of the switching transistor $M_1$) when the assertion of the on signal $S_{ON}$ and the assertion of the off signal $S_{OFF}$ occur at the same time.

A driver 232 drives the switching transistor $M_1$ according to the output Q of the logic circuit 234. As shown in FIG. 2, in a case in which the switching transistor $M_1$ is configured as a P-channel MOSFET, when the output Q is set to the on level, the control pulse $S_1$, which is configured as the output of the driver 232, is set to a low voltage ($V_{BAT}-V_G$). When the output Q is set to the off level, the control pulse $S_1$ is set to the high voltage ($V_{BAT}$).

Example 1.2

Figure 6:
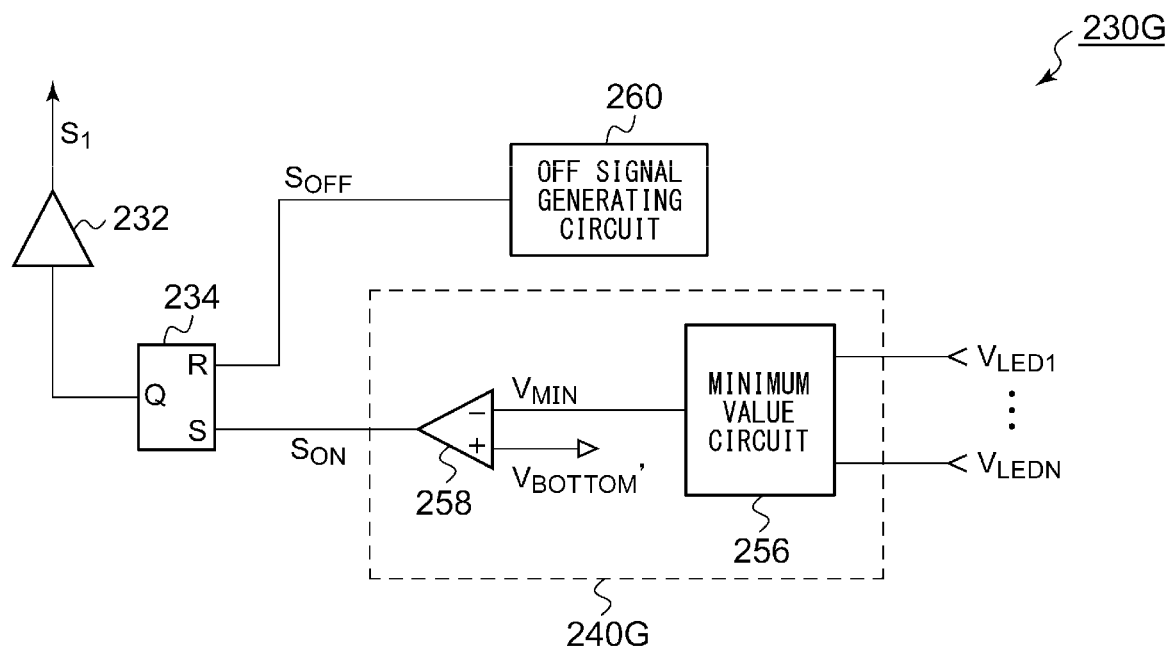
FIG. 6 is a circuit diagram showing a converter controller according to an example 1.2.

FIG. 6 is a circuit diagram showing a comparator controller 230G according to an example 1.2. An on signal generating circuit 240G includes a minimum value circuit 256 and a comparator 258. The minimum value circuit 256 outputs a voltage $V_{MIN}$ that corresponds to the minimum value from among the multiple cathode voltages $V_{LED1}$ through $V_{LEDN}$. The minimum value circuit 256 may preferably be configured using known techniques. The comparator 258 compares the voltage $V_{MIN}$ with a threshold value $V_{BOTTOM}'$ that corresponds to the bottom limit voltage $V_{BOTTOM}$. When the relation $V_{MIN}<V_{BOTTOM}'$ holds true, the comparator 258 asserts the on signal $S_{ON}$ (e.g., set to the high level).

With the example 1.1, in a case in which there are a large number of channels, the circuit area required by the comparator group is large and the chip size becomes large. In contrast, with the example 1.2, such an arrangement requires only a single comparator, thereby allowing the circuit area to be reduced.

Example 1.3

In-vehicle devices are configured to avoid electromagnetic noise bands, i.e., the LW band of 150 kHz to 280 kHz, the AM band of 510 kHz to 1710 kHz, and the SW band of 2.8 MHz to 23 MHz. Accordingly, the switching frequency of the switching transistor $M_1$ is preferably stabilized to a value on the order of 300 kHz to 450 kHz between the LW band and the AM band.

Figure 7:
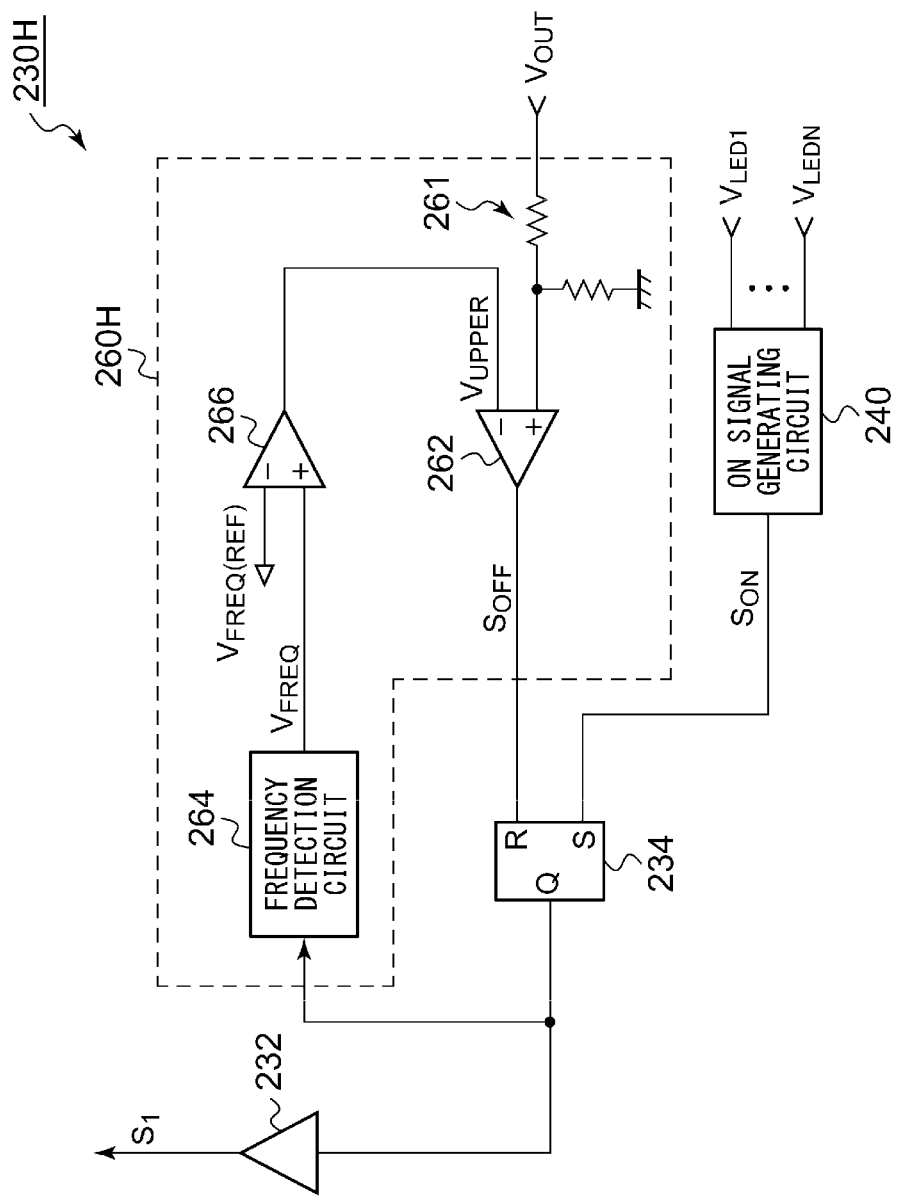
FIG. 7 is a circuit diagram showing a converter controller according to an example 1.3.

FIG. 7 is a circuit diagram showing a converter controller 230H according to an example 1.3. With this example, the upper limit voltage $V_{UPPER}$ is feedback controlled so as to maintain the switching frequency of the switching transistor $M_1$ at a constant value.

An off signal generating circuit 260H includes a frequency detection circuit 264 and an error amplifier 266 in addition to the comparator 262. The frequency detection circuit 264 monitors the output Q of the logic circuit 234 or the control pulse $S_1$, and generates a frequency detection signal $V_{FREQ}$ that indicates the switching frequency. The error amplifier 266 amplifies the difference between the frequency detection signal $V_{FREQ}$ and the reference voltage $V_{FREQ(REF)}$ that defines a target value of the switching frequency (target frequency), and generates the upper limit voltage $V_{UPPER}$ that corresponds to the difference thus amplified.

With the example 1.3, this arrangement is capable of stabilizing the switching frequency to a target value. This allows the noise countermeasures to be provided in a simple manner.

Example 1.4

Figure 8:
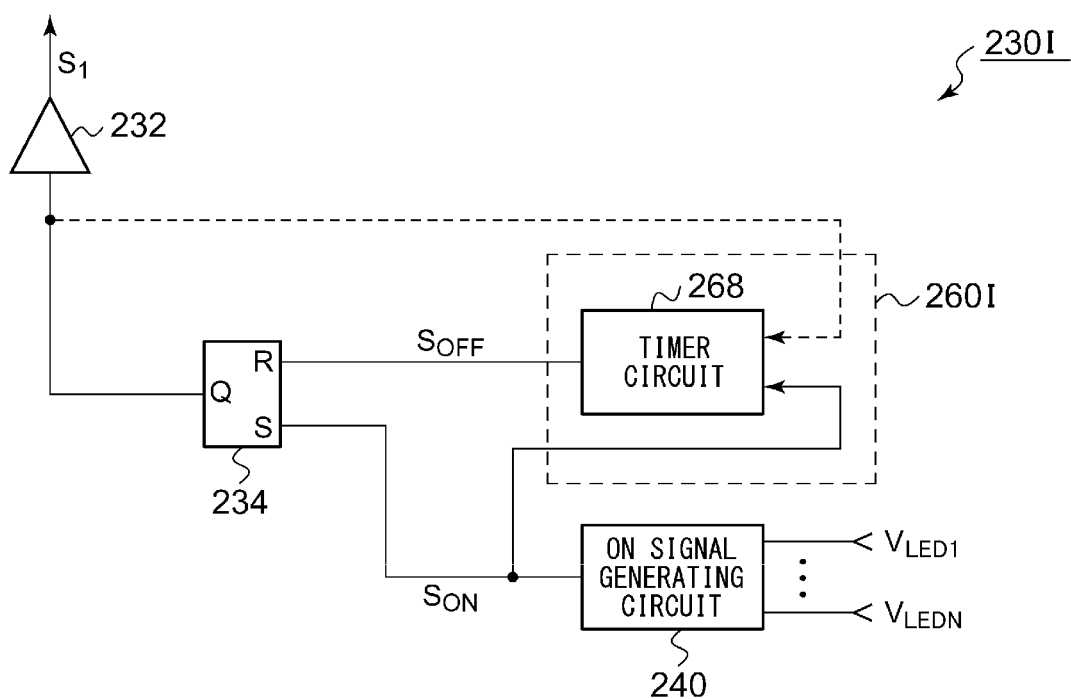
FIG. 8 is a circuit diagram showing a converter controller according to an example 1.4.

FIG. 8 is a circuit diagram showing a converter controller 230I according to an example 1.4. The converter controller 230I may turn off the switching transistor $M_1$ after the on time $T_{ON}$ elapses after the switching transistor $M_1$ is turned on. That is to say, as the turn-off condition, a condition that the on time $T_{ON}$ elapses after the switching transistor $M_1$ is turned off may be employed.

An off signal generating circuit 260I includes a timer circuit 268. The timer circuit 268 starts the measurement of the predetermined on time $T_{ON}$ in response to the on signal $S_{ON}$. After the on time $T_{ON}$ elapses, the timer circuit 268 asserts (e.g., sets to the high level) the off signal $S_{OFF}$. The timer circuit 268 may be configured as a monostable multivibrator (one-shot pulse generator), for example. Also, the timer circuit 268 may be configured as a digital counter or an analog timer. In order to detect the timing at which the switching transistor $M_1$ is turned on, the timer circuit 268 may receive the output Q of the logic circuit 234 or the control pulse $S_1$ as its input signal instead of the on signal $S_{ON}$.

Example 1.5

Figure 9:
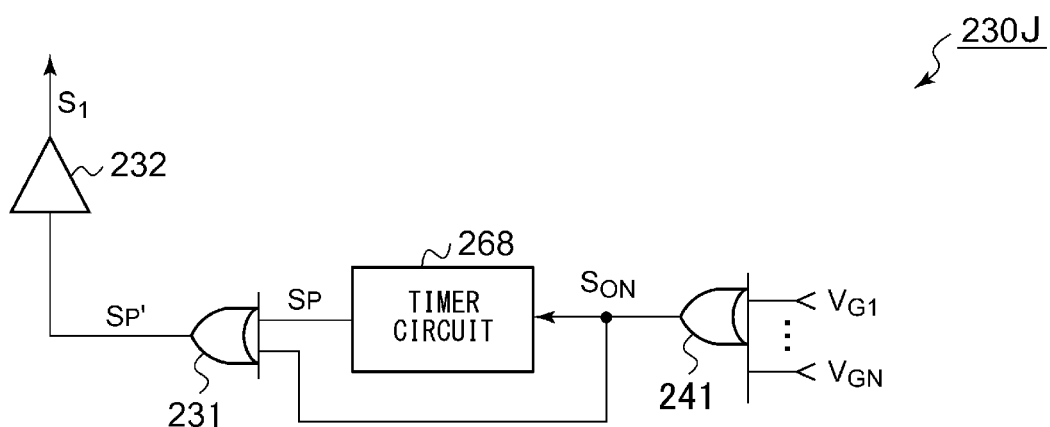
FIG. 9 is a circuit diagram showing a converter controller according to an example 1.5.

FIG. 9 is a circuit diagram showing a converter controller 230J according to an example 1.5. As with the example 1.4, the converter controller 230J turns off the switching transistor $M_1$ after the on time $T_{ON}$ elapses after the switching transistor $M_1$ is turned on. An OR gate 241 corresponds to the on signal generating circuit, and generates the on signal $S_{ON}$. The timer circuit 268 is configured as a monostable multivibrator or the like. The timer circuit 268 generates the pulse signal $S_P$ that is set to the high level for a predetermined on time $T_{ON}$ after the assertion of the on signal $S_{ON}$, and supplies the pulse signal $S_P$ to the driver 232. It should be noted that, giving consideration to a situation in which the voltages $V_{G1}$ through $V_{GN}$ are each lower than the threshold value of the OR gate 241 in the startup operation or the like, an OR gate 231 is provided as an additional component. With such an arrangement, the logical OR $S_P'$ of the on signal $S_{ON}$ and the output $S_P$ of the timer circuit 268 is supplied to the driver 232.

Example 1.6

Figure 10:
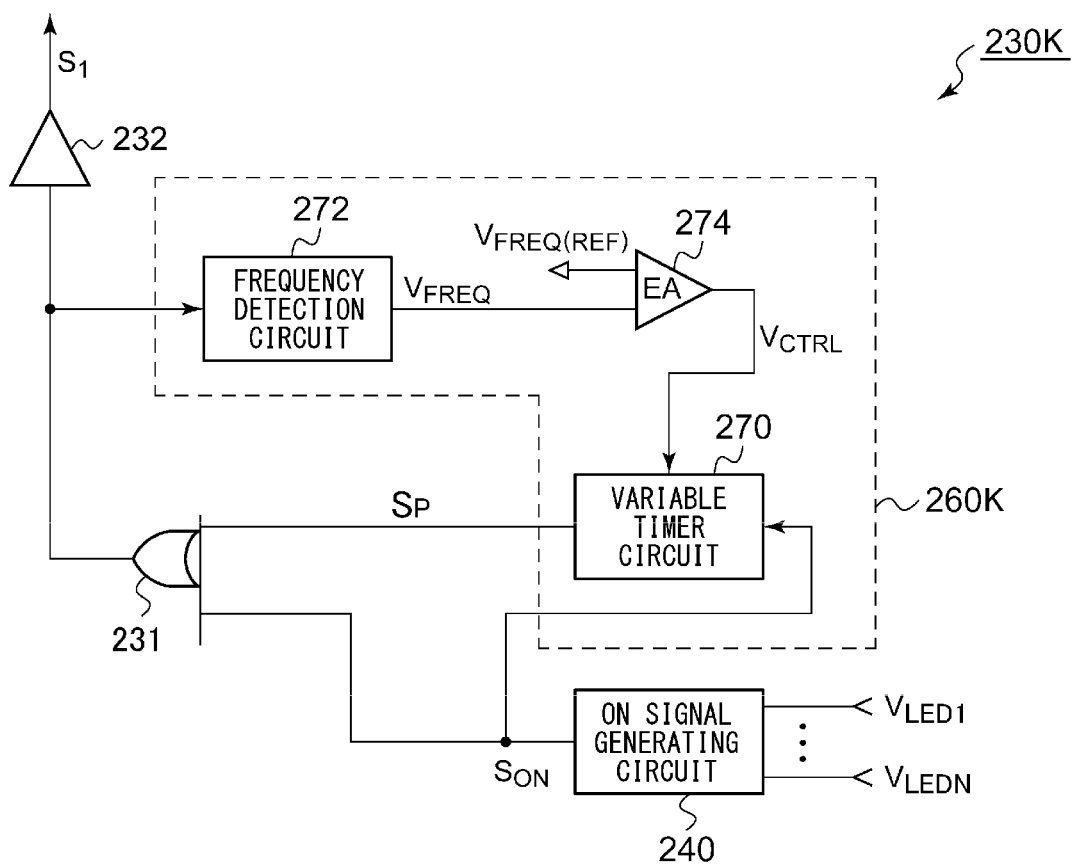
FIG. 10 is a circuit diagram showing a converter controller according to an example 1.6.

FIG. 10 is a circuit diagram showing a converter controller 230K according to an example 1.6. An off signal generating circuit 260K feedback controls the on time $T_{ON}$ so as to maintain the switching frequency at a constant value. A variable timer circuit 270 is configured as a monostable multivibrator that generates the pulse signal $S_P$ that is set to the high level during a period of the on time $T_{ON}$ after the assertion of the on signal $S_{ON}$. The variable timer circuit 270 is configured to change the on time $T_{ON}$ according to a control voltage $V_{CTRL}$.

For example, the variable timer circuit 270 may include a capacitor, a current source that charges the capacitor, and a comparator that compares the voltage across the capacitor with a threshold value. The variable timer circuit 270 is configured such that at least one from among the current amount generated by the current source and the threshold value can be changed according to the control voltage $V_{CTRL}$.

The frequency detection circuit 272 monitors the output Q of the logic circuit 234 or the control pulse $S_1$, and generates a frequency detection signal $V_{FREQ}$ that indicates the switching frequency. An error amplifier 274 amplifiers the difference between the frequency detection signal $V_{FREQ}$ and the reference voltage $V_{FREQ(REF)}$ that defines a target value of the switching frequency (target frequency), and generates the control voltage $V_{CTRL}$ that corresponds to the difference thus amplified.

With the example 1.6, this arrangement is capable of stabilizing the switching frequency to the target value, thereby allowing the noise countermeasures to be provided in a simple manner.

Figure 11:
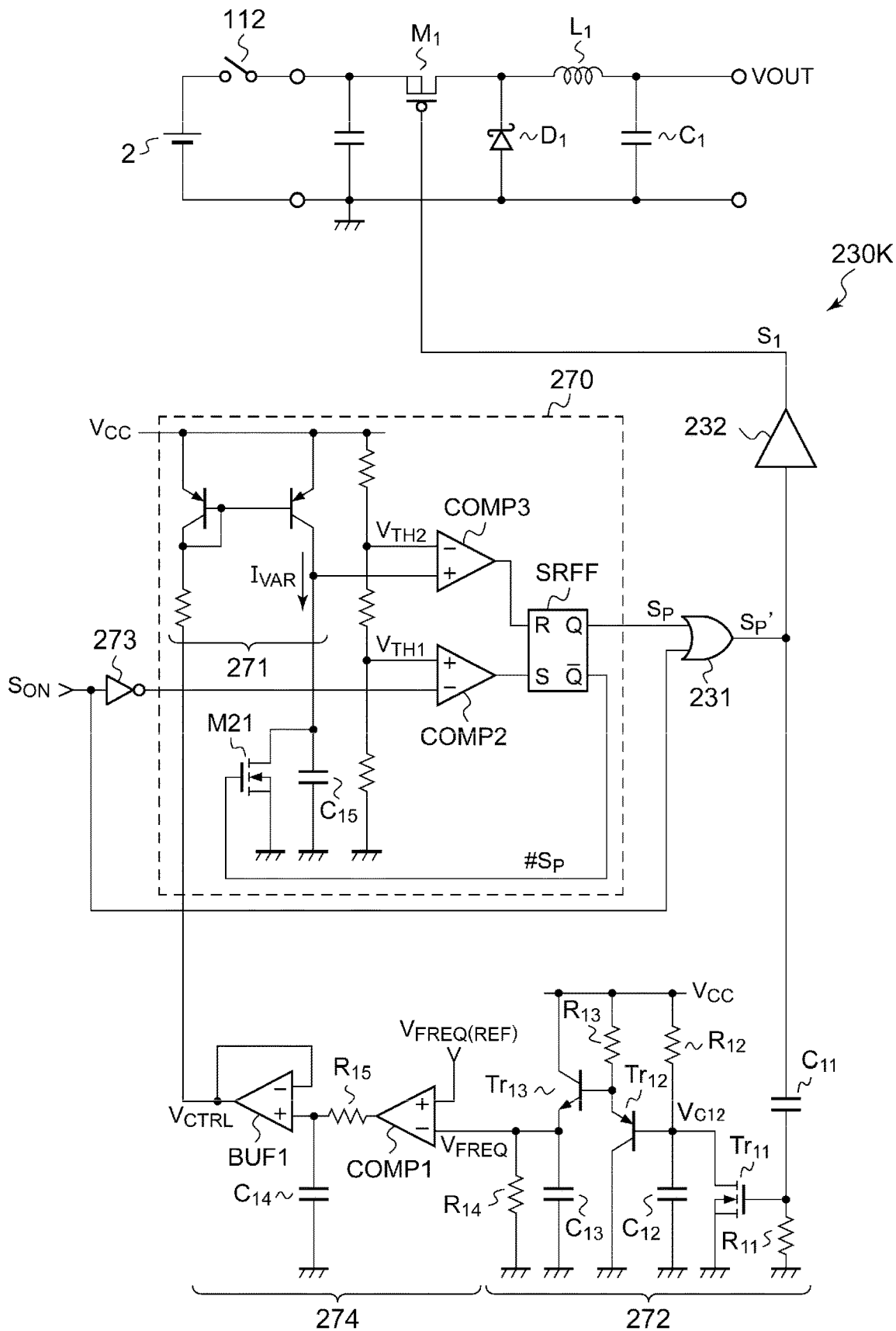
FIG. 11 is a circuit diagram showing a specific configuration of the converter controller shown in FIG. 10.

FIG. 11 is a circuit diagram showing a specific configuration of the converter control circuit 230K shown in FIG. 10. Description will be made regarding the operation of the frequency detection circuit 272. A combination of a capacitor $C_{11}$ and a resistor $R_{11}$ functions as a high-pass filter, which can be regarded as a differentiating circuit that differentiates the output of the OR gate 231 (or the control pulse $S_1$). Such a high-pass filter can also be regarded as an edge detection circuit that detects an edge of the pulse signal $S_P'$. When the output of the high-pass filter exceeds a threshold value, i.e., when a positive edge occurs in the pulse signal $S_P'$, a transistor $Tr_{11}$ turns on so as to discharge the capacitor $C_{12}$. During the off period of the transistor $Tr_{11}$, the capacitor $C_{12}$ is charged via a resistor $R_{12}$. The voltage $V_{C12}$ across the capacitor $C_{12}$ is configured as a ramp wave in synchronization with the pulse signal $S_P'$. The time length of the slope portion thereof, and the wave height that corresponds to the time length of the slope portion, change according to the period of the pulse signal $S_P'$.

A combination of the transistors $Tr_{12}$ and $Tr_{13}$, the resistors $R_{13}$ and $R_{14}$, and a capacitor $C_{13}$ is configured as a peak hold circuit. The peak hold circuit holds the peak value of the voltage $V_{C12}$ across the capacitor $C_{12}$. The output $V_{FREQ}$ of the peak hold circuit has a correlation with the period of the pulse signal $S_P'$, i.e., the frequency thereof.

A comparator COMP1 compares the frequency detection signal $V_{FREQ}$ with the reference signal $V_{FREQ(REF)}$ that indicates the target frequency. A combination of a resistor $R_{15}$ and a capacitor $C_{14}$ is configured as a low-pass filter. The low-pass filter smoothes the output of the comparator COMP1 so as to generate the control voltage $V_{CTRL}$. The control signal $V_{CTRL}$ is output via a buffer BUF1.

Description will be made regarding the variable timer circuit 270. The on signal $S_{ON}$ is inverted by an inverter 273. When the inverted on signal #$S_{ON}$ becomes lower than a threshold value $V_{TH1}$, i.e., when the on signal $S_{ON}$ is set to the high level, the output of a comparator COMP2 is set to the high level. This sets a flip-flop SREF, thereby setting the pulse signal $S_P$ to the high level.

During the high-level period of the pulse signal $S_P$, the transistor $M_{21}$ is turned off. During the off period of the transistor $M_{21}$, a current source 271 generates a variable current $I_{VAR}$ that corresponds to the control voltage $V_{CTRL}$ so as to charge a capacitor $C_{15}$. When the voltage $V_{C15}$ across the capacitor $C_{15}$ reaches a threshold value $V_{TH2}$, the output of the comparator COMP3 is set to the high level. This resets the flip-flop SREF, thereby switching the pulse signal $S_P$ to the low level. As a result, the transistor $M_{21}$ is turned on, thereby initializing the voltage $V_{C15}$ of the capacitor $C_{15}$.

Figure 12:
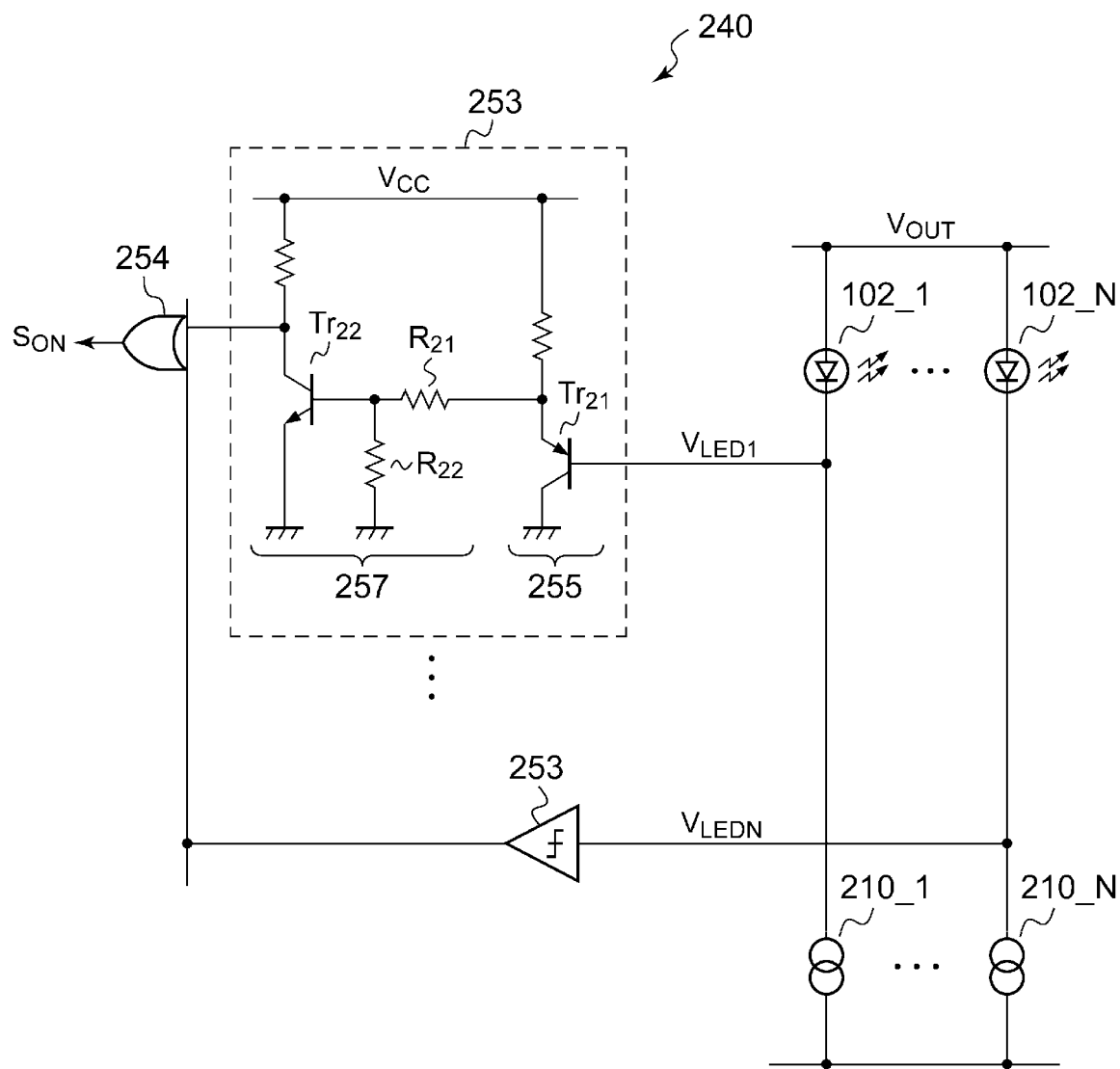
FIG. 12 is a circuit diagram showing a modification of an on signal generating circuit.

FIG. 12 is a circuit diagram showing a modification of the on signal generating circuit 240. In a case in which the comparator 252 is employed as shown in FIG. 5, this arrangement supports high-precision voltage comparison. However, such an arrangement has a tradeoff problem of a large circuit area and high costs. In order to solve such a problem, as shown in FIG. 12, a voltage comparison unit having a simple configuration including a transistor may be employed. A voltage comparison unit 253 includes a source follower 255 including a PNP bipolar transistor $Tr_{21}$ and a comparison circuit 257. The output $(V_{LED}+V_{BE})$ of the source follower 255 configured as an upstream stage is voltage divided by means of resistors $R_{21}$ and $R_{22}$, and then input to the base of a transistor $Tr_{22}$. When the voltage $V_{LED}$ to be monitored decreases, the base voltage of the transistor $Tr_{22}$ decreases. When the base voltage becomes lower than the on voltage of the bipolar transistor, the current that flows through the transistor $Tr_{22}$ is cut off, which sets the output of the voltage comparison unit 253 to the high level.

FIG. 12 shows an example in which the outputs of the multiple voltage comparison units 253 are input to the OR gate 254. However, the present invention is not restricted to such an example. Also, such an OR gate 254 may be omitted. With such an arrangement, the collectors of the transistors $Tr_{22}$ of the multiple voltage comparison units 253 may be coupled so as to form a common collector. Also, a common resistor may be provided between the common collector and the power supply line $V_{CC}$.

Figure 13A:
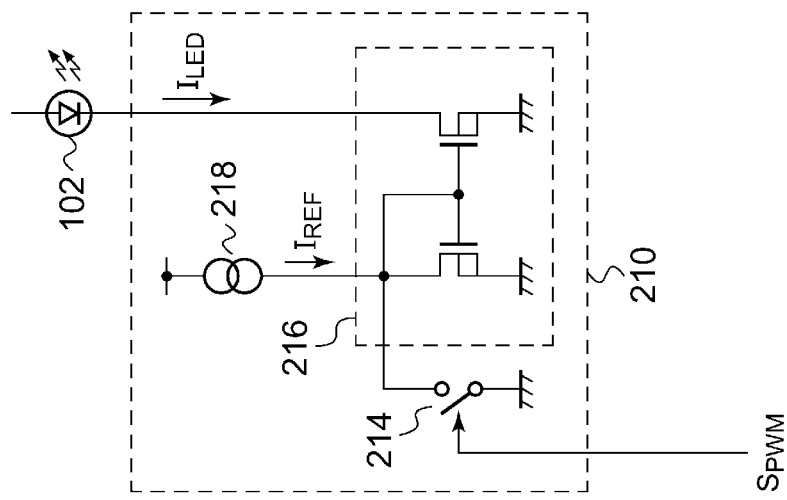
FIGS. 13A through 13C are circuit diagrams each showing an example configuration of a current source.
Figure 13B:
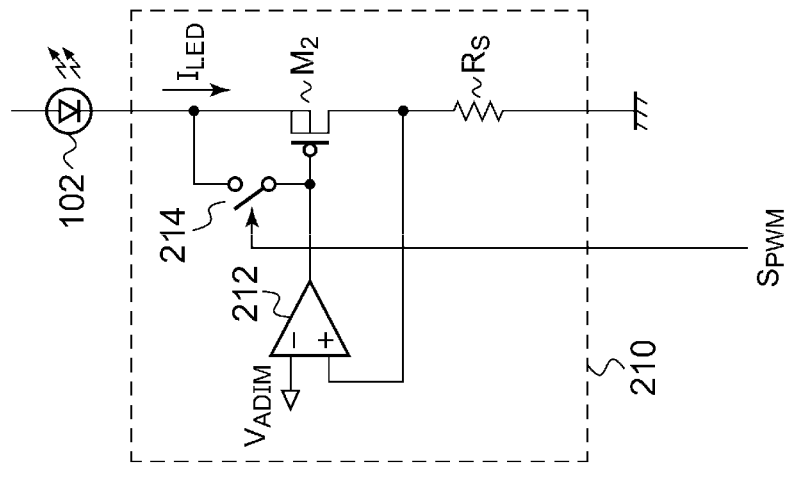
Figure 13C:
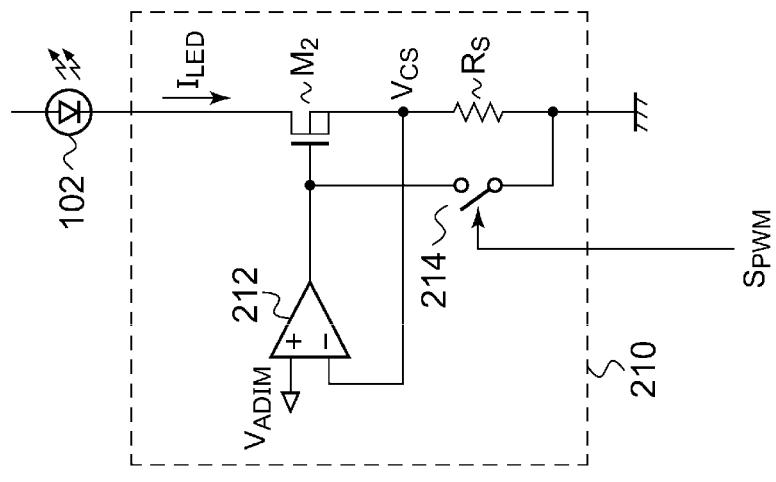

FIGS. 13A through 13C are circuit diagrams each showing an example configuration of the current source 210. The current source 210 shown in FIG. 13A includes a series transistor $M_2$, a sensing resistor $R_S$, and an error amplifier 212. The series transistor $M_2$ and the sensing resistor $R_S$ are provided in series on a path of the driving current $I_{LEDi}$. The error amplifier 212 adjusts the voltage $V_G$ at a control electrode (gate in this example) of the series transistor $M_2$ such that the voltage drop $V_{CS}$ that occurs across the sensing resistor $R_S$ approaches a target voltage $V_{ADIM}$. In this example, the series transistor $M_2$ is configured as an N-type (N-channel) MOS transistor. The error amplifier 212 is arranged such that the reference voltage $V_{ADIM}$ is input to one input thereof (non-inverting input terminal) and such that the voltage $V_{CS}$ (voltage drop that occurs across the sensing resistor $R_S$) at a connection node that couples the series transistor $M_2$ and the sensing resistor $R_S$ is input to the other input thereof (inverting input terminal). The error amplifier 212 provides feedback control such that $V_{CS}$ approaches $V_{ADIM}$, thereby stabilizing the driving current $I_{LED}$ with $I_{LED}=V_{ADIM}/R_S$ as its target value.

The current source 210 further includes a switch (dimming switch) 214 for PWM dimming. The dimming switch 214 is controlled according to a PWM signal $S_{PWM}$ generated by the dimming controller 116. When the dimming switch 214 is turned off, the driving current $I_{LED}$ flows through the current source 210. When the dimming switch 214 is turned on, the series transistor $M_2$ is turned off, which disconnects the driving current $I_{LED}$. The dimming switch 214 is switched at a high speed at a PWM frequency of 60 Hz or more (preferably, on the order of 200 to 300 Hz). Furthermore, by adjusting the duty cycle of the PWM frequency, the semiconductor light source 102 is subjected to PWM dimming control.

In the current source 210 shown in FIG. 13B, the series transistor is configured as a P-channel MOSFET. The error amplifier 212 is configured to have a polarity that is the reverse of that shown in FIG. 13A.

In a case of employing the current source 210 shown in FIG. 13A or 13B, the bottom limit voltage $V_{BOTTOM}$ may preferably be determined as represented by the following Expression. Here, $\Delta V$ represents an appropriate margin.

$$V_{BOTTOM}=R_S \times I_{LED}+V_{SAT}+\Delta V$$

The current source 210 shown in FIG. 13C includes a current mirror circuit 216 and a reference current source 218. The current mirror circuit 216 multiplies the reference current $I_{REF}$ generated by the reference current source 218 by a predetermined coefficient determined by a mirror ratio, so as to generate the driving current $I_{LED}$. In a case of employing the current source 210 shown in FIG. 13C, the bottom limit voltage $V_{BOTTOM}$ may preferably be determined as represented by the following Expression.

$$V_{BOTTOM}=V_{SAT}+\Delta V$$

Here, $V_{SAT}$ represents the saturation voltage of the current mirror circuit, and $\Delta V$ represents an appropriate margin.

Embodiment 2

Description has been made in the embodiment 1 regarding an arrangement in which the bottom limit voltage is fixed. In this case, in some cases, such an arrangement has a problem of a reduction in the switching frequency in a light load state in which the number of the turned-on light sources 102 becomes small.

Figure 14A:
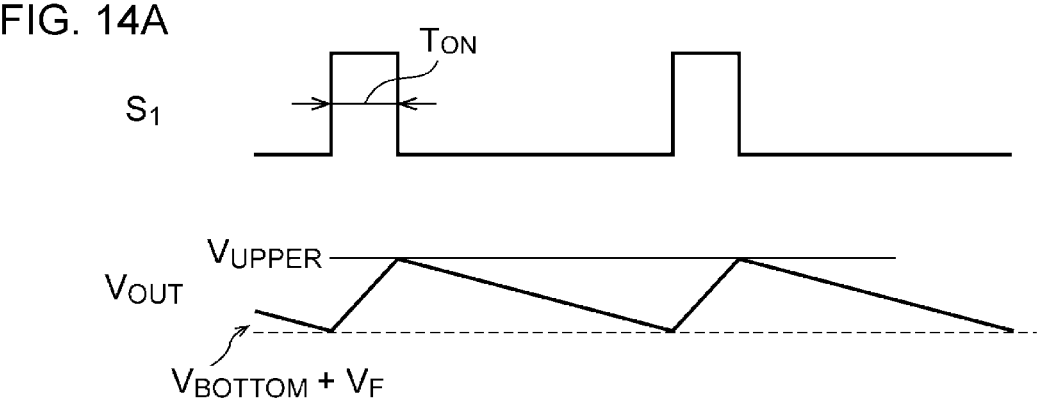
FIG. 14A through 14C are diagrams for explaining a reduction in the switching frequency in a light load state.
Figure 14B:
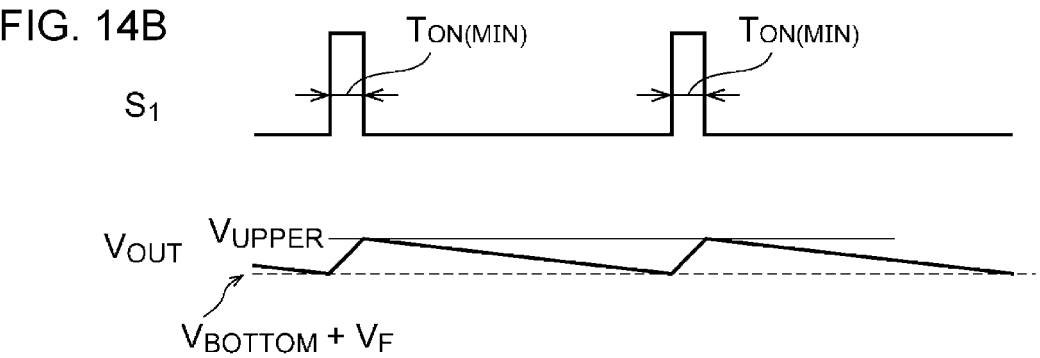
Figure 14C:
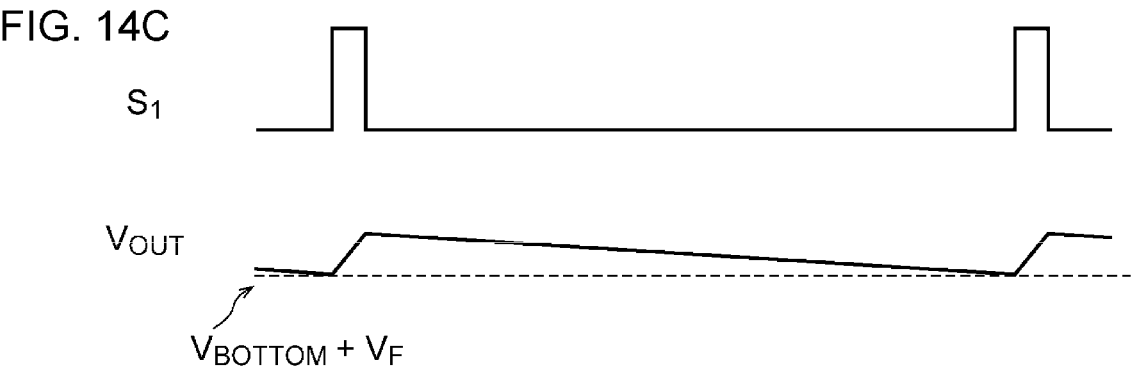

FIGS. 14A through 14C are diagrams for explaining the reduction in the switching frequency in the light load state. As shown in FIGS. 14A and 14B, with the examples shown in FIGS. 7 and 8, the on time $T_{ON}$ or the upper limit $V_{UPPER}$ of the output voltage $V_{OUT}$ is feedback controlled so as to stabilize the frequency.

However, in a case in which the pulse width of the control pulse $S_1$ is excessively narrowed, such an arrangement is not able to turn on the switching transistor $M_1$. Accordingly, such an arrangement is not capable of shortening the pulse width of the control pulse $S_1$ such that it is smaller than a particular minimum pulse width. In other words, in the light load state, the pulse width of the control pulse $S_1$ is fixed to the minimum pulse width (FIG. 14C). The angle of the downward slope of the output voltage $V_{OUT}$ corresponds to the load current, i.e., the number of the turned-on semiconductor light sources 102. In a state in which the number of turned-on semiconductor light sources 102 becomes small, the slope of the downward slope becomes smaller, which lowers the switching frequency. Accordingly, even in a case of supporting the frequency stabilizing control operation, such an arrangement has the potential to cause a situation in which the switching frequency is set to a value in the LW band.

In order to solve such a problem, with the embodiment 2, the bottom limit voltage $V_{BOTTOM}$ is dynamically controlled according to the load state so as to suppress the reduction in the switching frequency.

Figure 15:
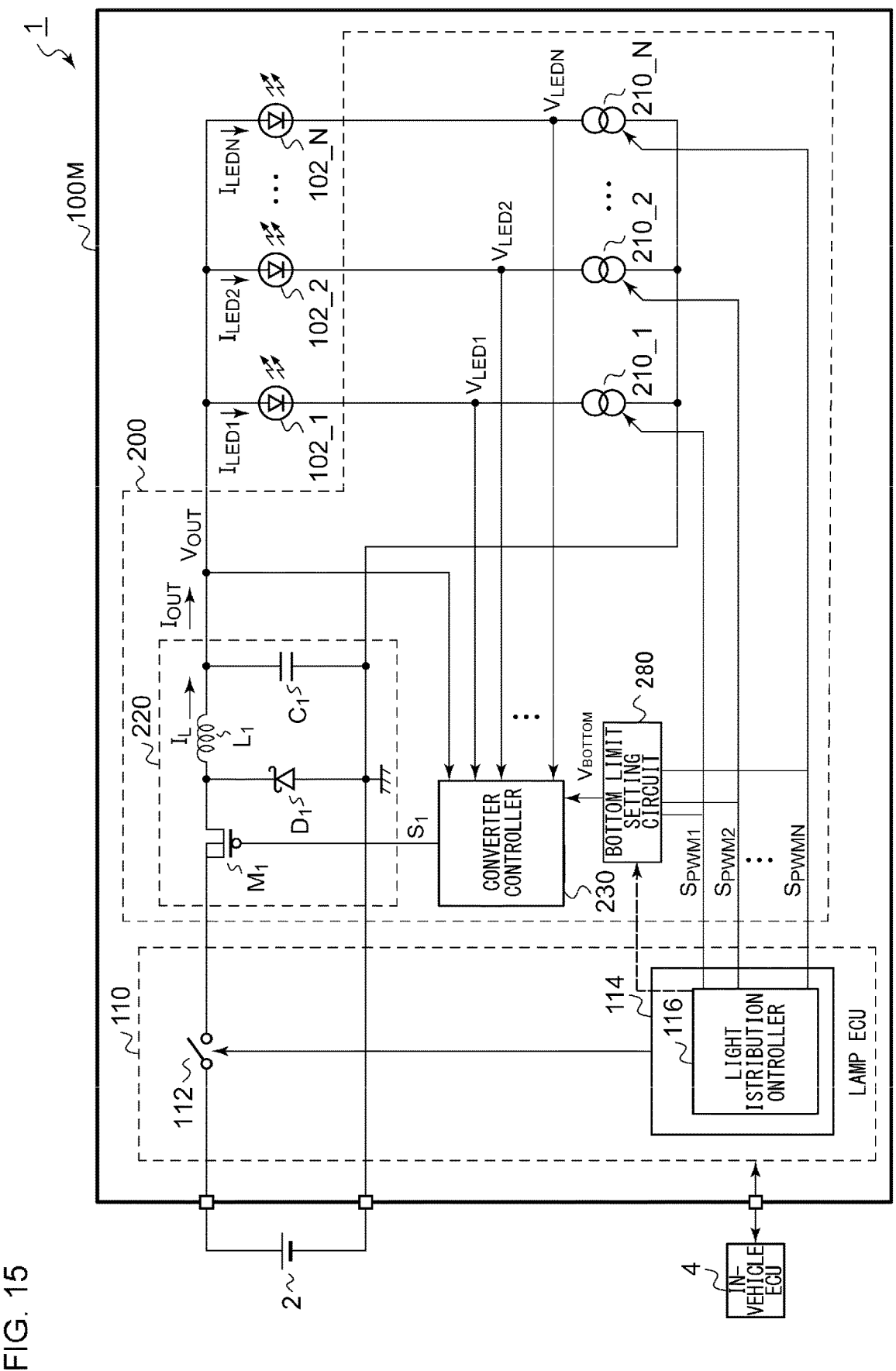
FIG. 15 is a block diagram showing an automotive lamp according to an embodiment 2.

FIG. 15 is a block diagram showing an automotive lamp 100M according to the embodiment 2. The automotive lamp 100M further includes a bottom limit voltage setting circuit 280 in addition to the configuration of the automotive lamp 100 shown in FIG. 2. The bottom limit voltage setting circuit 280 raises the bottom limit voltage $V_{BOTTOM}$ according to a reduction in the number of the on-state current sources from among the multiple current sources 210. The bottom limit voltage $V_{BOTTOM}$ may be changed in two steps in a stepwise manner. Also, the bottom limit voltage $V_{BOTTOM}$ may be changed in three or more steps in a stepwise manner.

For example, the bottom limit voltage setting circuit 280 may judge the number of the turned-on light sources based on the PWM signals $S_{PWM1}$ through $S_{PWMN}$ generated by the light distribution controller 116. Also, the bottom limit voltage setting circuit 280 receives, from the microcontroller 114, a signal that indicates the number of the turned-on light sources or an instruction value that indicates the bottom limit voltage $V_{BOTTOM}$ determined based on the number of the turned-on light sources. Also, with an arrangement described later with reference to FIG. 21, the number of the turned-on light sources may be judged based on a signal received by an interface circuit 320.

The configuration of the converter controller 230 is not restricted in particular. That is to say, the converter controller 230 may have any one from among the configurations described above.

Figure 16:
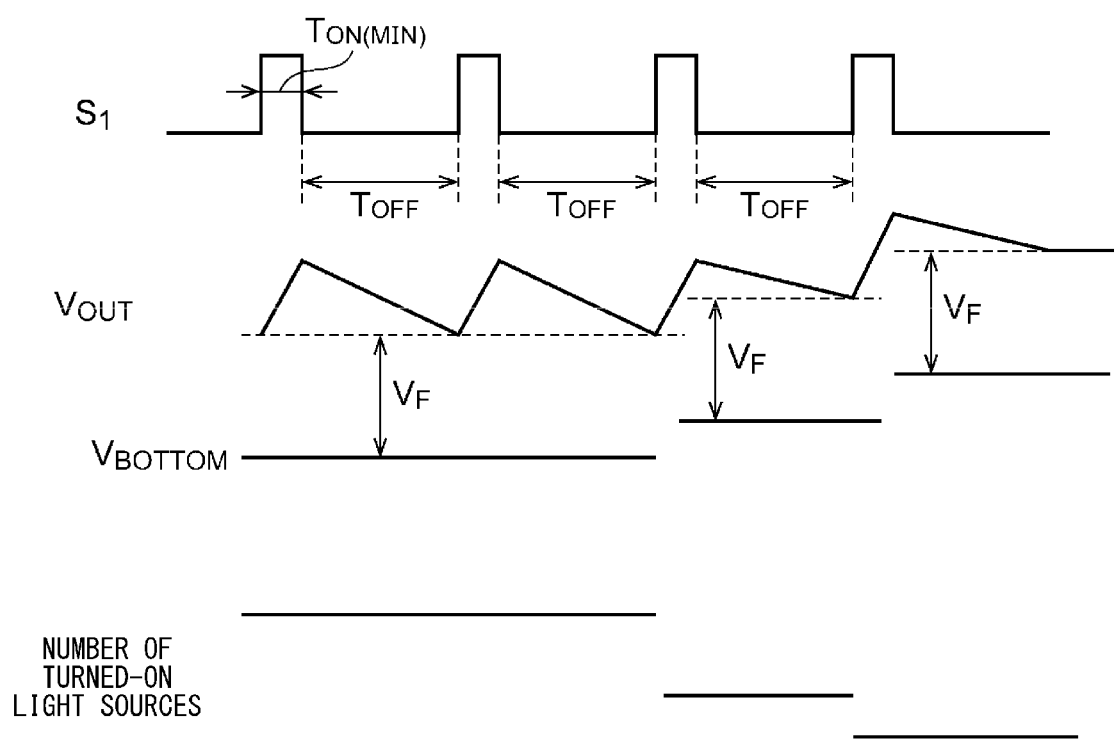
FIG. 16 is an operation waveform diagram showing the operation of the automotive lamp shown in FIG. 15.

FIG. 16 is an operation waveform diagram showing the operation of the automotive lamp 100M shown in FIG. 15. When the number of the turned-on light sources becomes small, and accordingly, when the load current becomes small, the downward slope of the output voltage $V_{OUT}$ becomes flat. The bottom limit voltage $V_{BOTTOM}$ is raised so as to raise the lower limit voltage of the output voltage $V_{OUT}$ according to the reduction of the slope angle, thereby suppressing an increase in the off time $T_{OFF}$.

In the light load state, this arrangement is capable of preventing the switching frequency from becoming excessively low. It should be noted that, in a case in which the bottom limit voltage $V_{BOTTOM}$ is raised, this involves an increase in heat generation in the current source 210. However, the number of the on-state current sources 210 becomes smaller. Accordingly, the increase in the sum total of the heat generation does not become a problem. Description has been made with reference to FIG. 16 regarding an arrangement in which the bottom limit voltage $V_{BOTTOM}$ is changed such that the switching frequency is maintained at a substantially constant level. However, the present invention is not restricted to such an arrangement. Also, such an arrangement may involve the change in the switching frequency so long as the switching frequency is set to a value outside the band that causes a noise problem.

Embodiment 3

Figure 17:
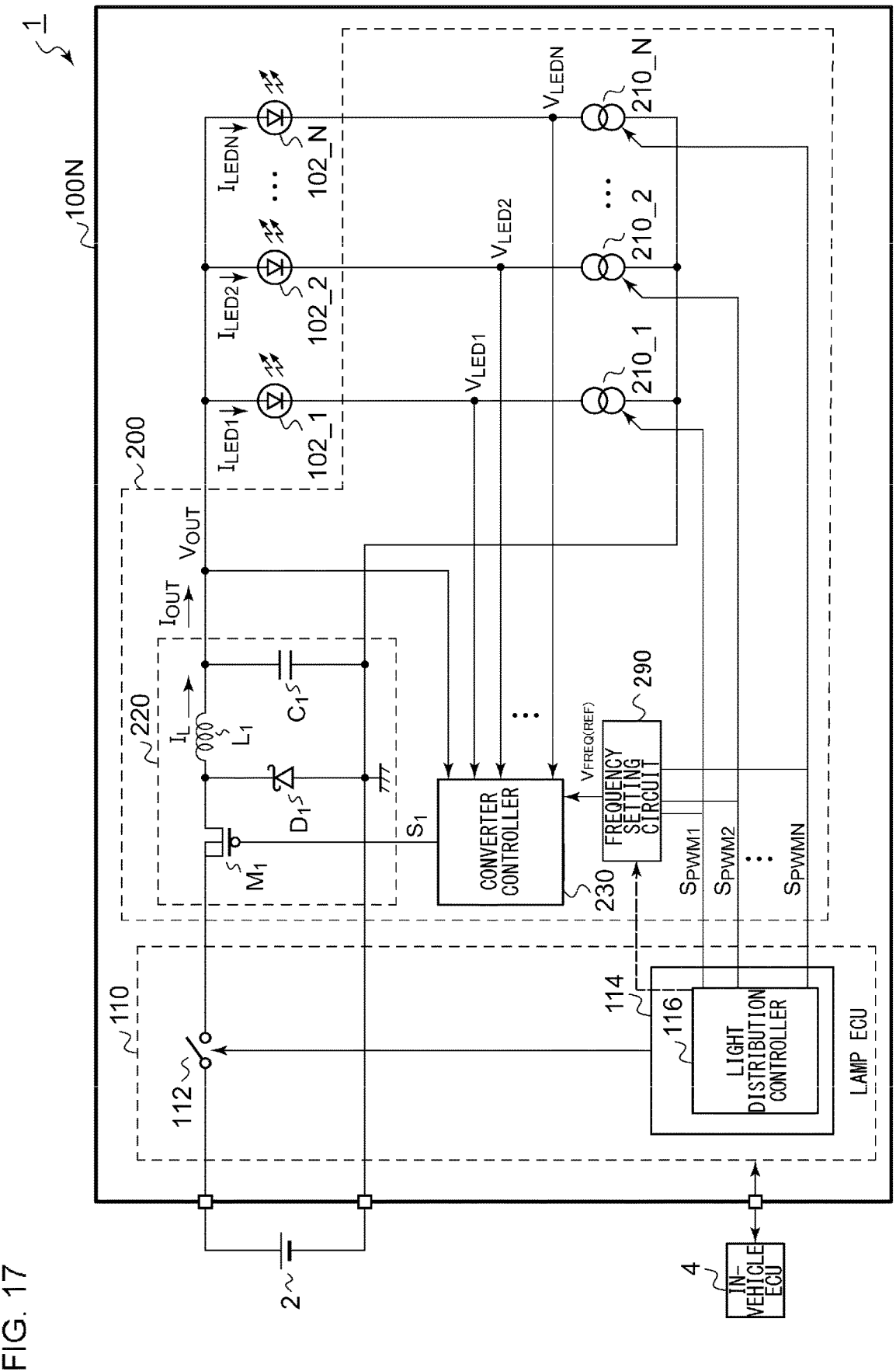
FIG. 17 is a block diagram showing an automotive lamp according to an embodiment 3.

FIG. 17 is a block diagram showing an automotive lamp 100N according to an embodiment 3. The automotive lamp 100N further includes a frequency setting circuit 290 in addition to the configuration of the automotive lamp 100 shown in FIG. 2. In this embodiment, the converter controller 230 is provided with a frequency stabilizing function. Accordingly, the converter controller 230 may be configured as the converter controller 230H shown in FIG. 7 or the converter controller 230J shown in FIG. 10.

The frequency setting circuit 290 changes the target frequency according to the number of the on-state current sources (the number of turned-on light sources) from among the multiple current sources 210. More specifically, when the number of the on-state current sources becomes smaller than a predetermined threshold value, judgment is made that the light load state has been detected. In this state, the frequency setting circuit 290 sets the target frequency to a different frequency value that is lower than the original target frequency and does not belong to a particular band defined as an electromagnetic noise band. In a case in which, in the normal state, the target frequency is set to a frequency value of 300 kHz to 450 kHz between the LW band and AM band, when the operating state becomes the light load state, the target frequency may preferably be set to a band (e.g., 100 kHz) that is lower than the LW band and that is higher than the audible band.

With an arrangement shown in FIG. 7 or 10, the target frequency is determined based on the reference voltage $V_{FREQ(REF)}$. Accordingly, in a state in which the number of the turned-on light sources is smaller than a predetermined threshold, the frequency setting circuit 290 may preferably reduce the reference voltage $V_{FREQ(REF)}$.

With the embodiment 3, when the frequency is lowered in the light load state, such an arrangement is capable of maintaining the frequency such that it is outside the frequency range that causes an electromagnetic noise problem that is to be avoided.

Embodiment 4

Figure 18:
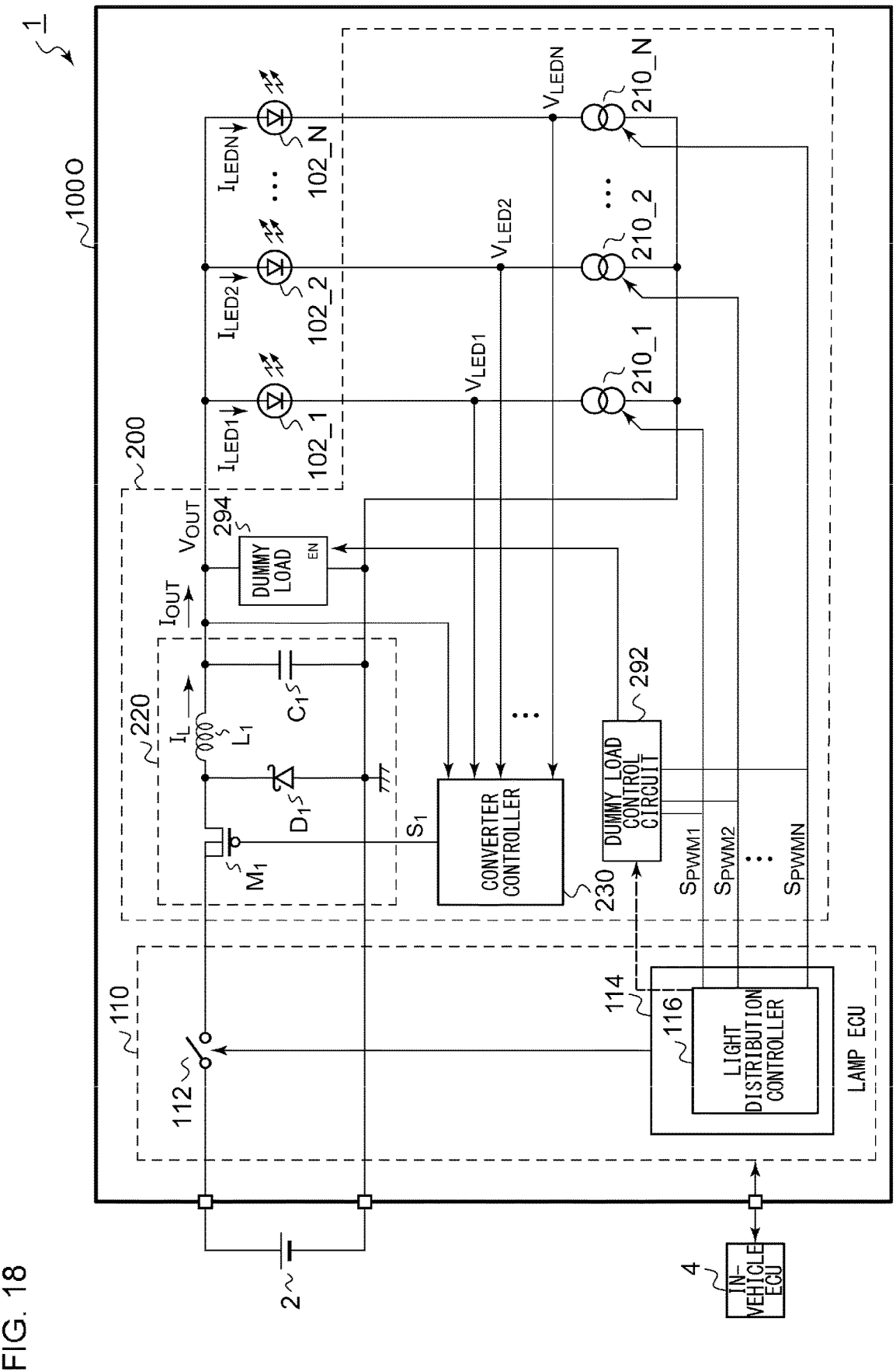
FIG. 18 is a block diagram showing an automotive lamp according to an embodiment 4.

FIG. 18 is a block diagram showing an automotive lamp 100O according an embodiment 4. The automotive lamp 100O further includes a dummy load 292 and a dummy load control circuit 294 in addition to the configuration of the automotive lamp 100 shown in FIG. 2.

The dummy load 292 is coupled to the output of the switching converter 220. In the enable state, the dummy load 292 discharges the capacitor $C_1$ of the switching converter 220 so as to lower the output voltage $V_{OUT}$. The dummy load control circuit 294 controls the enable/disable state of the dummy load 292 based on the number of the on-state current sources from among the multiple current sources.

The dummy load 292 includes a switch configured as a transistor arranged between the output of the switching converter 220 and the ground. After a predetermined time t elapses from the turning-off of the switching transistor $M_1$, the dummy load control circuit 294 asserts (sets to the high level, for example) the enable signal EN, so as to turn on the switch of the dummy load 292.

Figure 19:
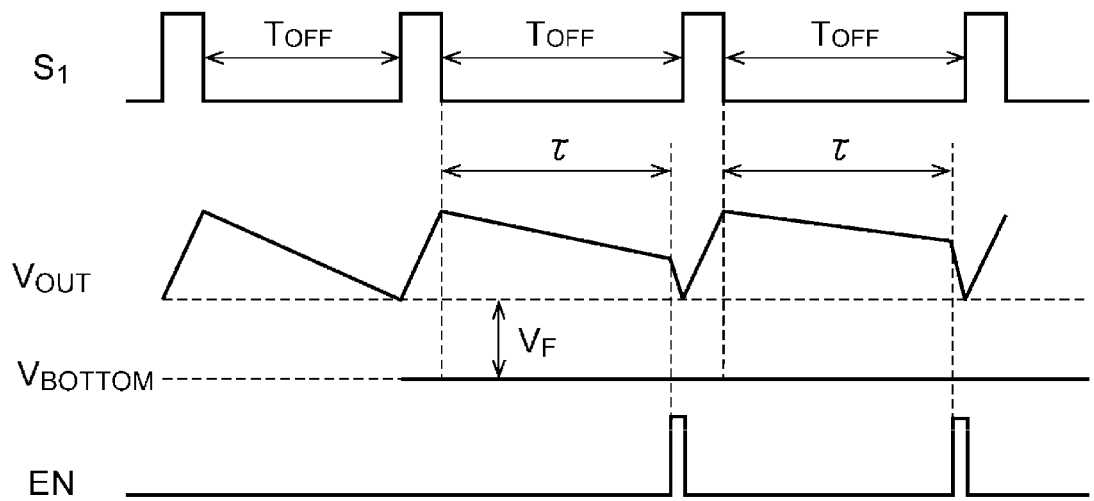
FIG. 19 is an operation waveform diagram showing the operation of the automotive lamp shown in FIG. 18.

FIG. 19 is an operation waveform diagram showing the operation of the automotive lamp 100O shown in FIG. 18. When the operating state becomes the light load state, the enable signal EN is asserted for each cycle, which immediately decreases the output voltage $V_{OUT}$. Subsequently, when the output voltage $V_{OUT}$ decreases to a voltage level that corresponds to the bottom limit voltage $V_{BOTTOM}$, the control pulse $S_1$ is set to the high level. That is to say, the upper limit of the off time $T_{OFF}$ of the switching transistor $M_1$ is limited by the predetermined period τ. This restricts the reduction in the switching frequency in the light load state.

The dummy load 292 may be configured as a constant current source that is capable of switching its state between the on state and the off state. Also, the dummy load 292 may be configured as a combination of switches and resistors.

Embodiment 5

Description will be made with reference to FIG. 2. Typically, there is a tradeoff relation between the on resistance and the breakdown voltage of a transistor. When overshoot occurs in the output voltage $V_{OUT}$ of the switching converter, this raise the voltage applied to a transistor that forms each current source 210. Accordingly, there is a need to configure each current source 210 using a high-breakdown-voltage element. However, such a high-breakdown-voltage element has a large on resistance $R_{ON}$. Accordingly, such an arrangement requires the bottom limit voltage $V_{BOTTOM}$ to be set to a high value. This leads to problems of large power consumption and large heat generation.

Figure 20:
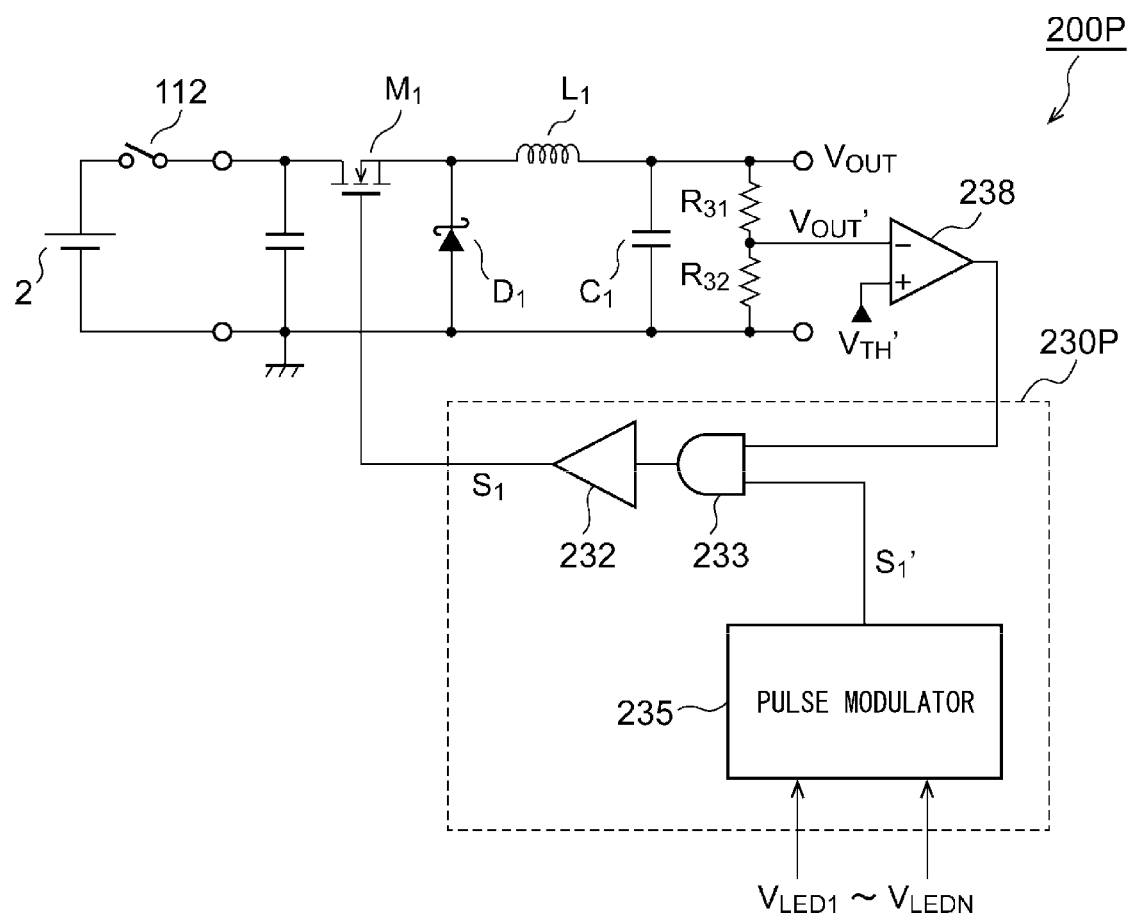
FIG. 20 is a circuit diagram showing a lighting circuit according to an embodiment 5.

FIG. 20 is a circuit diagram showing a lighting circuit 200P according to an embodiment 5. When the driving voltage $V_{OUT}$ exceeds a predetermined threshold value $V_{TH}$, the lighting circuit 200P forcibly turns off the switching transistor $M_1$. The lighting circuit 200P includes resistors $R_{31}$ and $R_{32}$, and a voltage comparator 238. The voltage comparator 238 compares the driving voltage $V_{OUT}'$ divided by the resistors $R_{31}$ and $R_{32}$ with a threshold value $V_{TH}'$, so as to detect the occurrence of an overvoltage state in the driving voltage $V_{OUT}$.

The converter controller 230P includes a pulse modulator 235, a logic gate 233, and a driver 232. The pulse modulator 235 has the same configuration as those of the converter controllers 230F through 230K respectively shown in FIGS. 7 through 10 except for the driver 232. The pulse modulator 235 generates the control pulse $S_1'$. When the output $S_2$ of the voltage comparator 238 indicates the relation $V_{OUT}'<V_{TH}'$, the logic gate 233 allows the control pulse $S_1'$ to pass through as it is. Conversely, when the output $S_2$ of the voltage comparator 238 indicates the relation $V_{OUT}'>V_{TH}'$, the logic gate 233 forcibly sets the level of the control pulse $S_1'$ to a level that turns off the switching transistor $M_1$. In this example, the switching transistor $M_1$ is configured as an N-channel MOSFET. When $S_1$ is set to the low level, the switching transistor $M_1$ is set to the off state. When $V_{OUT}'>V_{TH}'$, the output $S_2$ of the voltage comparator 238 is set to the low level. The logic gate 233 is configured as an AND gate.

With the present embodiment, the current source 210 is configured using a transistor having a low on resistance, thereby allowing power consumption to be reduced. As a tradeoff, such an arrangement involves such a transistor having a low breakdown voltage. However, when an overshoot occurs in the output voltage $V_{OUT}$ of the switching converter, the switching transistor $M_1$ is immediately suspended. Such an arrangement is capable of preventing an overvoltage from being applied to the transistor of the current source (e.g., the transistor $M_2$ shown in FIGS. 13A and 13B, the output-side transistor of the current mirror circuit 216 shown in FIG. 13C).

Integrated-Driver Light Source

Figure 21:
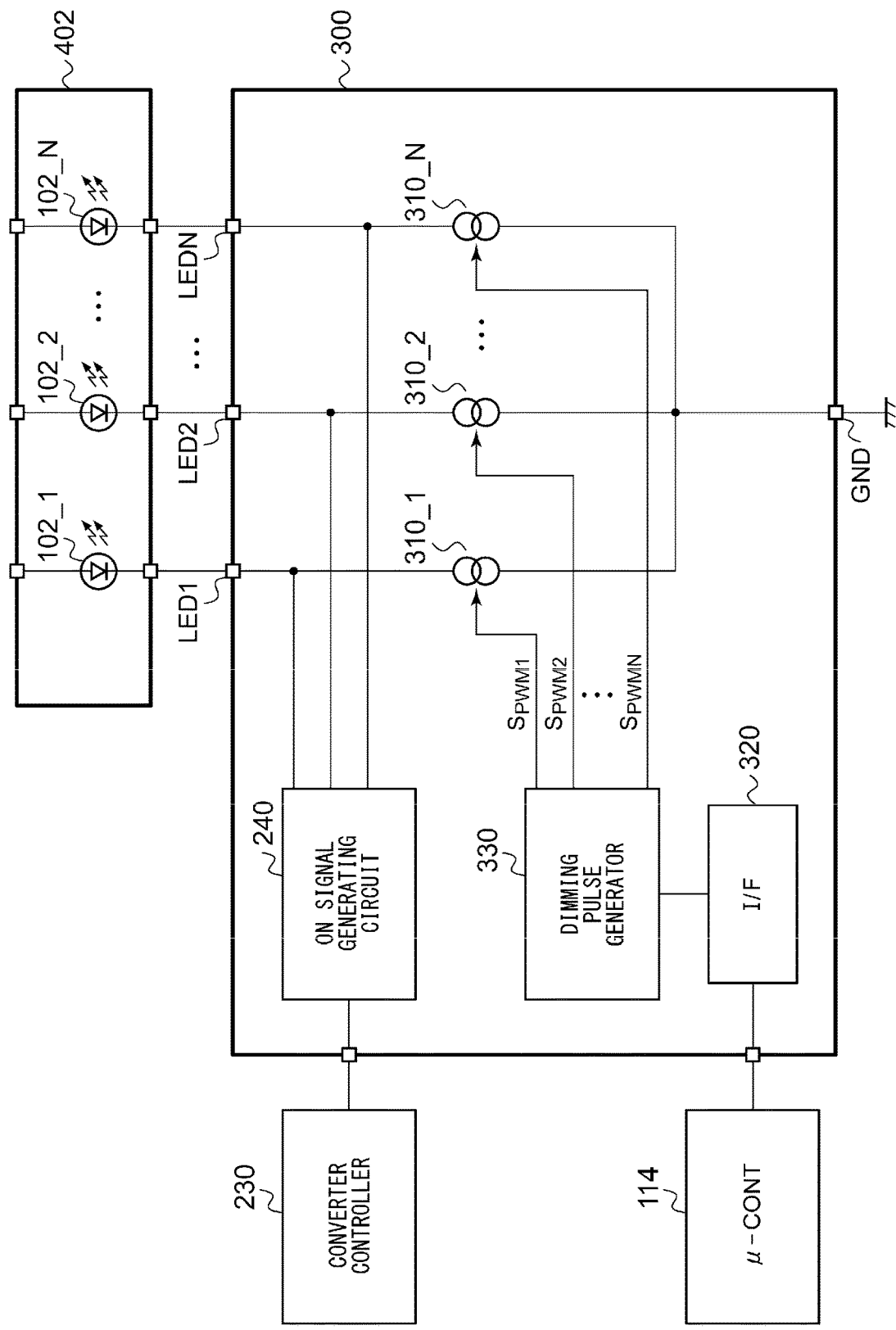
FIG. 21 is a circuit diagram showing a current driver IC and a peripheral circuit thereof according to an embodiment.

Next, description will be made regarding a light source with an integrated driver. The multiple current sources 210 may be integrated on a single semiconductor chip, which will be referred as a "current driver IC (Integrated Circuit)" hereafter. FIG. 21 is a circuit diagram showing a current driver IC 300 and a peripheral circuit thereof according to the embodiment. In addition to multiple current sources 310_1 through 310_N, the current driver IC 300 includes an interface circuit 320 and a dimming pulse generator 330.

The multiple current sources 310_1 through 310_N are configured to switch independently between the on state and the off state according to PWM signals $S_{PWM1}$ through $S_{PWMN}$, respectively. The current sources 310_1 through 310_N are respectively coupled to the corresponding semiconductor light sources 102_1 through 102_N in series via cathode pins LED1 through LEDN.

The interface circuit 320 receives multiple control data $D_1$ through $D_N$ from an external microcontroller (processor 114). The kind of the interface is not restricted in particular. For example, an SPI (Serial Peripheral Interface) or I²C interface may be employed. The multiple control data $D_1$ through $D_N$ respectively indicate the on/off duty cycles of the multiple current sources 310_1 through 310_N, which are updated at a first time interval $T_1$. The first time interval $T_1$ is set to on the order of 20 ms to 200 ms. For example, the first time interval $T_1$ is set to 100 ms.

The dimming pulse generator 330 generates the multiple PWM signals $S_{PWM1}$ through $S_{PWMN}$ for the multiple current sources 310_1 through 310_N based on the multiple control data $D_1$ through $D_N$. In the embodiment described with reference to FIG. 2, the microcontroller 114 generates the multiple PWM signals $S_{PWM1}$ through $S_{PWMN}$. In the embodiment 2, the current driver IC 300 has a built-in function of generating the multiple PWM signals $S_{PWM1}$ through $S_{PWMN}$.

The duty cycle of the i-th PWM signal $S_{PWMi}$ is gradually changed at a second time interval $T_2$ that is shorter than the first time interval $T_1$ from the corresponding control data $D_i$ value before updating to the updated value thereof (which will be referred to as the "gradual-change mode"). The second time interval $T_2$ is set to a value on the order of 1 ms to 10 ms. For example, the second time interval $T_2$ is set to 5 ms.

The dimming pulse generator 330 is capable of supporting a non-gradual-change mode in addition to the gradual-change mode. In the non-gradual-change mode, the duty cycle of the i-th PWM signal $S_{PWMi}$ is allowed to be immediately changed from the corresponding control data $D_i$ value before updating to the updated value thereof.

The dimming pulse generator 330 may preferably be configured to dynamically switch its mode between the non-gradual-change mode and the gradual-change mode according to the settings received from the microcontroller 114. Preferably, the dimming pulse generator 330 is configured to dynamically switch its mode between the non-gradual-change mode and the gradual-change mode for each channel (for each dimming pulse). The setting data that indicates the mode may be appended to the control data $D_i$.

A part of or the whole of the on signal generating circuit 240 may be integrated on the current driver IC 300. The part of the on signal generating circuit 240 to be integrated may preferably be determined according to the circuit configuration of the on signal generating circuit 240, and specifically, may preferably be determined so as to reduce the number of lines that couple the converter controller 230 and the current driver IC 300. As shown in FIG. 21, in a case in which the entire on signal generating circuit 240 is integrated on the current driver IC 300, such an arrangement requires only a single line between the converter controller 230 and the current driver IC 300, which is used to transmit the on signal $S_{ON}$. On the other hand, in a case of employing the on signal generating circuit 240G shown in FIG. 6, and in a case in which the minimum value circuit 256 is integrated on the current driver IC 300, such an arrangement requires only a single line between the converter controller 230 and the current driver IC 300, through which the minimum voltage $V_{MIN}$ propagates.

Figure 22:
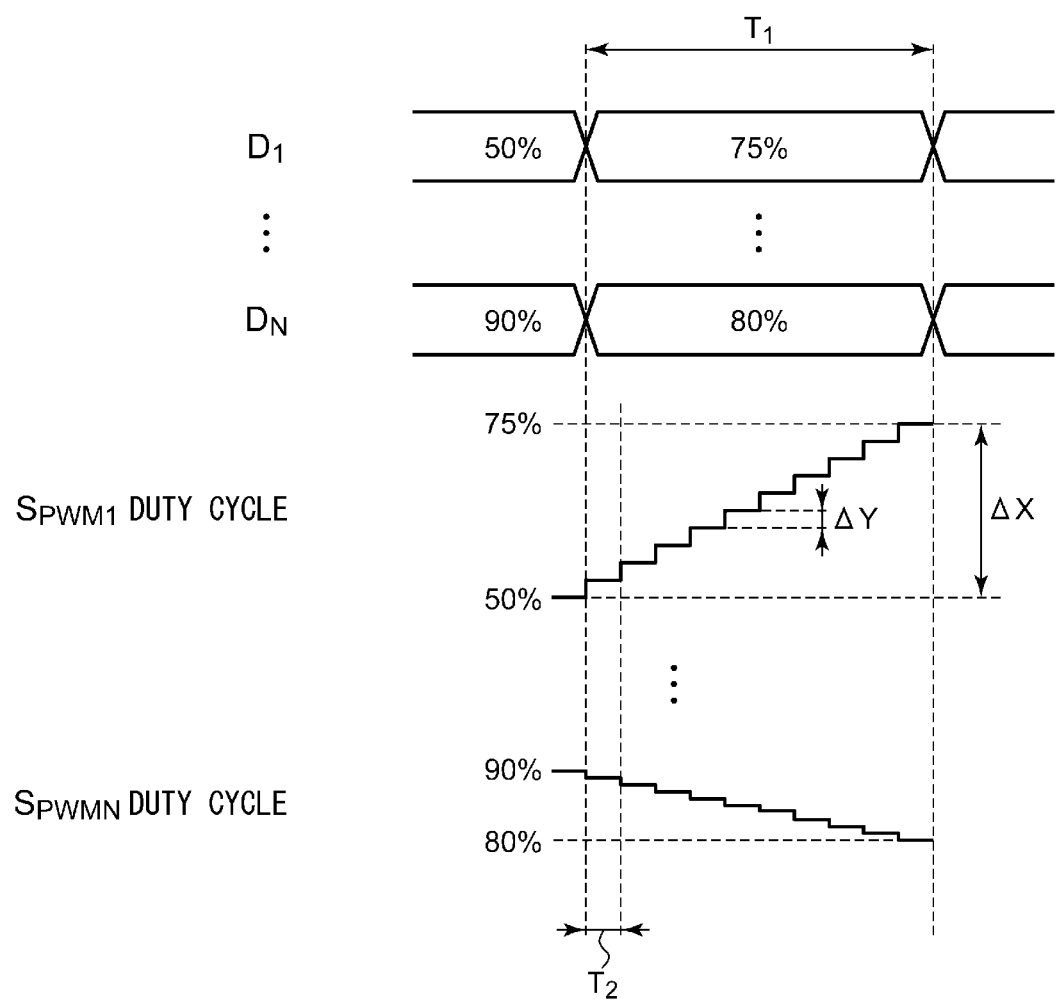
FIG. 22 is an operation waveform diagram showing the operation of the current driver IC.

Next, description will be made regarding the operation of the current driver IC 300. FIG. 22 is an operation waveform diagram showing the operation of the current driver IC 300. Here, description will be made assuming that the duty cycle of the PWM signal is changed linearly. For example, in a case in which $T_1$=100 ms, and $T_2$=5 ms, the duty cycle may preferably be changed in a stepwise manner with 20 steps. With the difference between the control data value before updating and the control data value after updating as X %, the duty cycle of the PWM signal is changed in a stepwise manner with steps of ΔY=(ΔX/20)%.

The above is the operation of the current driver IC 300. The advantages of the current driver IC 300 can be clearly understood in comparison with a comparison technique. If the current driver IC 300 does not have the function of gradually changing the duty cycle, the microcontroller 114 must update the control data $D_1$ through $D_N$ that each indicate the duty cycle at the second time interval $T_2$. In a case in which the number of channels N of the semiconductor light sources 102 exceeds several dozen to 100, such an arrangement requires a high-performance microcontroller, i.e., a high-cost microcontroller, configured as the microcontroller 114. Furthermore, such an arrangement requires high-speed communication between the microcontroller 114 and the current driver IC 300, thereby leading to the occurrence of a noise problem.

In contrast, with the current driver IC 300 according to the embodiment, this arrangement allows the rate at which the microcontroller 114 updates the control data $D_1$ through $D_N$ to be reduced. This allows the performance required for the microcontroller 114 to be reduced. Furthermore, this allows the communication speed between the microcontroller 114 and the current driver IC 300 to be reduced, thereby solving the noise problem.

The first time interval $T_1$ may preferably be configured to be variable. In a situation in which there is only a small change in the duty cycle, the first time interval $T_1$ is increased so as to reduce the data communication amount, thereby allowing power consumption and noise to be reduced.

FIG. 22 shows an example in which the duty cycle is changed linearly. Also, the duty cycle may be changed according to a curve function such as a quadratic function or an exponential function. In a case of employing such a quadratic function, this arrangement provides natural dimming control with less discomfort.

As shown in FIG. 21, the multiple semiconductor light sources 102_1 through 102_N may be integrated on a single semiconductor chip (die) 402. Furthermore, the semiconductor chip 402 and the current driver IC 300 may be housed in a single package in the form of a module.

FIG. 23 shows a plan view and a cross-sectional view of the integrated-driver light source 400. The multiple semiconductor light sources 102 are formed in a matrix on the front face of the semiconductor chip 402. The back face of the semiconductor chip 402 is provided with pairs of back-face electrodes A and K that each correspond to a pair of an anode electrode and a cathode electrode of each of the multiple semiconductor light sources 102. In this drawing, only a single connection relation is shown for the semiconductor light source 102_1.

The semiconductor chip 402 and the current driver IC 300 are mechanically joined and electrically coupled. The front face of the current driver IC 300 is provided with front-face electrodes 410 (LED1 through LEDN in FIG. 21) to be respectively coupled to the cathode electrodes K of the multiple semiconductor light sources 102 and front-face electrodes 412 to be respectively coupled to the anode electrodes A of the multiple semiconductor light sources 102. Each front-face electrode 412 is coupled to a corresponding bump (or pad) 414 provided to a package substrate configured as a back face of the current driver IC 300. Also, an unshown interposer may be arranged between the semiconductor chip 402 and the current driver IC 300.

The kind of the package of the integrated-driver light source 400 is not restricted in particular. As the package of the integrated-driver light source 400, a BAG (Ball Grid Array), PGA (Pin Grid Array), LGA (Land Grid Array), QFP (Quad Flat Package), or the like, may be employed.

In a case in which the semiconductor light sources 102 and the current driver IC 300 are each configured as a separate module, a countermeasure may preferably be provided in which a heat dissipation structure or the like is attached to each module. In contrast, with the integrated-driver light source 400 as shown in FIG. 23, there is a need to release the sum total of heat generated by the light sources 102 and the current sources 210. Accordingly, such an arrangement has the potential to require a very large heat dissipation structure. However, by employing the lighting circuit 200 according to the embodiment, this arrangement is capable of suppressing heat generated by the current sources 210. This allows the size of the heat dissipation structure to be attached to the integrated-driver light source 400 to be reduced.

MODIFICATIONS

Description will be made regarding modifications relating to the embodiments 1 through 5.

Modification 1

Figure 24:
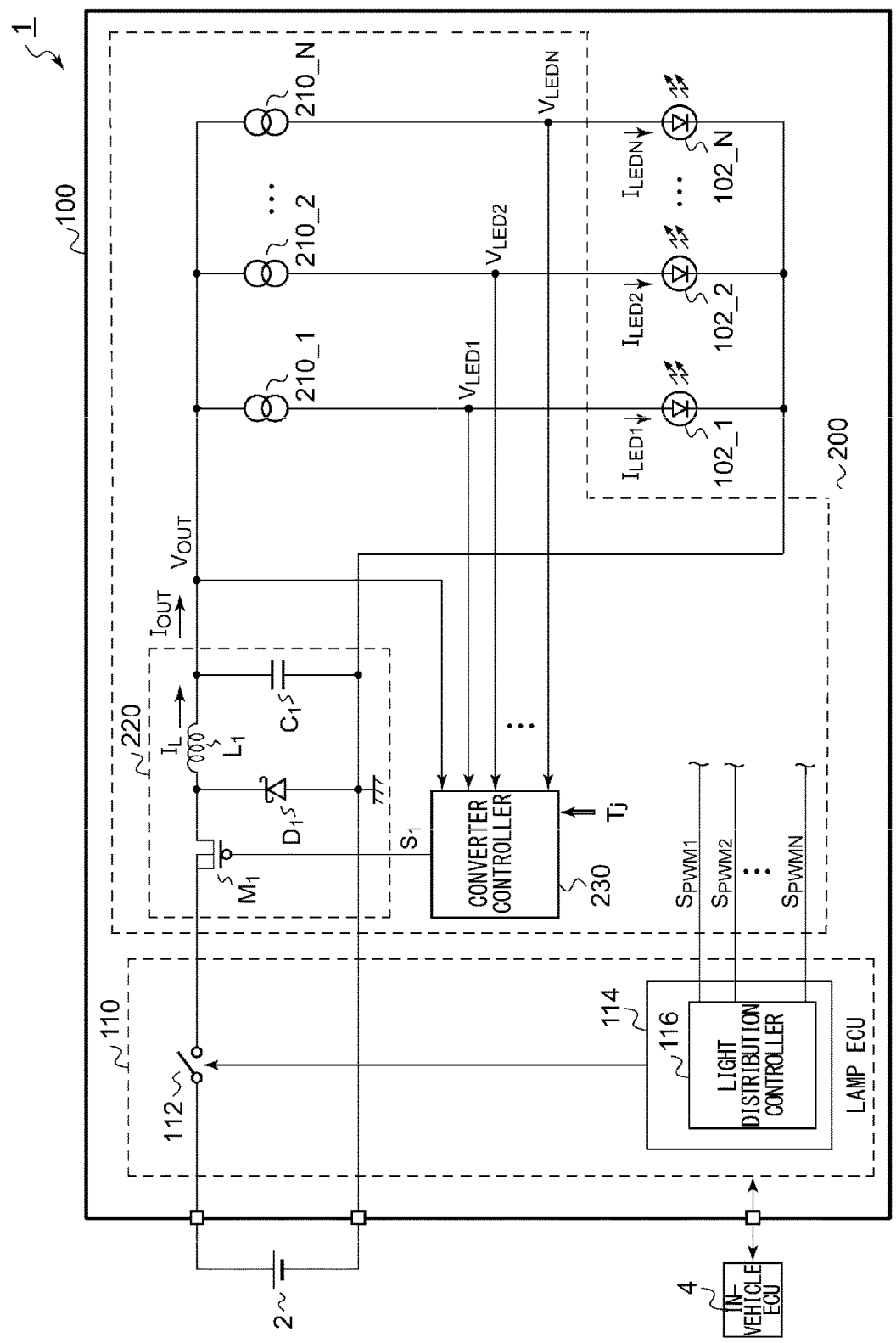
FIG. 24 is a circuit diagram showing an automotive lamp according to a modification 1.

Description has been made in the embodiments regarding an arrangement in which the current source 210 is configured as a sink circuit, and is coupled to the cathode of the corresponding semiconductor light source 102. However, the present invention is not restricted to such an arrangement. FIG. 24 is a circuit diagram showing an automotive lamp 100 according to a modification 1. In this modification, the cathodes of the semiconductor light sources 102 are coupled so as to form a common cathode. Furthermore, each current source 210 configured as a source circuit is coupled to the anode side of the corresponding semiconductor light source 102. Each current source 210 may be configured by geometrically reversing the configuration shown in any one of FIGS. 13A through 13C. With this arrangement, the polarities (P and N) of each transistor may preferably be replaced as necessary. The converter controller 230 controls the switching converter 220 based on the relation between the voltages $V_{CS}$ each occurs across each current source 210 and the bottom limit voltage $V_{BOTTOM}$.

Modification 2

Any transistor such as the series transistor $M_2$ or the like may be configured as a bipolar transistor. In this case, the gate, source, and drain correspond to the base, emitter, and collector, respectively.

Modification 3

Description has been made in the embodiments regarding an arrangement in which the switching transistor $M_1$ is configured as a P-channel MOSFET. Also, the switching transistor $M_1$ may be configured as an N-channel MOSFET. In this case, a bootstrap circuit may be provided as an additional circuit. Instead of such a MOSFET, an IGBT (Insulated Gate Bipolar Transistor) or a bipolar transistor may be employed.

Overview of the Embodiments 1 Through 5

An embodiment disclosed in the present specification relates to a lighting circuit structured to be capable of turning on multiple semiconductor light sources. The lighting circuit includes: multiple current sources each of which is to be coupled to a corresponding semiconductor light source, and each of which includes a series transistor and a sensing resistor arranged in series with the corresponding semiconductor light source, and an error amplifier structured to adjust the voltage at a control electrode of the series transistor based on a voltage drop that occurs across the sensing resistor; a switching converter structured to supply a driving voltage across each of multiple series connection circuits each formed of a semiconductor light source and a current source; and a converter controller structured to operate using a ripple control method. The converter controller turns on a switching transistor of the switching converter in response to the output voltage of the error amplifier included in any one of the multiple current sources satisfying a predetermined turn-on condition.

When the driving current generated by the current source deviates from its target value, a sudden change occurs in the output voltage of the error amplifier. The switching converter employs a hysteresis control method. Upon detecting such a sudden change, the switching converter immediately turns on the switching transistor. This allows the voltage across each current source to be maintained in the vicinity of the saturation voltage state, and allows the power consumption to be reduced.

Also, the series transistor may be configured as an N-type transistor. When an output voltage of the error amplifier included in any one of the multiple current sources reaches a predetermined threshold value, the converter controller may turn on the switching transistor.

Also, the series transistor may be configured as an N-type transistor. Also, the converter controller may turn on the switching transistor in response to a maximum value from among output voltages of the plurality of error amplifiers included in the plurality of semiconductor light sources satisfying a predetermined turn-on condition.

Also, the series transistor may be configured as a P-type transistor. Also, when an output voltage of the error amplifier included in any one of the multiple current sources becomes lower than a predetermined threshold value, the converter controller may turn on the switching transistor.

Also, the converter controller may turn off the switching transistor in response to the driving voltage reaching an upper limit voltage. Also, the upper limit voltage may be feedback controlled such that the switching frequency of the switching transistor approaches a target frequency.

Also, the converter controller may turn off the switching transistor after the on time elapses after the switching transistor is turned on. Also, the on time may be feedback controlled such that the switching frequency of the switching transistor approaches a target frequency.

The multiple semiconductor light sources and the multiple current sources may be arranged in the form of a module. In a case in which the semiconductor light sources and the current sources are arranged in the form of a module, this further increases a need to reduce the heat generation. In a case of employing the hysteresis control method based on the output voltage of the error amplifier, such an arrangement operates particularly effectively for such a module.

With an embodiment, the lighting circuit may be provided to an automotive lamp.

Another embodiment of the present invention disclosed in the present specification relates to a current driver circuit structured to drive multiple semiconductor light sources. The current driver circuit includes: multiple current sources each structured to allow the on/off state thereof to be controlled independently according to a PWM signal, and each coupled to a corresponding semiconductor light source in series; an interface circuit structured to receive, at a first time interval, multiple control data that indicate an on/off duty cycle for the multiple current sources; and a dimming pulse generator structured to generate multiple PWM signals for the multiple current sources, and to gradually change, at a second time interval that is smaller than the first time interval, a duty cycle of each of the multiple PWM signals from a value indicated by the corresponding control data before updating to a value indicated by the corresponding control data after updating.

In a case in which the current driver circuit is provided with an automatic duty cycle gradual-change function, i.e., an automatic luminance gradual-change function, the processor is not required to update the setting value for the duty cycle with a high frequency. This allows the data communication amount to be reduced.

With an embodiment, the duty cycle of each of the multiple PWM signals may be immediately changed according to settings from a value indicated by the corresponding control data before updating to a value indicated by the corresponding control data after updating. For example, in a case in which the current driver circuit is employed in a variable light distribution lamp, in some situations, in order to prevent the occurrence of glare, there is a need to turn off or reduce a particular illumination provided by a particular semiconductor light source. This function has an advantage in such a situation.

Also, each of the multiple current sources may include: a series transistor and a sensing resistor arranged in series with a corresponding semiconductor light source; an error amplifier structured to adjust a voltage of a control electrode of the series transistor based on a voltage drop that occurs across the sensing resistor; and a PWM switch arranged between a gate and a source of the series transistor.

EMBODIMENTS 6 THROUGH 10

Embodiment 6

Figure 25:
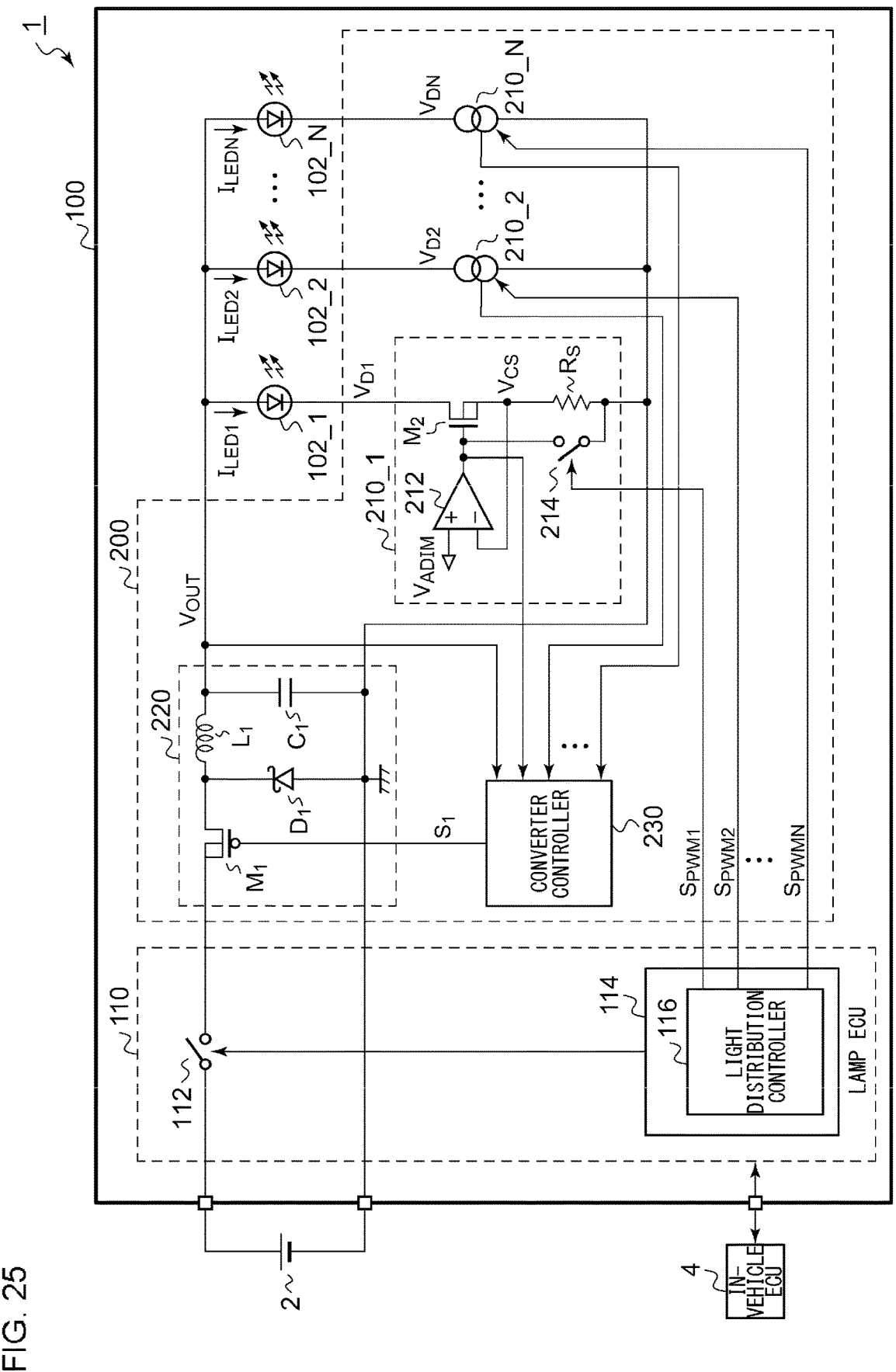
FIG. 25 is a block diagram showing a lamp system including an automotive lamp according to an embodiment 6.

FIG. 25 is a block diagram showing a lamp system 1 including an automotive lamp 100 according to an embodiment 6. The lamp system 1 includes a battery 2, an in-vehicle ECU (Electronic Control Unit) 4, and an automotive lamp 100. The automotive lamp 100 is configured as a variable light distribution headlamp having an ADB function. The automotive lamp 100 generates a light distribution according to a control signal received from the in-vehicle ECU 4.

The automotive lamp 100 includes multiple (N≥2) semiconductor light sources 102_1 through 102_N, a lamp ECU 110, and a lighting circuit 200. Each semiconductor light source 102 may preferably be configured using an LED. Also, various kinds of light-emitting elements such as an LD, organic EL, or the like, may be employed. Each semiconductor light source 102 may include multiple light-emitting elements coupled in series and/or coupled in parallel. It should be noted that the number of channels, i.e., N, is not restricted in particular. Also, N may be 1.

The lamp ECU 110 includes a switch 112 and a microcontroller 114. The microcontroller (processor) 114 is coupled to the in-vehicle ECU 4 via a bus such as a CAN (Controller Area Network) or LIN (Local Interconnect Network) or the like. This allows the microcontroller 114 to receive various kinds of information such as a turn-on/turn-off instruction, etc. The microcontroller 114 turns on the switch 112 according to a turn-on instruction received from the in-vehicle ECU 4. In this state, a power supply voltage (battery voltage $V_{BAT}$) is supplied from the battery 2 to the lighting circuit 200.

Furthermore, the microcontroller 114 receives a control signal for indicating the light distribution pattern from the in-vehicle ECU 4, and controls the lighting circuit 200. Also, the microcontroller 114 may receive information that indicates the situation ahead of the vehicle from the in-vehicle ECU 4, and may autonomously generate the light distribution pattern based on the information thus received.

The lighting circuit 200 supplies the driving currents $I_{LED1}$ through $I_{LEDN}$ to the multiple semiconductor light sources 102_1 through 102_N so as to provide a desired light distribution pattern.

The lighting circuit 200 includes multiple current sources 210_1 through 210_N, a switching converter 220, and a converter controller 230. Each current source 210_i (i=1, 2, ..., N) is coupled to the corresponding semiconductor light source 102_i in series. The current source 210_i functions as a constant current driver that stabilizes the driving current $I_{LEDi}$ that flows through the semiconductor light source 102_i to a predetermined current amount.

The multiple current sources 210_1 through 210_N have the same configuration. Accordingly, as a representative example, only the configuration of the current source 210_1 is shown. Each current source 210 includes a series transistor $M_2$, a sensing resistor $R_S$, and an error amplifier 212. The series transistor $M_2$ and the sensing resistor $R_S$ are arranged in series on a path of the driving current $I_{LEDi}$. The error amplifier 212 adjusts the voltage $V_G$ at a control electrode (gate in this example) of the series transistor $M_2$ such that the voltage drop $V_{CS}$ that occurs across the sensing resistor $R_S$ approaches the target voltage $V_{ADIM}$. In this example, the series transistor $M_2$ is configured as an N-type (N-channel) MOSFET. The error amplifier 212 is arranged such that the reference voltage $V_{ADIM}$ is input to one input (non-inverting input terminal) and such that the voltage $V_{CS}$ (voltage drop that occurs across the sensing resistor $R_S$) at a connection node that couples the series transistor $M_2$ and the sensing resistor $R_S$ is input to the other input (inverting input terminal) thereof. The error amplifier 212 feedback controls $V_{CS}$ such that it approaches $V_{ADIM}$. This stabilizes the driving current $I_{LED}$ with $I_{LED}(REF)=V_{ADIM}/R_S$ as its target value.

Each current source 210 further includes a switch (dimming switch) 214 for PWM dimming. The dimming switch 214 is controlled according to the PWM signal $S_{PWM}$ generated by the light distribution controller 116. When the dimming switch 214 is turned off, the driving current $I_{LED}$ flows through the current source 210. Conversely, when the dimming switch 214 is turned on, the series transistor $M_2$ is turned off, which disconnects the driving current $I_{LED}$. The dimming switch 214 is switched at a high speed at a PWM frequency of 60 Hz or more (preferably, on the order of 200 to 300 Hz). By adjusting the duty cycle thereof, the semiconductor light source 102 is subjected to PWM dimming control.

The switching converter 220 supplies a driving voltage $V_{OUT}$ across a series connection circuit of the semiconductor light source 102 and the current source 210. The switching converter 220 is configured as a step-down converter (Buck converter) including a switching transistor $M_1$, a rectification diode $D_1$, an inductor $L_1$, and an output capacitor $C_1$.

The converter controller 230 controls the switching converter 220 using a ripple control method. More specifically, the converter controller 230 generates a turn-on timing at which the switching transistor $M_1$ is to be turned on, based on the output voltage $V_G$ of the error amplifier 212 (i.e., gate voltage of the series transistor $M_2$). Specifically, in response to the output voltage $V_G$ of the error amplifier 212 satisfying a predetermined turn-on condition, the converter controller 230 switches the control pulse $S_1$ to the on level (low level), thereby turning on the switching transistor $M_1$.

More specifically, when the output voltage $V_{G1}$ of the error amplifier 212 exceeds a predetermined threshold value $V_{TH}$, the converter controller 230 turns on the switching transistor $M_1$. In the present embodiment, the automotive lamp 100 is configured as a multi-channel device. The gate voltages $V_{G1}$ through $V_{GN}$ are monitored for all the channels. When any one of the multiple current sources 210 satisfies the turn-on condition described above, the converter controller 230 turns on the switching transistor $M_1$. Specifically, when the gate voltage $V_{Gj}$ at any channel, i.e., the j-th channel, exceeds the threshold value $V_{TH}$ in the off period of the switching transistor $M_1$, the converter controller 230 turns on the switching transistor $M_1$.

Furthermore, when a predetermined turn-off condition is satisfied, the converter controller 230 switches a control pulse $S_1$ to the off level (high level), thereby turning off the switching transistor $M_1$. The turn-off condition may be that the output voltage $V_{OUT}$ of the switching converter 220 has reached a predetermined upper limit voltage $V_{UPPER}$.

Figure 26:
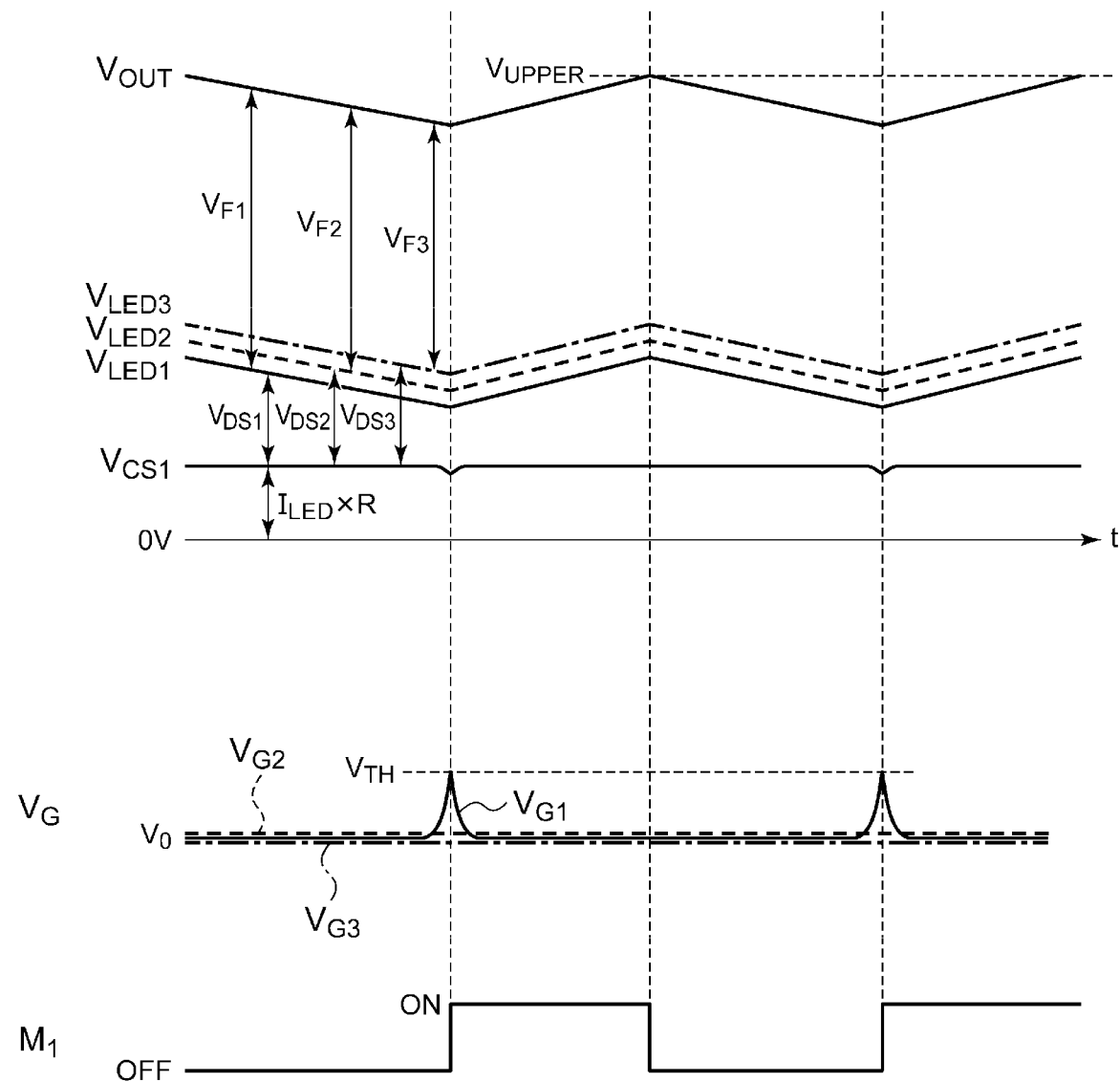
FIG. 26 is an operation waveform diagram showing the operation of the automotive lamp shown in FIG. 25.
Figure 27:
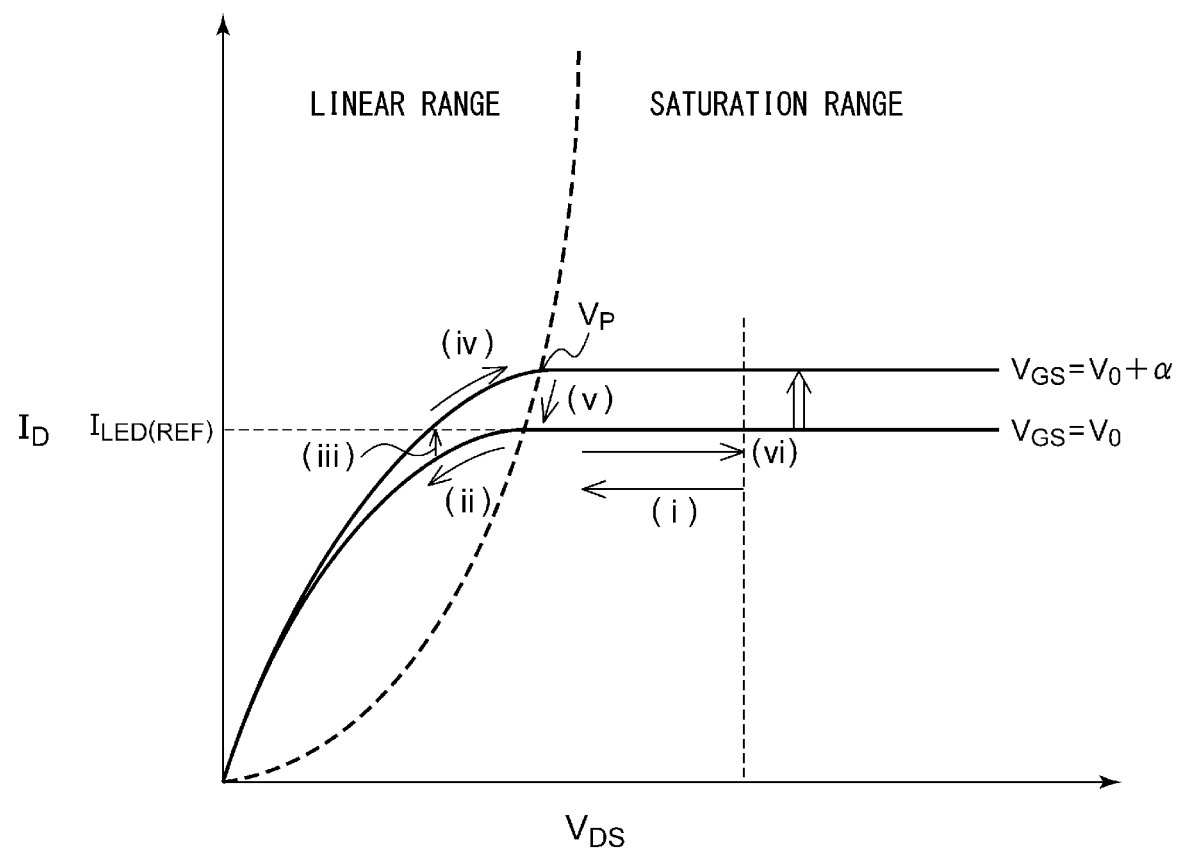
FIG. 27 is a schematic diagram showing the IV characteristics of a MOSFET and the transition of the operating point of a series transistor.

The above is the configuration of the automotive lamp 100. Next, description will be made regarding the operation thereof. FIG. 26 is an operation waveform diagram showing the operation of the automotive lamp 100 shown in FIG. 25. FIG. 27 is a schematic diagram showing the IV characteristics of a MOSFET and the transition of the operating point of a series transistor $M_2$. For ease of understanding, description will be made regarding an example in which N=3. Furthermore, description will be made assuming that there is only negligible element variation between the multiple current sources 210_1 through 210_N. Furthermore, description will be made assuming that the relation $V_{F1}>V_{F2}>V_{F3}$ holds true due to element variation between the semiconductor light sources 102. For ease of understanding, description will be made regarding the operation without involving PWM dimming.

Referring to FIG. 26, in the off period (low-level period in the drawing) of the switching transistor $M_1$, the output capacitor $C_1$ of the switching converter 220 is discharged due to a load current $I_{OUT}$ which is the sum total of the driving currents $I_{LED1}$ through $I_{LED3}$, which lowers the output voltage $V_{OUT}$ with time. In actuality, the output capacitor $C_1$ is charged or discharged by the difference between the coil current $I_L$ that flows through the inductor $L_1$ and the load current $I_{OUT}$. Accordingly, the increase/decrease of the output voltage $V_{OUT}$ does not necessarily match the on/off state of the switching transistor $M_1$ on the time axis.

The voltages that each occur across each current source 210, i.e., the voltages (cathode voltages) $V_{LED1}$ through $V_{LED3}$ at the connection nodes that each connect the corresponding current source 210 and the corresponding semiconductor light source 102, are represented by the following Expressions.

$$V_{LED1} = V_{OUT} - V_{F1}$$

$$V_{LED2} = V_{OUT} - V_{F2}$$

$$V_{LED3} = V_{OUT} - V_{F3}$$

Accordingly, the voltages $V_{LED1}$ through $V_{LED3}$ each change while maintaining a constant voltage difference with respect to the output voltage $V_{OUT}$. In this example, the forward voltage $V_{F1}$ at the first channel is the largest value. Accordingly, the cathode voltage $V_{LED1}$ at the first channel is the smallest value.

The drain-source voltage $V_{DS}$ of the series transistor $M_2$ at each channel is equal to a voltage obtained by subtracting the voltage drop $V_{CS}$ that occurs across the sensing resistor $R_S$ from the cathode voltage $V_{LED}$.

$$V_{DS1} = V_{LED1} - V_{CS1}$$

$$V_{DS2} = V_{LED2} - V_{CS2}$$

$$V_{DS3} = V_{LED3} - V_{CS3}$$

In a case in which the target values $I_{LED(REF)}$ of the driving currents $I_{LED}$ are equal for all the channels, and in a case in which the sensing resistors $R_S$ have the same resistance value for all the channels, the voltage drops $V_{CS1}$ through $V_{CS3}$ are the same for all the channels. In this case, the first channel exhibits the smallest drain-source voltage $V_{DS1}$.

The series transistor $M_2$ may be designed to have an element size so as to operate mainly in its saturation range. In the saturation range, the series transistor $M_2$ allows the target current $I_{LED(REF)}$ to flow at a predetermined gate voltage level $V_0$ without depending on the drain-source voltage $V_{DS}$. That is to say, in the saturation range, the error amplifier 212 feedback controls the gate voltage $V_{G1}$ such that it is set to $V_0$. As the output voltage $V_{OUT}$ becomes lower, the operation point moves along the line indicated by the arrow (i) in FIG. 27.

In a case in which the gate-source voltage $V_{GS}$ is maintained at a constant value, when the drain-source voltage $V_{DS1}$ at the first channel becomes lower than a pinch-off voltage $V_P$ ($=V_{GS}-V_{GS(th)}$), this leads to reduction in the drain current $I_D$ (i.e., driving current $I_{LED}$) (as indicated by the arrow (ii) in FIG. 27). The reduction in the driving current $I_{LED}$ manifests as a reduction in the detection voltage $V_{CS1}$. FIG. 26 shows an expanded view of a very small decrease in the detection voltage $V_{CS1}$. In this state, the error amplifier 212 feedback controls the gate voltage $V_{G1}$ so as to adjust it to a higher voltage level V1 (as indicated by the arrow (iii) in FIG. 27) such that the detection voltage $V_{CS1}$ that has decreased approaches the target voltage $V_{ADIM}$. The error amplifier 212 is configured to have a very high gain. Accordingly, such a very small decrease in the detection voltage $V_{CS1}$ is converted into a somewhat large rise of the gate voltage $V_{GS}$. When the rise of the gate voltage $V_{G1}$ is detected as a result of a comparison with the threshold value $V_{TH}$, the switching transistor $M_1$ is turned on.

When the switching transistor $M_1$ is turned on, the coil current $I_L$ that flows through the inductor $L_1$ rises, which leads to an increase in the output voltage $V_{OUT}$. When the output voltage $V_{OUT}$ rises, this raises the drain-source voltage $V_DS$ of the series transistor $M_2$. In a case in which the gate voltage $V_{GS}$ is maintained at a constant level, when the drain-source voltage $V_DS$ rises in the saturation range, this raises the drain current $I_D$ (as indicated by the arrow (iv) in FIG. 27). The increase in the drain current $I_D$ manifests as a rise of the detection voltage $V_{CS1}$. The error amplifier 212 feedback controls the gate voltage $V_{G1}$ to be adjusted to a lower voltage level $V_0$ such that the detection voltage $V_{CS1}$ that has risen approaches the target voltage $V_{ADIM}$ (as indicated by the arrow (v) in FIG. 27). When the output voltage $V_{OUT}$ further rises in the on period of the switching transistor $M_1$, the operating point moves along the line indicated by the arrow (vi) in FIG. 27.

Subsequently, when the output voltage $V_{OUT}$ reaches the upper limit voltage $V_{UPPER}$, the switching transistor $M_1$ is turned off. The lighting circuit 200 repeats this operation.

The above is the operation of the lighting circuit 200. With the lighting circuit 200, the series transistor $M_2$ is allowed to have its operating point in the vicinity of the boundary between the linear range and the saturation range. This allows the source-drain voltage $V_{DS}$ of the series transistor $M_2$ to be reduced, thereby allowing unnecessary power consumption in the series transistor $M_2$ to be reduced.

Description will be made regarding a case in which the PWM dimming control is performed. When the turned-off period of the PWM dimming occurs, and accordingly, when the dimming switch 214 is turned on, the gate voltage $V_G$ changes such that it becomes lower. Accordingly, at this channel in the turned-off state, the gate voltage $V_G$ does not cross the threshold voltage $V_{TH}$. Accordingly, in this state, there is no effect on the turn-on operation of the switching transistor $M_1$. That is to say, such an arrangement does not require special processing to eliminate the turned-off channels from the judgment whether or not the turn-on condition has been satisfied.

The present invention encompasses various kinds of apparatuses, circuits, and methods that can be regarded as a block configuration or a circuit configuration shown in FIG. 25, or otherwise that can be derived from the aforementioned description. That is to say, the present invention is not restricted to a specific configuration. More specific description will be made below regarding example configurations and modifications for clarification and ease of understanding of the essence of the present invention and the circuit operation. That is to say, the following description will by no means be intended to restrict the technical scope of the present invention.

Example 6.1

Figure 28:
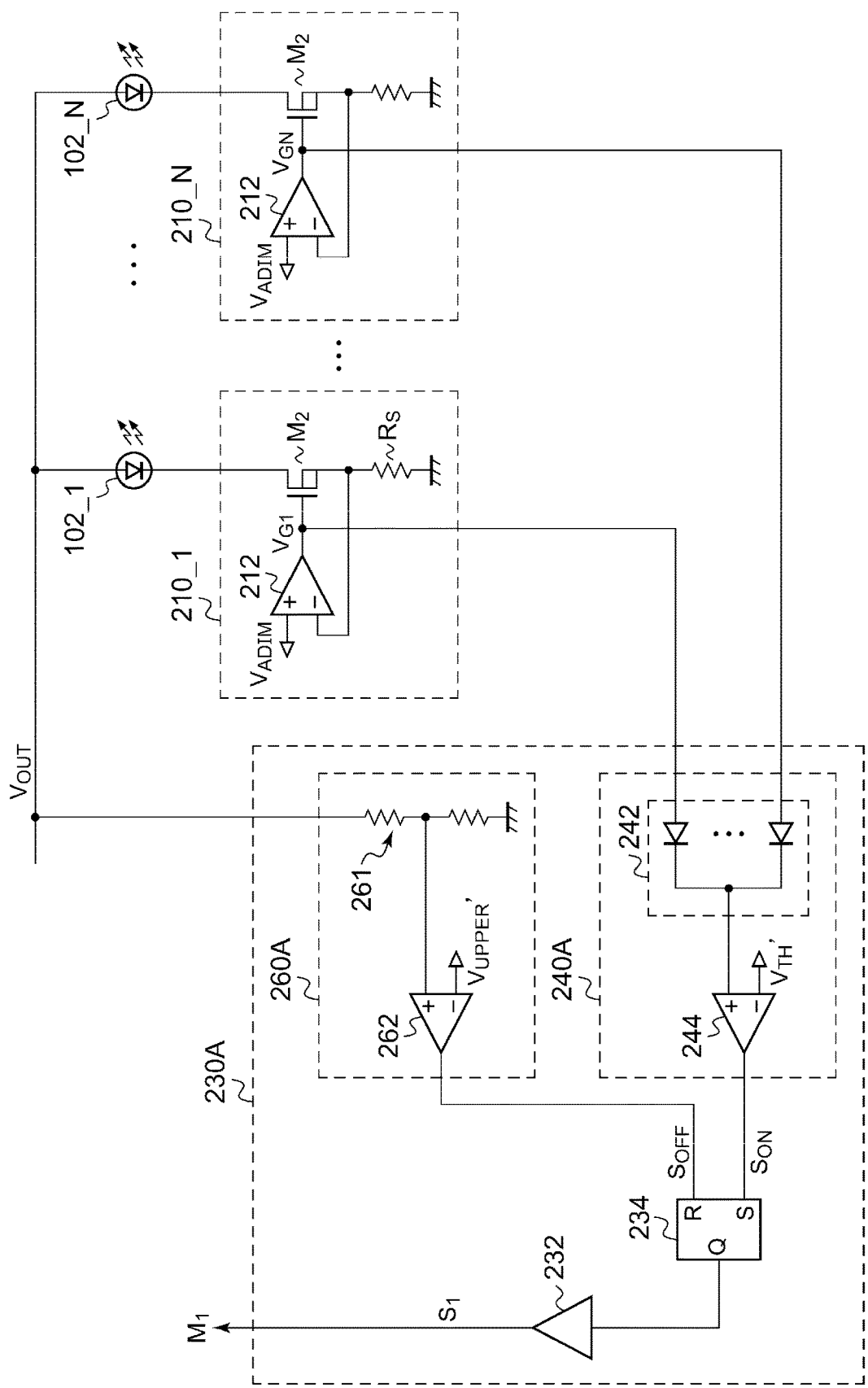
FIG. 28 is a circuit diagram showing a converter controller according to an example 6.1.

FIG. 28 is a circuit diagram showing a converter controller 230A according to an example 6.1. The converter controller 230A turns on the switching transistor $M_1$ in response to the maximum value from among the output voltages $V_{G1}$ through $V_{GN}$ of the multiple channels of error amplifiers 212 satisfying a predetermined turn-on condition (i.e., exceeding the threshold voltage $V_{TH}$).

An on-signal generating circuit 240A generates the on signal $S_{ON}$ that indicates the timing at which the switching transistor $M_1$ is to be turned on, based on the multiple gate voltages $V_{G1}$ through $V_{GN}$. The on signal generating circuit 240A includes a maximum value circuit 242 and a comparator 244. The maximum value circuit 242 generates a voltage that corresponds to the maximum value from among the multiple gate voltages $V_{G1}$ through $V_{GN}$. For example, the maximum value circuit 242 may be configured as a diode OR circuit. The output voltage $V_G'$ of the diode OR circuit is Vf lower than the maximum one from among the multiple gate voltages $V_{G1}$ through $V_{GN}$. Here, Vf represents the forward voltage of the diode.

The comparator 244 compares the output voltage of the maximum value circuit 242 with a threshold value $V_{TH}'$. The threshold value $V_{TH}'$ may preferably be determined to be Vf lower than the threshold voltage $V_{TH}$ described above. When $V_G'$ exceeds $V_{TH}'$, i.e., when the maximum gate voltage $V_G$ exceeds the threshold voltage $V_{TH}$, the on signal $S_{ON}$, which is the output of the comparator 244, is asserted (set to the high level, for example).

An off signal generating circuit 260A generates an off signal $S_{OFF}$ which determines the timing at which the switching transistor $M_1$ is to be turned off. A voltage dividing circuit 261 divides the output voltage $V_{OUT}$ such that it is scaled to an appropriate voltage level. A comparator 262 compares the output voltage $V_{OUT}'$ thus divided with a threshold value $V_{UPPER}'$ obtained by scaling the upper limit voltage $V_{UPPER}$. When the relation $V_{OUT}'>V_{UPPER}'$ is detected, the comparator 262 asserts the off signal $S_{OFF}$ (e.g., set to the high level).

The logic circuit 234 is configured as an SR flip-flop, for example. The logic circuit 234 switches its output Q to the on level (e.g., high level) in response to the assertion of the on signal $S_{ON}$. Furthermore, the logic circuit 234 switches its output Q to the off level (e.g., low level) in response to the assertion of the off signal $S_{OFF}$. It should be noted that the logic circuit 234 is preferably configured as a reset-priority flip-flop in order to set the switching converter to a safer state (i.e., off state of the switching transistor $M_1$) when the assertion of the on signal $S_{ON}$ and the assertion of the off signal $S_{OFF}$ occur at the same time.

A driver 232 drives the switching transistor $M_1$ according to the output Q of the logic circuit 234. As shown in FIG. 25, in a case in which the switching transistor $M_1$ is configured as a P-channel MOSFET, when the output Q is set to the on level, the control pulse $S_1$, which is configured as the output of the driver 232, is set to a low voltage ($V_{BAT}-V_G$). When the output Q is set to the off level, the control pulse $S_1$ is set to the high voltage ($V_{BAT}$).

With the example 6.1, such an arrangement requires only a single comparator 244. This allows the circuit area to be reduced as compared with the example 6.2.

Example 6.2

Figure 29:
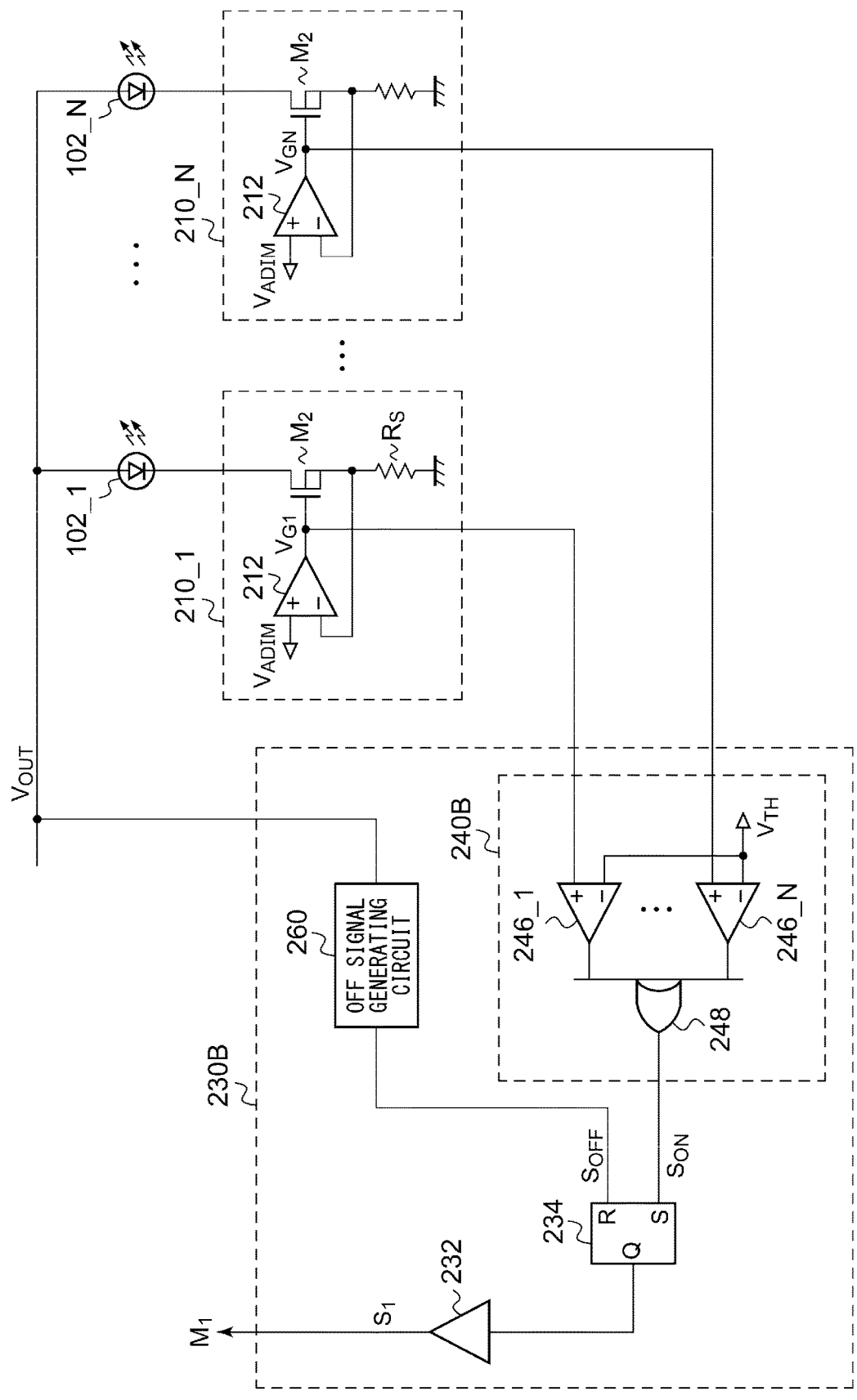
FIG. 29 is a circuit diagram showing a converter controller according to an example 6.2.

FIG. 29 is a circuit diagram showing a converter controller 230B according to an example 6.2. An on signal generating circuit 240B includes multiple comparators 246_1 through 246_N and a logic gate 248. Each comparator 246_i compares the corresponding gate voltage $V_{Gi}$ with the threshold voltage $V_{TH}$. The logic gate 248 performs a logical operation on the outputs of the multiple comparators 246_1 through 246_N, so as to generate the on signal $S_{ON}$. In a case of employing a positive logic system, the logic gate 248 may be configured using an OR gate.

Example 6.3

In-vehicle devices are configured to avoid electromagnetic noise bands, i.e., the LW band of 150 kHz to 280 kHz, the AM band of 510 kHz to 1710 kHz, and the SW band of 2.8 MHz to 23 MHz. Accordingly, the switching frequency of the switching transistor $M_1$ is preferably stabilized to a value on the order of 300 kHz to 450 kHz between the LW band and the AM band.

Figure 30:
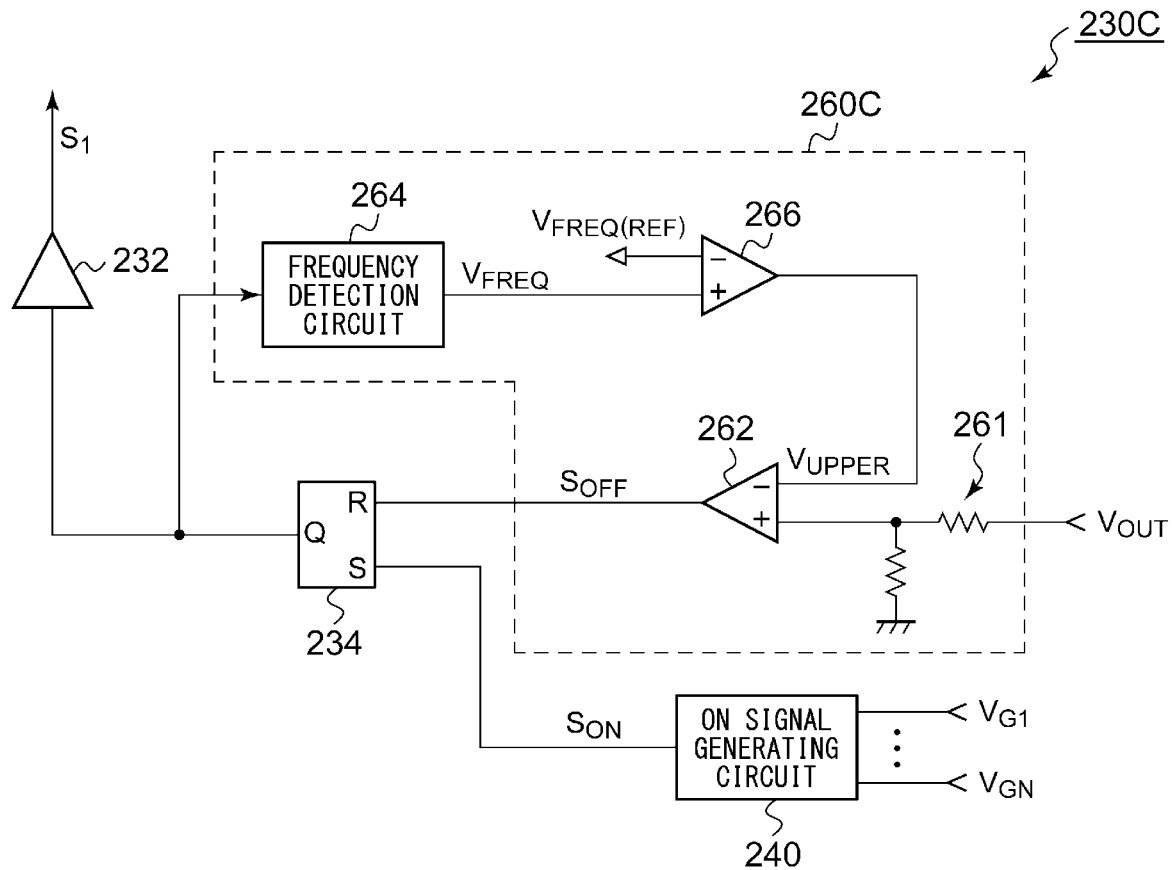
FIG. 30 is a circuit diagram showing a converter controller according to an example 6.3.

FIG. 30 is a circuit diagram showing a converter controller 230C according to an example 6.3. With this example, the upper limit voltage $V_{UPPER}$ is feedback controlled so as to maintain the switching frequency of the switching transistor $M_1$ at a constant value.

An off signal generating circuit 260C includes a frequency detection circuit 264 and an error amplifier 266 in addition to the comparator 262. The frequency detection circuit 264 monitors the output Q of the logic circuit 234 or the control pulse $S_1$, and generates a frequency detection signal $V_{FREQ}$ that indicates the switching frequency. The error amplifier 266 amplifies the difference between the frequency detection signal $V_{FREQ}$ and the reference voltage $V_{FREQ(REF)}$ that defines a target value of the switching frequency, and generates the upper limit voltage $V_{UPPER}$ that corresponds to the difference thus amplified.

With the example 6.3, this arrangement is capable of stabilizing the switching frequency to a target value. This allows the noise countermeasures to be provided in a simple manner.

Example 6.4

Figure 31:
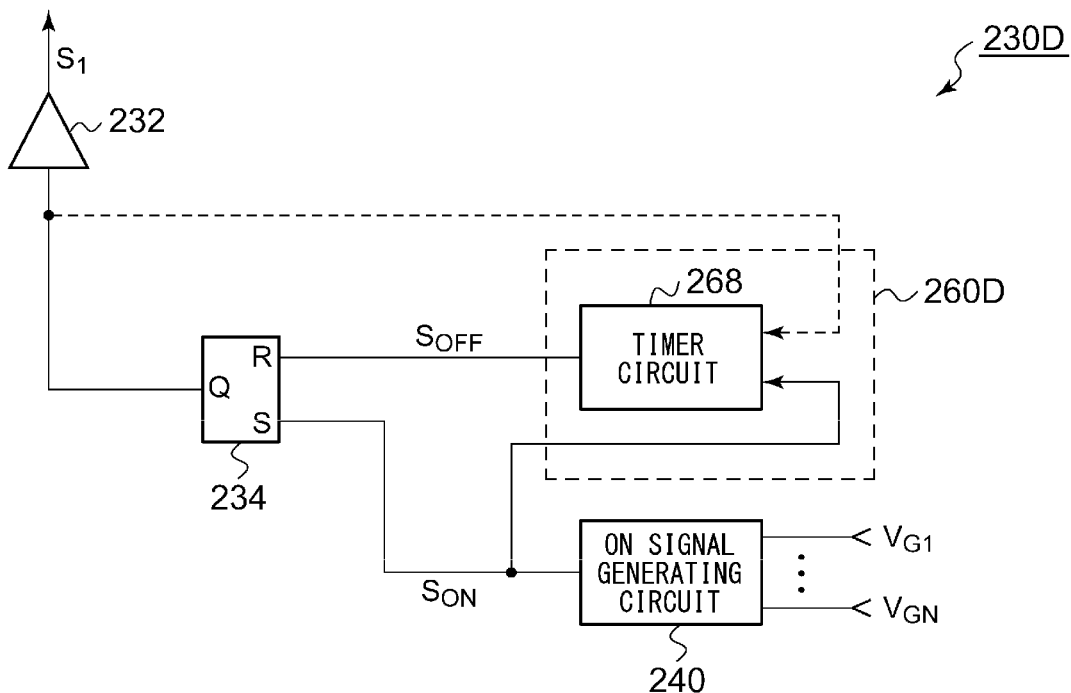
FIG. 31 is a circuit diagram showing a converter controller according to an example 6.4.

FIG. 31 is a circuit diagram showing a converter controller 230D according to an example 6.4. The converter controller 230D may turn off the switching transistor $M_1$ after the on time $T_{ON}$ elapses after the switching transistor $M_1$ is turned on. That is to say, as the turn-off condition, a condition that the on time $T_{ON}$ elapses after the switching transistor $M_1$ is turned off may be employed.

An off signal generating circuit 260D includes a timer circuit 268. The timer circuit 268 starts the measurement of the predetermined on time $T_{ON}$ in response to the on signal $S_{ON}$. After the on time $T_{ON}$ elapses, the timer circuit 268 asserts (e.g., sets to the high level) the off signal $S_{OFF}$. The timer circuit 268 may be configured as a monostable multivibrator (one-shot pulse generator), for example. Also, the timer circuit 268 may be configured as a digital counter or an analog timer. In order to detect the timing at which the switching transistor $M_1$ is turned on, the timer circuit 268 may receive the output Q of the logic circuit 234 or the control pulse $S_1$ as its input signal instead of the on signal $S_{ON}$.

Example 6.5

Figure 32:
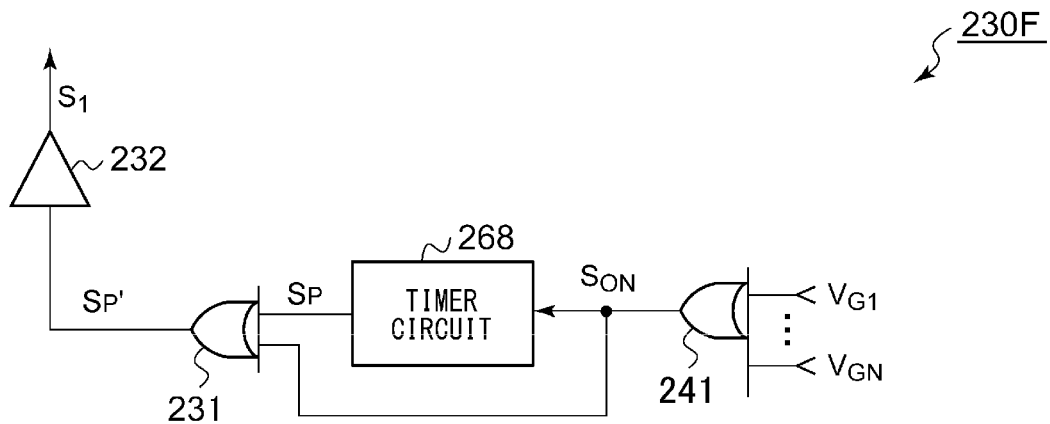
FIG. 32 is a circuit diagram showing a converter controller according to an example 6.5.

FIG. 32 is a circuit diagram showing a converter controller 230F according to an example 6.5. As with the example 6.4, the converter controller 230F turns off the switching transistor $M_1$ after the on time $T_{ON}$ elapses after the switching transistor $M_1$ is turned on. An OR gate 241 corresponds to the on signal generating circuit, and generates the on signal $S_{ON}$. The timer circuit 268 is configured as a monostable multivibrator or the like. The timer circuit 268 generates the pulse signal $S_P$ that is set to the high level for a predetermined on time $T_{ON}$ after the assertion of the on signal $S_{ON}$, and supplies the pulse signal $S_P$ to the driver 232. It should be noted that, giving consideration to a situation in which the voltages $V_{G1}$ through $V_{GN}$ are each lower than the threshold value of the OR gate 241 in the startup operation or the like, an OR gate 231 is provided as an additional component. With such an arrangement, the logical OR $S_P'$ of the on signal $S_{ON}$ and the output $S_P$ of the timer circuit 268 is supplied to the driver 232.

Example 6.6

Figure 33:
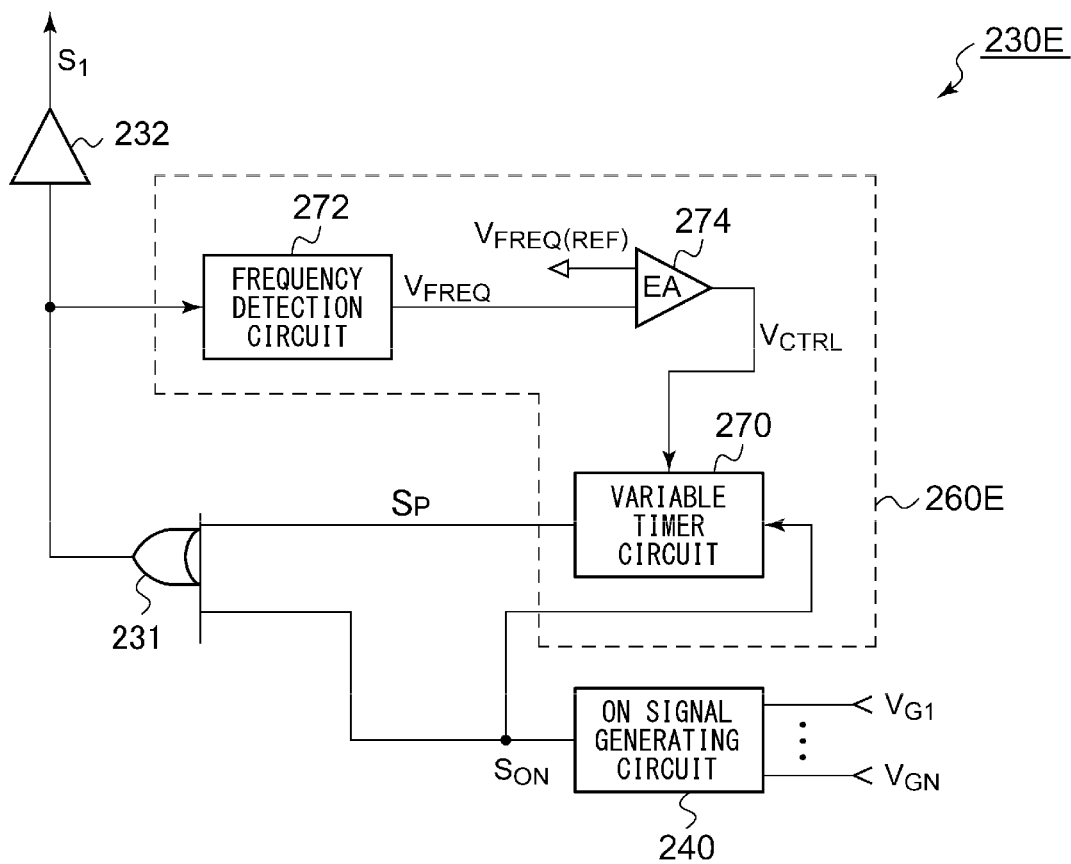
FIG. 33 is a circuit diagram showing a converter controller according to an example 6.6.

FIG. 33 is a circuit diagram showing a converter controller 230E according to an example 6.6. An off signal generating circuit 260E feedback controls the on time $T_{ON}$ so as to maintain the switching frequency at a constant value. A variable timer circuit 270 is configured as a monostable multivibrator that generates the pulse signal $S_P$ that is set to the high level during a period of the on time $T_{ON}$ after the assertion of the on signal $S_{ON}$. The variable timer circuit 270 is configured to change the on time $T_{ON}$ according to a control voltage $V_{CTRL}$.

For example, the variable timer circuit 270 may include a capacitor, a current source that charges the capacitor, and a comparator that compares the voltage across the capacitor with a threshold value. The variable timer circuit 270 is configured such that at least one from among the current amount generated by the current source and the threshold value can be changed according to the control voltage $V_{CTRL}$.

The frequency detection circuit 272 monitors the output Q of the logic circuit 234 or the control pulse $S_1$, and generates a frequency detection signal $V_{FREQ}$ that indicates the switching frequency. An error amplifier 274 amplifiers the difference between the frequency detection signal $V_{FREQ}$ and the reference voltage $V_{FREQ(REF)}$ that defines a target value of the switching frequency, and generates the control voltage $V_{CTRL}$ that corresponds to the difference thus amplified.

With the example 6.6, this arrangement is capable of stabilizing the switching frequency to the target value, thereby allowing the noise countermeasures to be provided in a simple manner.

Figure 34:
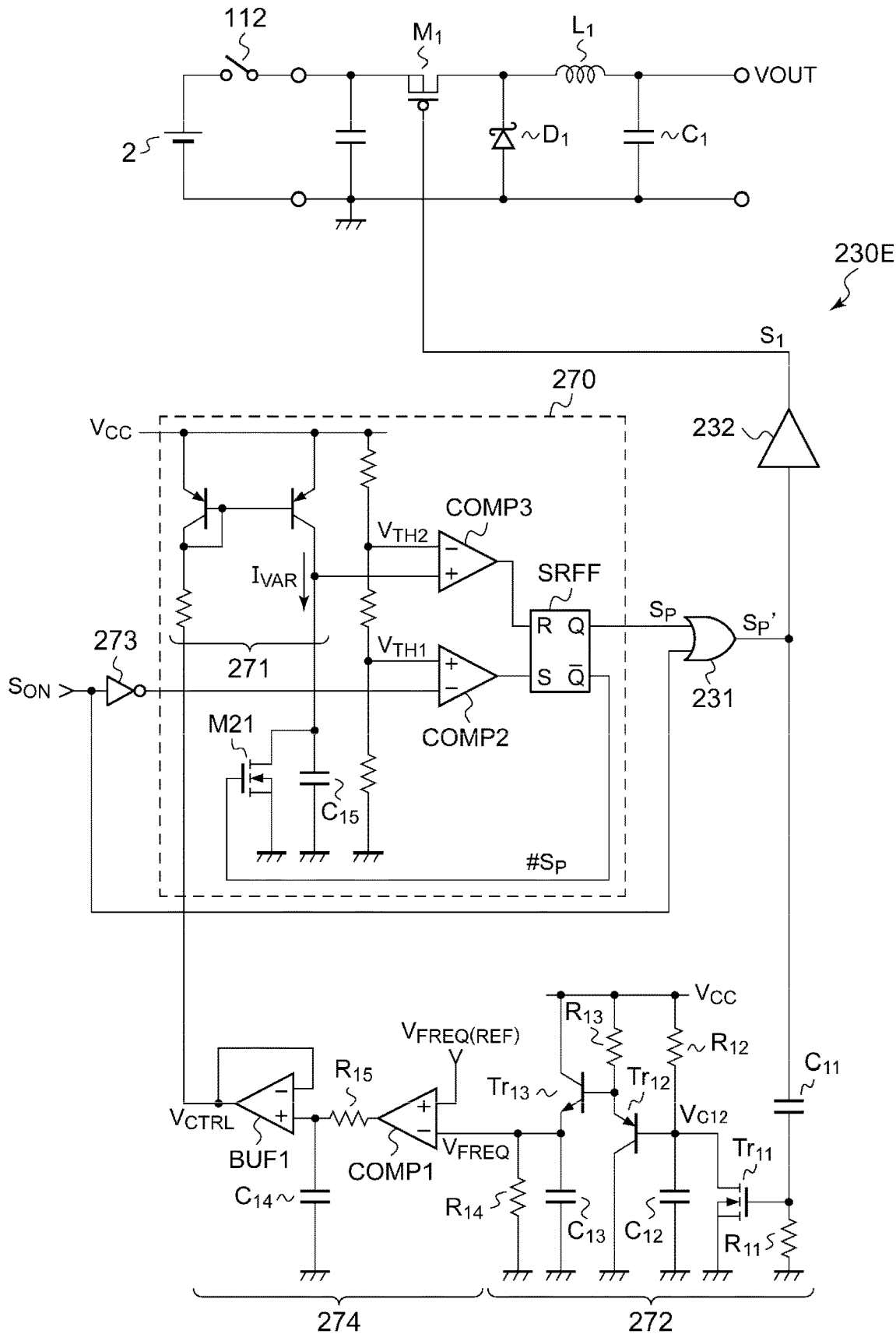
FIG. 34 is a circuit diagram showing a specific configuration of the converter controller shown in FIG. 33.

FIG. 34 is a circuit diagram showing a specific configuration of the converter control circuit 230E shown in FIG. 33. Description will be made regarding the operation of the frequency detection circuit 272. A combination of a capacitor $C_{11}$ and a resistor $R_{11}$ functions as a high-pass filter, which can be regarded as a differentiating circuit that differentiates the pulse signal $S_P'$ which is the output of the OR gate 231 (or the control pulse $S_1$). Such a high-pass filter can also be regarded as an edge detection circuit that detects an edge of the pulse signal $S_P'$. When the output of the high-pass filter exceeds a threshold value, i.e., when a positive edge occurs in the pulse signal $S_P'$, a transistor $Tr_{11}$ turns on so as to discharge the capacitor $C_{12}$. During the off period of the transistor $Tr_{11}$, the capacitor $C_{12}$ is charged via a resistor $R_{12}$. The voltage $V_{C12}$ across the capacitor $C_{12}$ is configured as a ramp wave in synchronization with the pulse signal $S_P'$. The time length of the slope portion thereof, and the wave height that corresponds to the time length of the slope portion, change according to the period of the pulse signal $S_P'$.

A combination of the transistors $Tr_{12}$ and $Tr_{13}$, the resistors $R_{13}$ and $R_{14}$, and a capacitor $C_{13}$ is configured as a peak hold circuit. The peak hold circuit holds the peak value of the voltage $V_{C12}$ across the capacitor $C_{12}$. The output $V_{FREQ}$ of the peak hold circuit has a correlation with the period of the pulse signal $S_P'$, i.e., the frequency thereof.

A comparator COMP1 compares the frequency detection signal $V_{FREQ}$ with the reference signal $V_{FREQ(REF)}$ that indicates the target frequency. A combination of a resistor $R_{15}$ and a capacitor $C_{14}$ is configured as a low-pass filter. The low-pass filter smoothes the output of the comparator COMP1 so as to generate the control voltage $V_{CTRL}$. The control signal $V_{CTRL}$ is output via a buffer BUF1.

Description will be made regarding the variable timer circuit 270. The on signal $S_{ON}$ is inverted by an inverter 273. When the inverted on signal #$S_{ON}$ becomes lower than a threshold value $V_{TH1}$, i.e., when the on signal $S_{ON}$ is set to the high level, the output of a comparator COMP2 is set to the high level. This sets a flip-flop SREF, thereby setting the pulse signal $S_P$ to the high level.

During the high-level period of the pulse signal $S_P$, the transistor $M_{21}$ is turned off. During the off period of the transistor $M_{21}$, a current source 271 generates a variable current $I_{VAR}$ that corresponds to the control voltage $V_{CTRL}$ so as to charge a capacitor $C_{15}$. When the voltage $V_{C15}$ across the capacitor $C_{15}$ reaches a threshold value $V_{TH2}$, the output of the comparator COMP3 is set to the high level. This resets the flip-flop SREF, thereby switching the pulse signal $S_P$ to the low level. As a result, the transistor $M_{21}$ is turned on, thereby initializing the voltage $V_{C15}$ of the capacitor $C_{15}$.

Next, description will be made regarding modifications relating to the embodiment 6.

Modification 6.1

Also, as the turn-off condition, the converter controller 230 may employ the drain voltage (cathode voltage of the semiconductor light source 102) of the series transistor $M_2$ for each channel. For example, as the turn-off condition, a condition may be employed in which the maximum (or minimum) from among the cathode voltages of the multiple channels of the semiconductor light sources 102 reaches an upper limit voltage.

Modification 6.2

Figure 35:
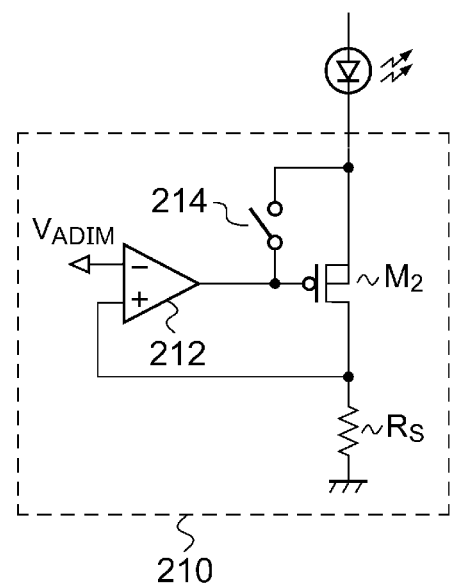
FIG. 35 is a circuit diagram showing a current source according to a modification 6.2.

Description has been made in the embodiment 6 in which an N-type transistor is employed as the series transistor $M_2$ of the current source 210. Also, a P-type transistor (P-channel MOSFET) may be employed. FIG. 35 is a circuit diagram showing a current source 210 according to a modification 6.2. In this case, when the output voltage $V_{OUT}$ decreases, in order to maintain the driving current $I_{LED}$, feedback control is applied in a direction in which the gate voltage $V_G$ is reduced. Accordingly, as the turn-on condition, a condition may be employed in which the gate voltage $V_G$ becomes lower than a predetermined threshold value at any channel. The dimming switch 214 may be provided between the gate and the source of the series transistor $M_2$.

Modification 6.3

Any transistor such as the series transistor $M_2$ or the like may be configured as a bipolar transistor. In this case, the gate, source, and drain correspond to the base, emitter, and collector, respectively.

Modification 6.4

Description has been made in the embodiment 6 regarding an arrangement in which the switching transistor $M_1$ is configured as a P-channel MOSFET. Also, the switching transistor $M_1$ may be configured as an N-channel MOSFET. In this case, a bootstrap circuit may be provided as an additional circuit. Instead of such a MOSFET, an IGBT (Insulated Gate Bipolar Transistor) or a bipolar transistor may be employed.

Modification 6.5

Description has been made in the embodiment 6 regarding an arrangement in which the output voltage of the error amplifier 212 (gate voltage $V_G$ of the series transistor $M_2$) is directly monitored, and judgment is made regarding whether or not the output voltage of the error amplifier 212 thus monitored satisfies the turn-on condition. However, the present invention is not restricted to such an arrangement. For example, an internal node of the error amplifier 212 that generates a voltage having a correlation with the output voltage may be monitored. That is to say, the output voltage of the error amplifier 212 may be indirectly monitored.

Modification 6.6

Figure 36A:
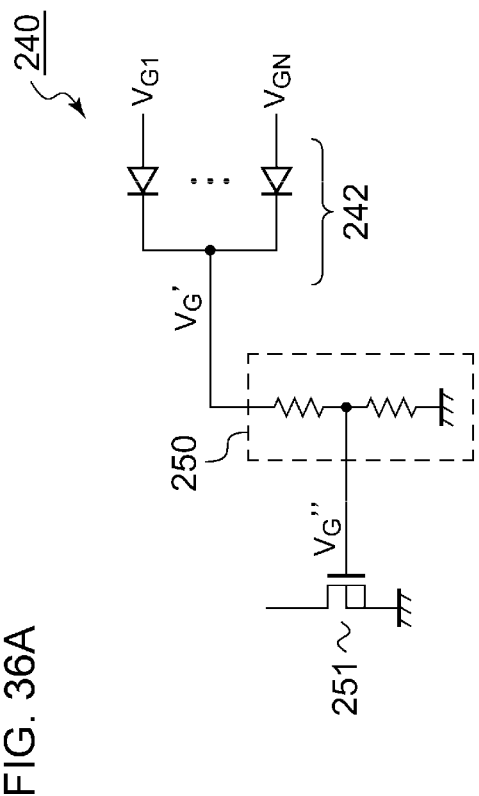
FIG. 36A through 36C are circuit diagrams each showing a modification of the on signal generating circuit.
Figure 36B:
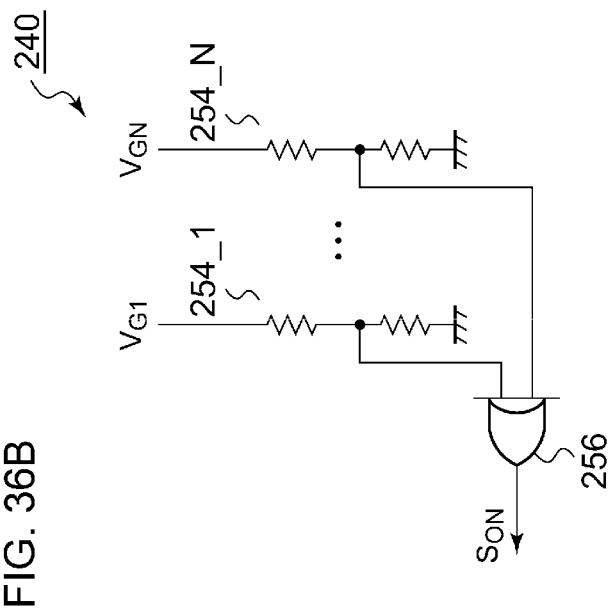
Figure 36C:
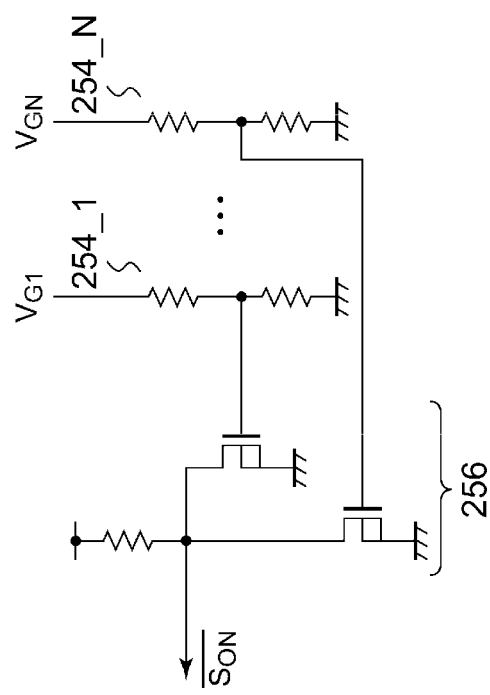

Description has been made in the embodiment 6 regarding an arrangement in which the comparator 244 is used to detect a sudden change in the output voltage (gate voltage $V_G$) of the error amplifier 212. However, the present invention is not restricted to such an arrangement. FIGS. 36A through 36C are circuit diagrams each showing a modification of the on signal generating circuit 240. As shown in FIG. 36A, instead of the comparator 244 shown in FIG. 28, a MOSFET or a bipolar transistor may be employed as the voltage comparing unit. For example, the output voltage $V_G'$ of the maximum value circuit 242 may be divided by a resistor voltage dividing circuit 250. Furthermore, the voltage $V_G''$ thus divided may be input to the gate (or base) of the transistor 251. With such an arrangement, the on signal $S_{ON}$ may be generated according to the on/off switching operation of the transistor 251.

FIG. 36B shows a modification of the circuit configuration shown in FIG. 29. Specifically, the comparator 244 is omitted for each channel. Instead, resistor voltage dividing circuits 254_1 through 254_N each having an appropriate voltage diving ratio are provided. The gate voltages $V_{G1}'$ through $V_{GN}'$ thus divided are input to the logic gate 256. In this case, when any one of the gate voltages $V_G'$ thus divided for each channel exceeds a high/low threshold value of the logic gate 256, the on signal $S_{ON}$ is asserted. FIG. 36C is a circuit diagram showing an example in which, as the logic gate shown in FIG. 36B, a NOR gate is employed.

Embodiment 7

Figure 37:
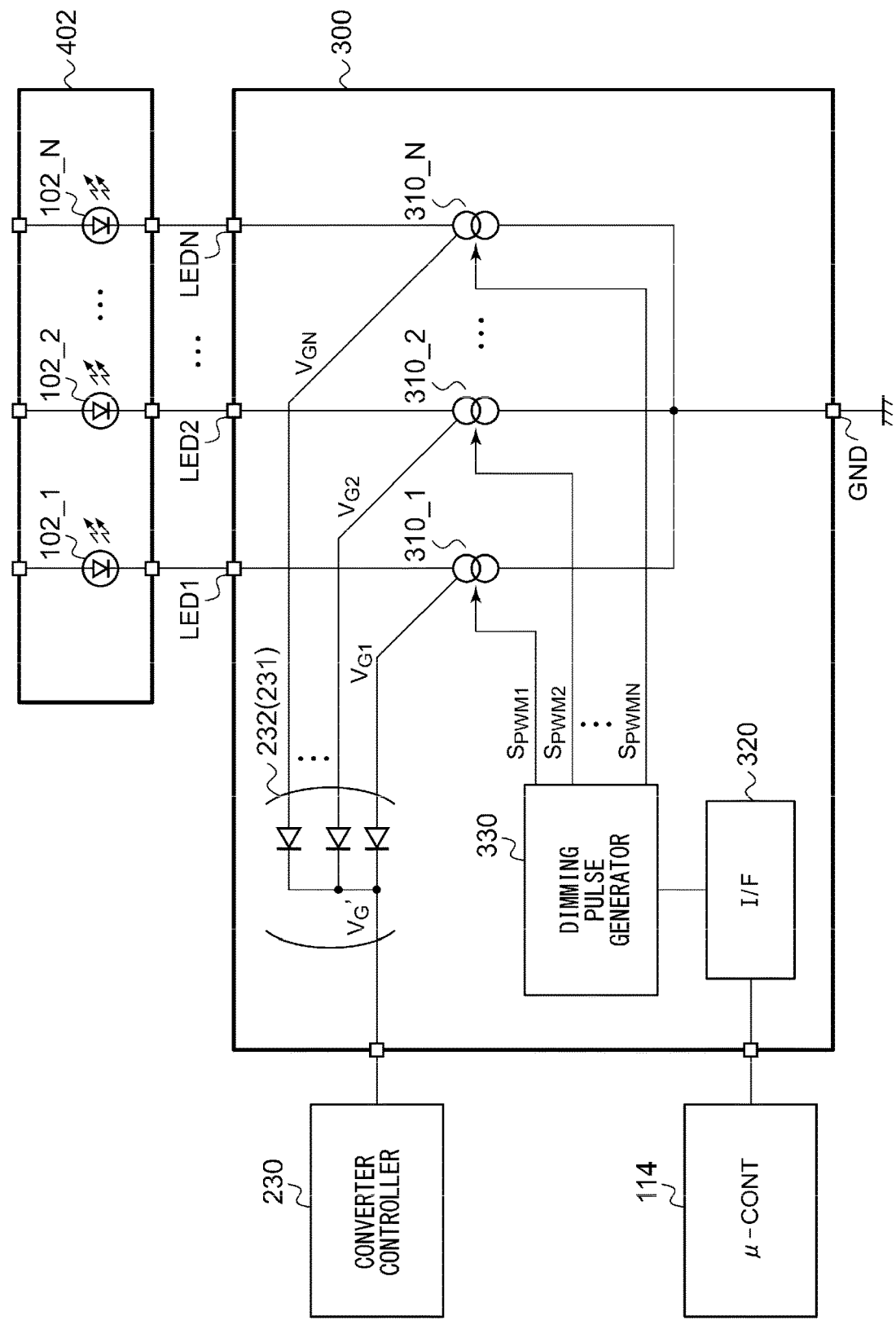
FIG. 37 is a circuit diagram showing a current driver IC and a peripheral circuit thereof according to an embodiment 7.

An embodiment 7 relates to a current driver. The multiple current sources 210 may be integrated on a single semiconductor chip, which will be referred to as a "current driver IC (Integrated Circuit)." FIG. 37 is a circuit diagram showing a current driver IC 300 and a peripheral circuit thereof according to the embodiment 7. In addition to multiple current sources 310_1 through 310_N, the current driver IC 300 includes an interface circuit 320 and a dimming pulse generator 330.

As shown in the embodiment 6, the multiple current sources 310_1 through 310_N are configured to switch independently between the on state and the off state according to PWM signals $S_{PWM1}$ through $S_{PWMN}$, respectively. The current sources 310_1 through 310_N are respectively coupled to the corresponding semiconductor light sources 102_1 through 102_N in series via cathode pins LED1 through LEDN.

The interface circuit 320 receives multiple control data $D_1$ through $D_N$ from an external microcontroller (processor 114). The kind of the interface is not restricted in particular. For example, an SPI (Serial Peripheral Interface) or I²C interface may be employed. The multiple control data $D_1$ through $D_N$ respectively indicate the on/off duty cycles of the multiple current sources 310_1 through 310_N, which are updated at a first time interval $T_1$. The first time interval $T_1$ is set to on the order of 20 ms to 200 ms. For example, the first time interval $T_1$ is set to 100 ms.

The dimming pulse generator 330 generates the multiple PWM signals $S_{PWM1}$ through $S_{PWMN}$ for the multiple current sources 310_1 through 310_N based on the multiple control data $D_1$ through $D_N$. In the embodiment 6 (FIG. 25), the microcontroller 114 generates the multiple PWM signals $S_{PWM1}$ through $S_{PWN}$. In the embodiment 7, the current driver IC 300 has a built-in function of generating the multiple PWM signals $S_{PWM1}$ through $S_{PWMN}$.

The duty cycle of the i-th PWM signal $S_{PWMi}$ is gradually changed at a second time interval $T_2$ that is shorter than the first time interval $T_1$ from the corresponding control data $D_i$ value before updating to the updated value thereof (which will be referred to as the "gradual-change mode"). The second time interval $T_2$ is set to a value on the order of 1 ms to 10 ms. For example, the second time interval $T_2$ is set to 5 ms.

The dimming pulse generator 330 is capable of supporting a non-gradual-change mode in addition to the gradual-change mode. In the non-gradual-change mode, the duty cycle of the i-th PWM signal $S_{PWMi}$ is allowed to be immediately changed from the corresponding control data $D_i$ value before updating to the updated value thereof.

The dimming pulse generator 330 may preferably be configured to dynamically switch its mode between the non-gradual-change mode and the gradual-change mode according to the settings received from the microcontroller 114. Preferably, the dimming pulse generator 330 is configured to dynamically switch its mode between the non-gradual-change mode and the gradual-change mode for each channel (for each dimming pulse). The setting data that indicates the mode may be appended to the control data $D_i$.

In a case in which the switching transistor $M_1$ is controlled in the manner described in the embodiment 6, a part of or the whole of the on signal generating circuit 240 may be integrated on the current driver IC 300. The part of the on signal generating circuit 240 to be integrated may preferably be determined according to the circuit configuration of the on signal generating circuit 240. Specifically, the part of the on signal generating circuit 240 to be integrated may preferably determined so as to reduce the number of lines that couple the converter controller 230 and the current driver IC 300. As shown in FIG. 37, in a case in which the maximum value circuit 242, which is a part of the on signal generating circuit 240, is integrated on the current driver IC 300, such an arrangement requires only a single line between the converter controller 230 and the current driver IC 300, which is used to transmit the maximum voltage $V_G'$ from among the multiple gate voltages. In a case in which the whole of the on signal generating circuit 240 is integrated on the current driver IC 300, such an arrangement requires only a single line between the converter controller 230 and the current driver IC 300, which is used to transmit the on signal $S_{ON}$.

Figure 38:
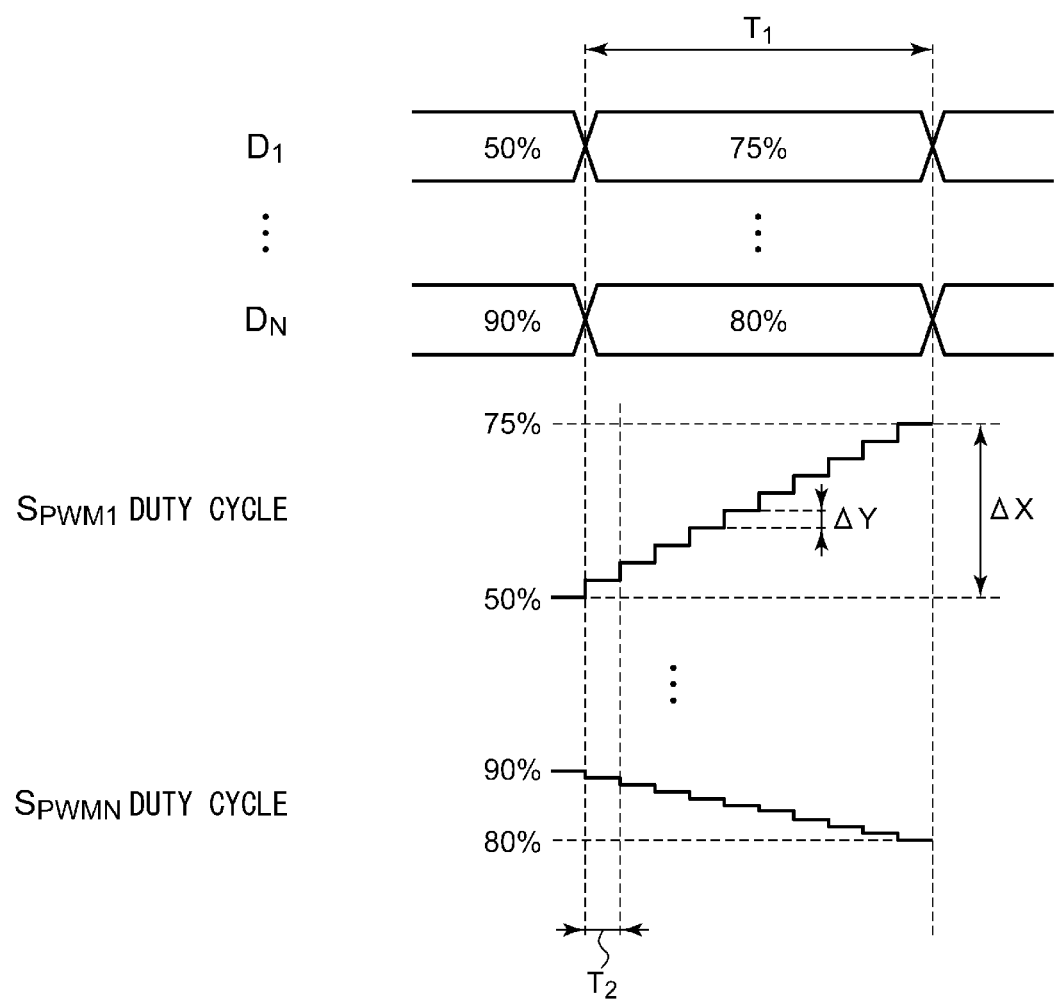
FIG. 38 is an operation waveform diagram showing the operation of the current driver IC shown in FIG. 37.

Next, description will be made regarding the operation of the current driver IC 300. FIG. 38 is an operation waveform diagram showing the operation of the current driver IC 300 shown in FIG. 37. Here, description will be made assuming that the duty cycle of the PWM signal is changed linearly. For example, in a case in which $T_1$=100 ms, and $T_2$=5 ms, the duty cycle may preferably be changed in a stepwise manner with 20 steps. With the difference between the control data value before updating and the control data value after updating as X %, the duty cycle of the PWM signal is changed in a stepwise manner with steps of $\Delta Y=(\Delta X/20)\%$.

The above is the operation of the current driver IC 300. The advantages of the current driver IC 300 can be clearly understood in comparison with a comparison technique. If the current driver IC 300 does not have the function of gradually changing the duty cycle, the microcontroller 114 must update the control data $D_1$ through $D_N$ that each indicate the duty cycle at the second time interval $T_2$. In a case in which the number of channels N of the semiconductor light sources 102 exceeds several dozen to 100, such an arrangement requires a high-performance microcontroller, i.e., a high-cost microcontroller, configured as the microcontroller 114. Furthermore, such an arrangement requires high-speed communication between the microcontroller 114 and the current driver IC 300, thereby leading to the occurrence of a noise problem.

In contrast, with the current driver IC 300 according to the embodiment, this arrangement allows the rate at which the microcontroller 114 updates the control data $D_1$ through $D_N$ to be reduced. This allows the performance required for the microcontroller 114 to be reduced. Furthermore, this allows the communication speed between the microcontroller 114 and the current driver IC 300 to be reduced, thereby solving the noise problem.

The first time interval $T_1$ may preferably be configured to be variable. In a situation in which there is only a small change in the duty cycle, the first time interval $T_1$ is increased so as to reduce the data communication amount, thereby allowing power consumption and noise to be reduced.

FIG. 38 shows an example in which the duty cycle is changed linearly. Also, the duty cycle may be changed according to a curve function such as a quadratic function or an exponential function. In a case of employing such a quadratic function, this arrangement provides natural dimming control with less discomfort.

As shown in FIG. 37, the multiple semiconductor light sources 102_1 through 102_N may be integrated on a single semiconductor chip (die) 402. Furthermore, the semiconductor chip 402 and the current driver IC 300 may be housed in a single package in the form of a module.

FIG. 39 shows a plan view and a cross-sectional view of the integrated-driver light source 400. The multiple semiconductor light sources 102 are formed in a matrix on the front face of the semiconductor chip 402. The back face of the semiconductor chip 402 is provided with pairs of back-face electrodes A and K that each correspond to a pair of an anode electrode and a cathode electrode of each of the multiple semiconductor light sources 102. In this drawing, only a single connection relation is shown in an expanded view of the semiconductor light source 102_1.

The semiconductor chip 402 and the current driver IC 300 are mechanically joined and electrically coupled. The front face of the current driver IC 300 is provided with front-face electrodes 410 (LED1 through LEDN in FIG. 37) to be respectively coupled to the cathode electrodes K of the multiple semiconductor light sources 102 and front-face electrodes 412 to be respectively coupled to the anode electrodes A of the multiple semiconductor light sources 102. Each front-face electrode 412 is coupled to a corresponding bump (or pad) 414 provided to a package substrate configured as a back face of the current driver IC 300. Also, an unshown interposer may be arranged between the semiconductor chip 402 and the current driver IC 300.

The kind of the package of the integrated-driver light source 400 is not restricted in particular. As the package of the integrated-driver light source 400, a BAG (Ball Grid Array), PGA (Pin Grid Array), LGA (Land Grid Array), QFP (Quad Flat Package), or the like, may be employed.

In a case in which the semiconductor light sources 102 and the current driver IC 300 are each configured as a separate module, a countermeasure may preferably be provided in which a heat dissipation structure or the like is attached to each module. In contrast, with the integrated-driver light source 400 as shown in FIG. 39, there is a need to release the sum total of heat generated by the light sources 102 and the current sources 210. Accordingly, such an arrangement has the potential to require a very large heat dissipation structure. However, by employing the lighting circuit 200 according to the embodiment, this arrangement is capable of suppressing heat generated by the current sources 210. This allows the size of the heat dissipation structure to be attached to the integrated-driver light source 400 to be reduced.

Embodiment 8

With the automotive lamp 100 according to the embodiment 6, in some cases, such an arrangement has a problem of a reduction in the switching frequency in a light load state in which the number of the turned-on light sources 102 becomes small.

Figure 40A:
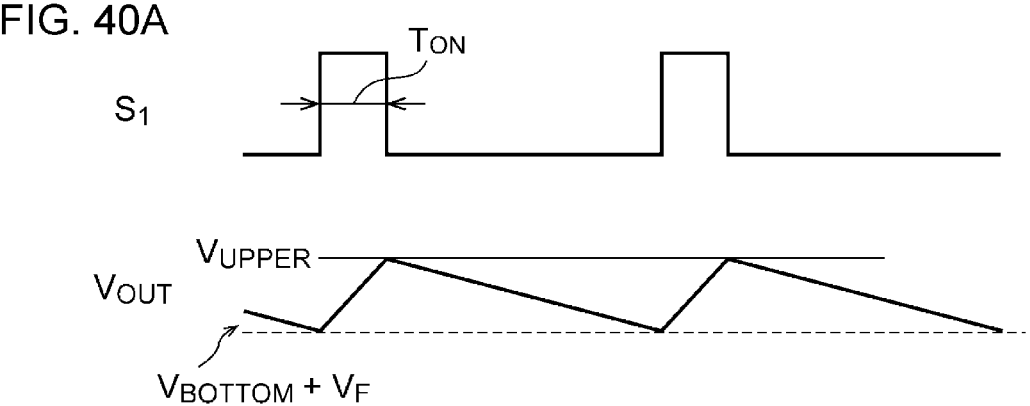
FIGS. 40A through 40C are diagrams for explaining a reduction in the switching frequency in a light load state.
Figure 40B:
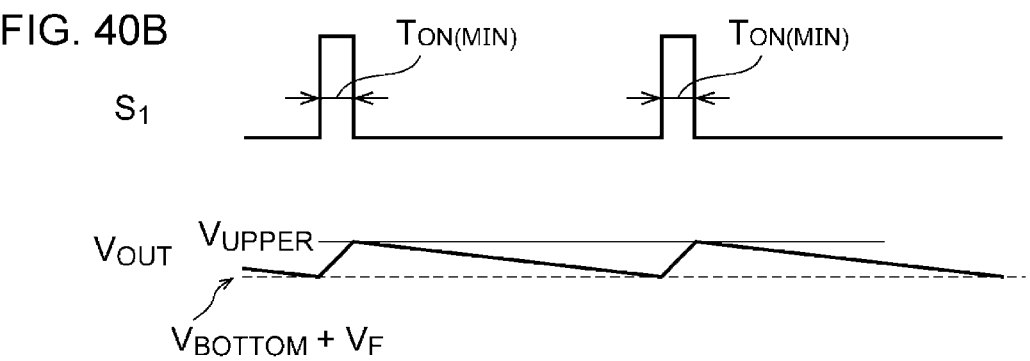
Figure 40C:
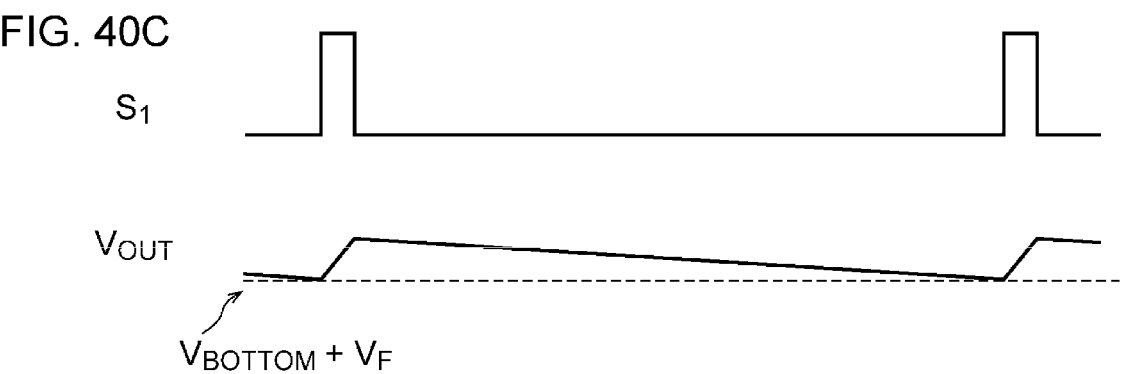

FIGS. 40A through 40C are diagrams for explaining the reduction in the switching frequency in the light load state. As shown in FIGS. 37A and 37B, with the examples shown in FIGS. 30 and 33, the on time $T_{ON}$ or the upper limit $V_{UPPER}$ of the output voltage $V_{OUT}$ is feedback controlled so as to stabilize the frequency.

However, in a case in which the pulse width of the control pulse $S_1$ is excessively narrowed, such an arrangement is not able to turn on the switching transistor $M_1$. Accordingly, such an arrangement is not capable of shortening the pulse width of the control pulse $S_1$ such that it is smaller than a particular minimum pulse width. In other words, in the light load state, the pulse width of the control pulse $S_1$ is fixed to the minimum pulse width (FIG. 37C). The angle of the downward slope of the output voltage $V_{OUT}$ corresponds to the load current, i.e., the number of the turned-on semiconductor light sources 102. In a state in which the number of turned-on semiconductor light sources 102 becomes small, the slope of the downward slope becomes smaller, which lowers the switching frequency. Accordingly, even in a case of supporting the frequency stabilizing control operation, such an arrangement has the potential to cause a situation in which the switching frequency is set to a value in the LW band.

Figure 41:
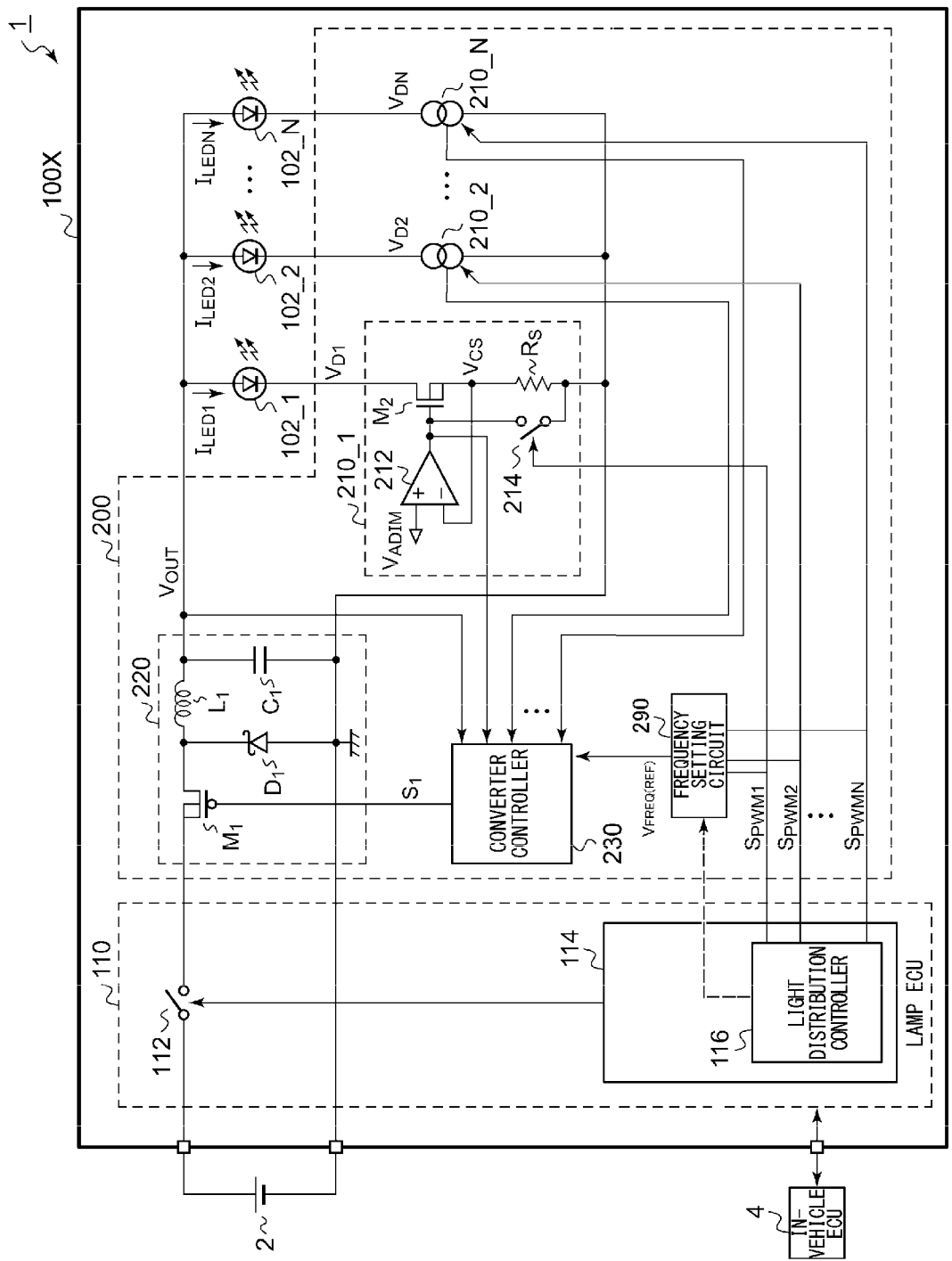
FIG. 41 is a block diagram showing an automotive lamp according to an embodiment 8.

FIG. 41 is a block diagram showing an automotive lamp 100X according to an embodiment 8. The automotive lamp 100X further includes a frequency setting circuit 290 in addition to the configuration of the automotive lamp 100 shown in FIG. 25. In this embodiment, the converter controller 230 is provided with a frequency stabilizing function. Accordingly, the converter controller 230 may be configured as the converter controller 230C shown in FIG. 30 or the converter controller 230E shown in FIG. 33.

The frequency setting circuit 290 changes the target frequency according to the number of the on-state current sources (the number of turned-on light sources) from among the multiple current sources 210. More specifically, when the number of the on-state current sources becomes smaller than a predetermined threshold value, judgment is made that the light load state has been detected. In this state, the frequency setting circuit 290 sets the target frequency to a different frequency value that is lower than the original target frequency and does not belong to a particular band defined as an electromagnetic noise band. In a case in which, in the normal state, the target frequency is set to a frequency value of 300 kHz to 450 kHz between the LW band and AM band, when the operating state becomes the light load state, the target frequency may preferably be set to a band (e.g., 100 kHz) that is lower than the LW band and that is higher than the audible band.

With an arrangement shown in FIG. 30 or 33, the target frequency is determined based on the reference voltage $V_{FREQ(REF)}$. Accordingly, in a state in which the number of the turned-on light sources is smaller than a predetermined threshold, the frequency setting circuit 290 may preferably reduce the reference voltage $V_{FREQ(REF)}$.

With the embodiment 8, when the frequency is lowered in the light load state, such an arrangement is capable of maintaining the frequency such that it is outside the frequency range that causes an electromagnetic noise problem that is to be avoided.

Embodiment 9

Figure 42:
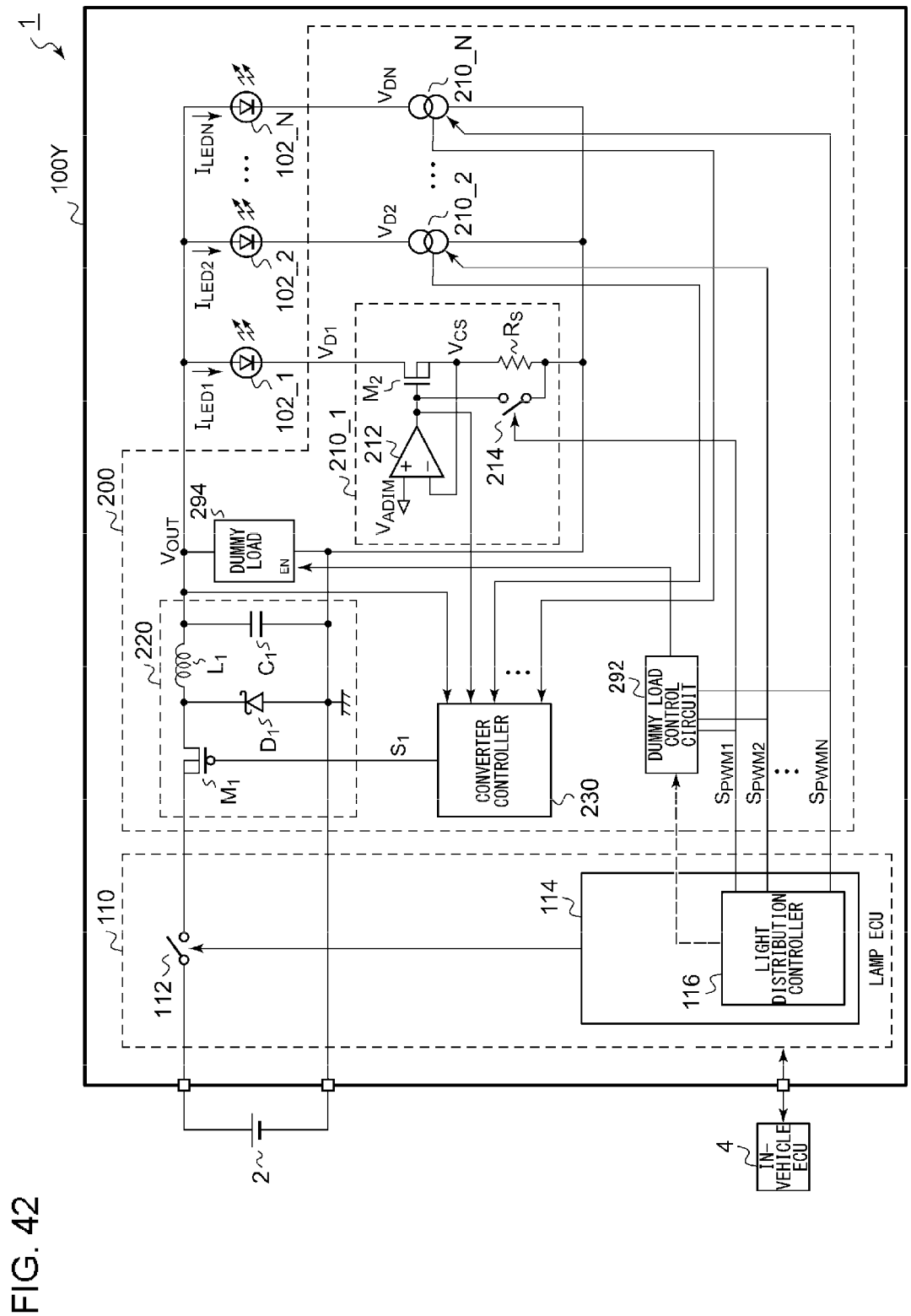
FIG. 42 is a block diagram showing an automotive lamp according to an embodiment 9.

FIG. 42 is a block diagram showing an automotive lamp 100Y according an embodiment 9. The automotive lamp 100Y further includes a dummy load 292 and a dummy load control circuit 294 in addition to the configuration of the automotive lamp 100 shown in FIG. 25.

The dummy load 292 is coupled to the output of the switching converter 220. In the enable state, the dummy load 292 discharges the capacitor $C_1$ of the switching converter 220 so as to lower the output voltage $V_{OUT}$. The dummy load control circuit 294 controls the enable/disable state of the dummy load 292 based on the number of the on-state current sources from among the multiple current sources.

The dummy load 292 includes a switch configured as a transistor arranged between the output of the switching converter 220 and the ground. After a predetermined time $\tau$ elapses from the turning-off of the switching transistor $M_1$, the dummy load control circuit 294 asserts (sets to the high level, for example) the enable signal EN, so as to turn on the switch of the dummy load 292.

Figure 43:
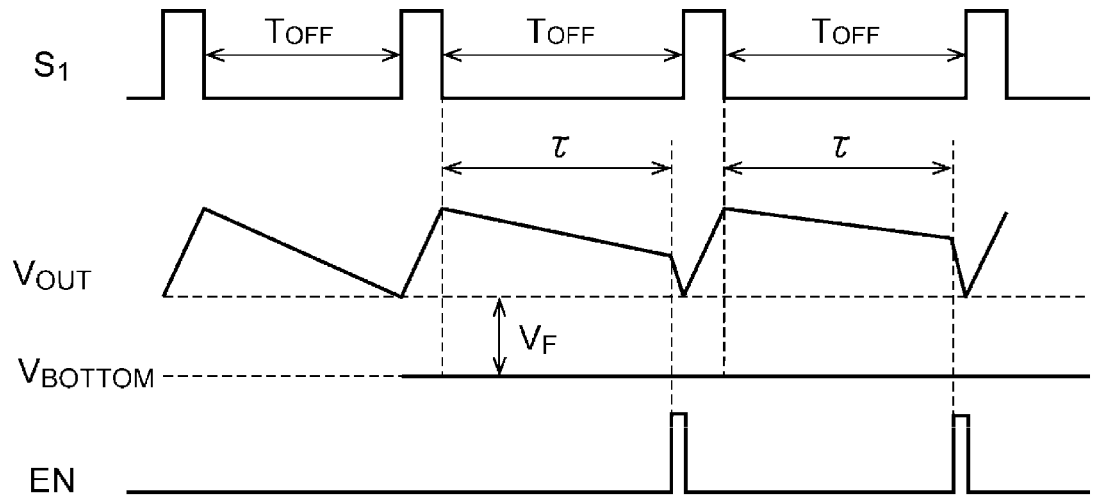
FIG. 43 is an operation waveform diagram showing the operation of the automotive lamp shown in FIG. 42.

FIG. 43 is an operation waveform diagram showing the operation of the automotive lamp 100Y shown in FIG. 42. When the operating state becomes the light load state, the enable signal EN is asserted for each cycle, which immediately decreases the output voltage $V_{OUT}$. Subsequently, when the output voltage $V_{OUT}$ decreases to a voltage level that corresponds to the bottom limit voltage $V_{BOTTOM}$, the control pulse $S_1$ is set to the high level. That is to say, the upper limit of the off time $T_{OFF}$ of the switching transistor $M_1$ is limited by the predetermined period $\tau$. This restricts the reduction in the switching frequency in the light load state.

The dummy load 292 may be configured as a constant current source that is capable of switching its state between the on state and the off state. Also, the dummy load 292 may be configured as a combination of switches and resistors.

Embodiment 10

Description will be made with reference to FIG. 25. Typically, there is a tradeoff relation between the on resistance and the breakdown voltage of a transistor. When overshoot occurs in the output voltage $V_{OUT}$ of the switching converter, this raise the voltage applied to a transistor that forms each current source 210. Accordingly, there is a need to configure each current source 210 using a high-breakdown-voltage element. However, such a high-breakdown-voltage element has a large on resistance $R_{ON}$. Accordingly, such an arrangement requires the bottom limit voltage $V_{BOTTOM}$ to be set to a high value. This leads to problems of large power consumption and large heat generation.

Figure 44:
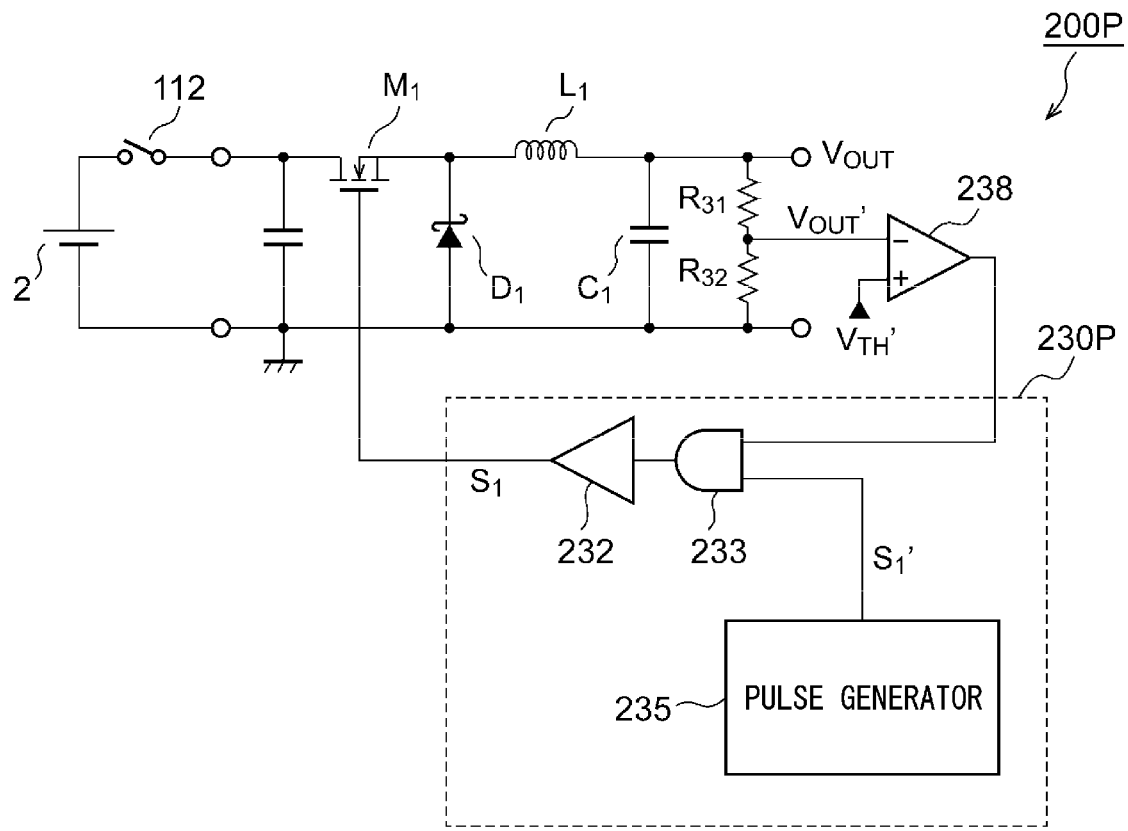
FIG. 44 is a circuit diagram showing a lighting circuit according to an embodiment 10.

FIG. 44 is a circuit diagram showing a lighting circuit 200Z according to an embodiment 10. When the driving voltage $V_{OUT}$ exceeds a predetermined threshold value $V_{TH}$, the lighting circuit 200Z forcibly turns off the switching transistor $M_1$. The lighting circuit 200Z includes resistors $R_{31}$ and $R_{32}$, and a voltage comparator 238. The voltage comparator 238 compares the driving voltage $V_{OUT}'$ divided by the resistors $R_{31}$ and $R_{32}$ with a threshold value $V_{TH}'$, so as to detect the occurrence of an overvoltage state in the driving voltage $V_{OUT}$.

The converter controller 230P includes a pulse modulator 235, a logic gate 233, and a driver 232. The pulse modulator 235 has the same configuration as those of the converter controllers 230A through 230E shown in FIGS. 28 through 34 except for the driver 232. The pulse modulator 235 generates the control pulse $S_1'$. When the output $S_2$ of the voltage comparator 238 indicates the relation $V_{OUT}'<V_{TH}'$, the logic gate 233 allows the control pulse $S_1'$ to pass through as it is. Conversely, when the output $S_2$ of the voltage comparator 238 indicates the relation $V_{OUT}'>V_{TH}'$, the logic gate 233 forcibly sets the level of the control pulse $S_1'$ to a level that turns off the switching transistor $M_1$. In this example, the switching transistor $M_1$ is configured as an N-channel MOSFET. When $S_1$ is set to the low level, the switching transistor $M_1$ is set to the off state. When $V_{OUT}'>V_{TH}'$, the output $S_2$ of the voltage comparator 238 is set to the low level. The logic gate 233 is configured as an AND gate.

With the present embodiment, the current source 210 is configured using a transistor having a low on resistance, thereby allowing power consumption to be reduced. As a tradeoff, such an arrangement involves such a transistor having a low breakdown voltage. However, when an overshoot occurs in the output voltage $V_{OUT}$ of the switching converter, the switching transistor $M_1$ is immediately suspended. Such an arrangement is capable of preventing an overvoltage from being applied to the transistor of the current source (e.g., the transistor $M_2$ shown in FIGS. 36A and 36B, the output-side transistor of the current mirror circuit 216 shown in FIG. 36C).

Figure 45:
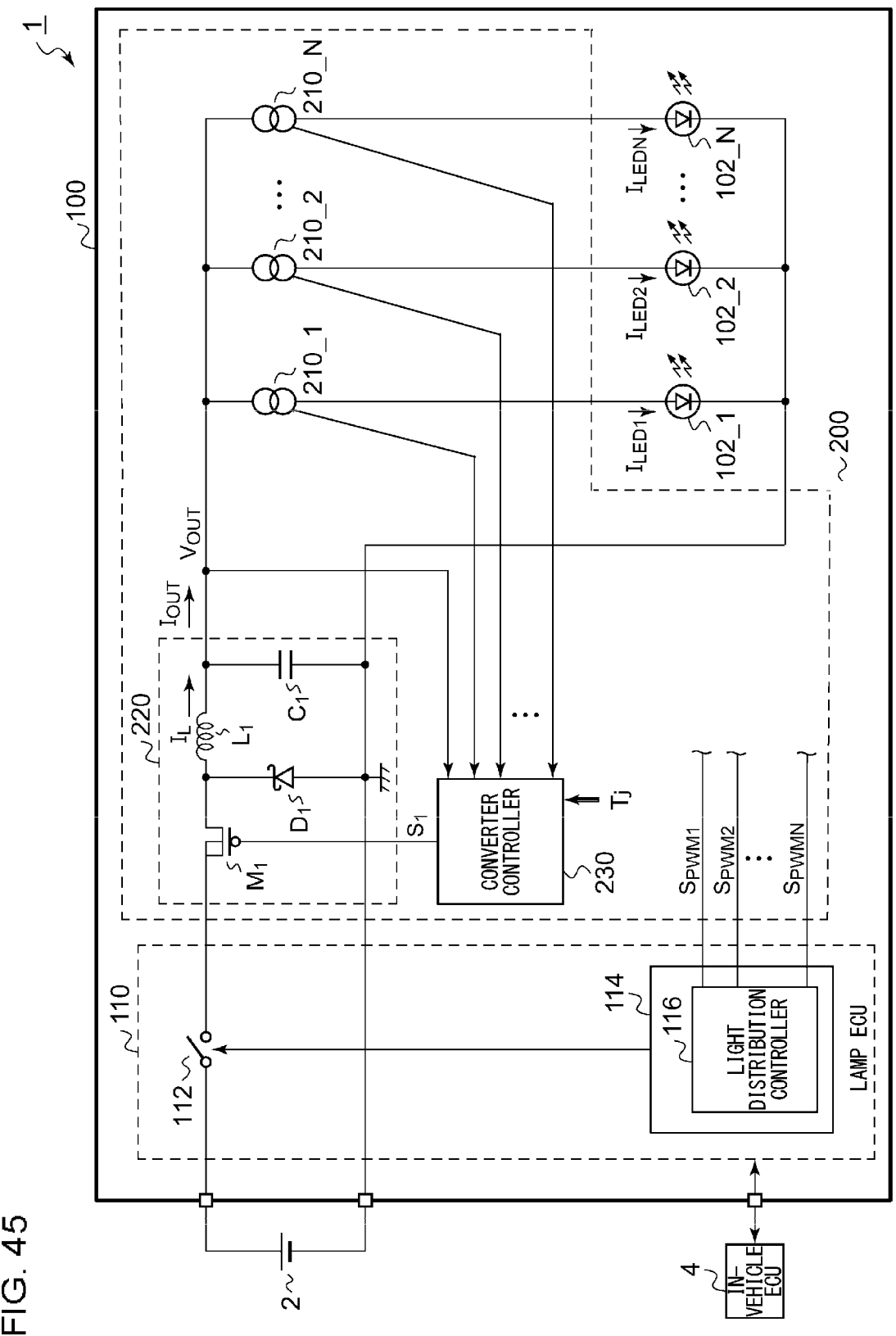
FIG. 45 is a circuit diagram showing an automotive lamp according to a modification.

Description has been made in the embodiments regarding an arrangement in which the current source 210 is configured as a sink circuit, and is coupled to the cathode of the corresponding semiconductor light source 102. However, the present invention is not restricted to such an arrangement. FIG. 45 is a circuit diagram showing an automotive lamp 100 according to a modification. In this modification, the cathodes of the semiconductor light sources 102 are coupled so as to form a common cathode. Furthermore, each current source 210 configured as a source circuit is coupled to the anode side of the corresponding semiconductor light source 102. Each current source 210 may be configured by geometrically reversing the configuration shown in FIG. 25 (or FIG. 35).

Description has been made regarding the present invention with reference to the embodiments using specific terms. However, the above-described embodiments show only the mechanisms and applications of the present invention for exemplary purposes only, and are by no means intended to be interpreted restrictively. Rather, various modifications and various changes in the layout can be made without departing from the spirit and scope of the present invention defined in appended claims.

The invention claimed is:

1. A lighting circuit structured to turn on a plurality of semiconductor light sources, comprising:
a plurality of current sources each of which is to be coupled to a corresponding semiconductor light source in series;
a switching converter structured to supply a driving voltage across each of a plurality of series connection circuits each formed of the semiconductor light source and the current source; and
a converter controller employing a ripple control method, wherein the converter controller comprises:
a plurality of comparators respectively assigned to the plurality of current sources, and each structured to compare a voltage across a corresponding current source with a predetermined bottom limit voltage; and
a logic gate structured to receive outputs of the plurality of comparators,
and wherein the converter controller is structured to turn on a switching transistor of the switching converter based on an output of the logic gate.

2. The lighting circuit according to claim 1, wherein the converter controller is structured to turn off the switching transistor after an on time elapses after the switching transistor is turned on.

3. The lighting circuit according to claim 2, wherein the on time is feedback controlled such that a switching frequency of the switching transistor approaches a target frequency.

4. The lighting circuit according to claim 1, wherein the converter controller is structured to turn off the switching transistor in response to the driving voltage reaching an upper limit voltage.

5. The lighting circuit according to claim 4, wherein the upper limit voltage is feedback controlled such that the switching frequency of the switching transistor approaches a target frequency.

6. The lighting circuit according to claim 1, wherein the plurality of current sources are each structured to allow an on/off state thereof to be controlled independently, and wherein the bottom limit voltage is raised according to a reduction in a number of on-state current sources from among the plurality of current sources.

7. The lighting circuit according to claim 3, wherein the plurality of current sources are each structured to allow an on/off state thereof to be controlled independently, and wherein the target frequency is set according to a number of on-state current sources from among the plurality of current sources.

8. The lighting circuit according to claim 1, wherein the plurality of current sources are each structured to allow an on/off state thereof to be controlled independently, and wherein the lighting circuit further comprises a dummy load coupled to an output of the switching converter, and structured to be set to an enable state according to a number of on-state current sources from among the plurality of current sources.

9. The lighting circuit according to claim 8, wherein the dummy load is structured to reduce the driving voltage after a predetermined period of time elapses after the switching transistor is turned off.

10. The lighting circuit according to 1, wherein, when the driving voltage exceeds a predetermined threshold value, the switching transistor is forcibly turned off.

11. The lighting circuit according to claim 1, wherein the plurality of semiconductor light sources and the plurality of current sources are arranged in the form of a module.

12. An automotive lamp comprising the lighting circuit according to claim 1.

13. The lighting circuit according to claim 1,
wherein a comparator, of the plurality of comparators, asserts its output signal based on the comparison result between the voltage across the corresponding current source and the predetermined bottom limit voltage; or
wherein the comparator asserts its output signal when the voltage across the corresponding current source is lower than the predetermined bottom limit voltage.

* * * * *